(12) United States Patent
Chung et al.

(10) Patent No.: US 7,975,920 B2
(45) Date of Patent: *Jul. 12, 2011

(54) ELECTRONIC VOTING METHOD AND SYSTEM EMPLOYING A MACHINE READABLE BALLOT ENVELOPE

(75) Inventors: Kevin Kwong-Tai Chung, Princeton, NJ (US); Victor Jun Dong, Edison, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 437 days.

This patent is subject to a terminal disclaimer.

(21) Appl. No.: 12/206,239

(22) Filed: Sep. 8, 2008

(65) Prior Publication Data

US 2009/0020606 A1 Jan. 22, 2009

Related U.S. Application Data

(60) Division of application No. 11/487,886, filed on Jul. 17, 2006, now Pat. No. 7,614,553, which is a division of application No. 10/410,824, filed on Apr. 10, 2003, now Pat. No. 7,077,313, which is a continuation-in-part of application No. 10/260,167, filed on Sep. 30, 2002, now Pat. No. 6,892,944.

(60) Provisional application No. 60/326,265, filed on Oct. 1, 2001, provisional application No. 60/341,633, filed on Dec. 19, 2001, provisional application No. 60/377,824, filed on May 7, 2002, provisional application No. 60/382,033, filed on May 20, 2002, provisional application No. 60/385,118, filed on May 30, 2002, provisional application No. 60/389,635, filed on Jun. 17, 2002, provisional application No. 60/403,151, filed on Aug. 12, 2002.

(51) Int. Cl.
*G06K 17/00* (2006.01)
(52) U.S. Cl. .................. 235/386; 235/375; 705/12
(58) Field of Classification Search .................. 235/386, 235/375; 705/12
See application file for complete search history.

(56) References Cited

U.S. PATENT DOCUMENTS 3,163,758 A 12/1964 Treacy
(Continued)

FOREIGN PATENT DOCUMENTS

CN 1804905 7/2006
(Continued)

OTHER PUBLICATIONS

Transcript of Jury Trial, vol. I, *Avante International Technology Corporation, Plaintiff, v. Premier Election Solutions, et al, Defendants*; United States Eastern District of Missouri Eastern Division: Case No. 4:06-CV-978 TCM, Feb. 2, 2009, 111 pages.

(Continued)

*Primary Examiner* — Karl D. Frech
(74) *Attorney, Agent, or Firm* — Clement A. Berard, Esq.; Dann, Dorfman, Herrell & Skillman, PC

(57) ABSTRACT

A method for reading a sheet or a paper ballot enclosed in a ballot envelope comprises decoding a machine readable envelope identifier from each ballot envelope, displaying at least the decoded envelope identifier and a signature from each ballot envelope for determining from the envelope identifier, the signature, or both, whether a valid sheet or ballot is presented. If the sheet or ballot is valid, then the sheet or ballot is removed from its envelope and the selections marked on the sheet or ballot may then be determined and processed.

43 Claims, 11 Drawing Sheets

U.S. PATENT DOCUMENTS

| | | |
|---|---|---|
| 3,648,022 A | 3/1972 | Cook |
| 3,653,587 A | 4/1972 | Hammond et al. |
| 3,710,105 A | 1/1973 | Oxendine, Jr. et al. |
| 3,722,793 A | 3/1973 | Aronoff |
| 3,739,151 A | 6/1973 | Moldovan, Jr. et al. |
| 3,790,072 A | 2/1974 | Moldovan, Jr. |
| 3,900,961 A | 8/1975 | Sokolski et al. |
| 3,941,976 A | 3/1976 | Huhn |
| 3,944,788 A | 3/1976 | Comisar et al. |
| 3,977,357 A | 8/1976 | O'Neal et al. |
| 4,010,353 A | 3/1977 | Moldovan, Jr. et al. |
| 4,015,106 A | 3/1977 | De Phillipo |
| 4,021,780 A | 5/1977 | Narey et al. |
| 4,101,784 A | 7/1978 | Key et al. |
| 4,153,895 A | 5/1979 | Weisbrod et al. |
| 4,300,123 A | 11/1981 | McMillin et al. |
| 4,357,596 A | 11/1982 | Feilchenfeld |
| 4,459,021 A | 7/1984 | Blazek |
| 4,479,194 A | 10/1984 | Fogg et al. |
| 4,641,240 A | 2/1987 | Boram |
| 4,649,264 A | 3/1987 | Carson |
| 4,724,307 A | 2/1988 | Dutton et al. |
| 4,760,247 A | 7/1988 | Keane et al. |
| 4,774,665 A | 9/1988 | Webb |
| 4,807,908 A | 2/1989 | Gerbel |
| 4,813,708 A | 3/1989 | Narey |
| 4,968,873 A | 11/1990 | Dethloff et al. |
| 5,038,392 A | 8/1991 | Morris et al. |
| 5,073,700 A | 12/1991 | D'Onofrio |
| 5,085,587 A | 2/1992 | DesForges et al. |
| 5,103,490 A | 4/1992 | McMillan |
| 5,126,731 A | 6/1992 | Cromers, Jr. |
| 5,134,669 A | 7/1992 | Keogh et al. |
| 5,164,601 A | 11/1992 | Nordstrom |
| 5,191,525 A | 3/1993 | LeBrun et al. |
| 5,213,373 A | 5/1993 | Ramos |
| 5,218,528 A | 6/1993 | Wise et al. |
| 5,221,831 A | 6/1993 | Geiszler |
| 5,247,166 A | 9/1993 | Cannon et al. |
| 5,248,872 A | 9/1993 | Stewart |
| 5,257,011 A | 10/1993 | Beigel |
| 5,272,318 A | 12/1993 | Gorman |
| 5,278,753 A | 1/1994 | Graft, III |
| 5,365,026 A | 11/1994 | Cromers, Jr. et al. |
| 5,377,099 A | 12/1994 | Miyagawa |
| 5,396,218 A | 3/1995 | Olah |
| 5,400,248 A | 3/1995 | Chishom |
| 5,416,308 A | 5/1995 | Hood et al. |
| 5,452,379 A | 9/1995 | Poor |
| 5,474,295 A | 12/1995 | Demshuk |
| 5,495,532 A | 2/1996 | Kilian et al. |
| 5,497,318 A | 3/1996 | Miyagawa et al. |
| 5,548,326 A | 8/1996 | Michael |
| 5,566,327 A | 10/1996 | Sehr |
| 5,572,601 A | 11/1996 | Bloomberg |
| 5,583,329 A | 12/1996 | Davis, III et al. |
| 5,585,612 A | 12/1996 | Harp, Jr. |
| 5,610,383 A | 3/1997 | Chumbley |
| 5,612,870 A | 3/1997 | Welner |
| 5,631,984 A | 5/1997 | Graf et al. |
| 5,635,726 A | 6/1997 | Zavislan |
| 5,640,200 A | 6/1997 | Michael |
| 5,661,470 A | 8/1997 | Karr |
| 5,672,060 A | 9/1997 | Poor |
| 5,675,628 A | 10/1997 | Hokkanen |
| 5,710,420 A | 1/1998 | Martin et al. |
| 5,711,673 A | 1/1998 | Grundy, Jr. |
| 5,719,386 A | 2/1998 | Hsieh et al. |
| 5,732,222 A | 3/1998 | Miyagawa et al. |
| 5,758,325 A | 5/1998 | Lohry et al. |
| 5,821,508 A | 10/1998 | Willard |
| 5,875,432 A | 2/1999 | Sehr |
| 5,878,399 A | 3/1999 | Peralto |
| 5,936,527 A | 8/1999 | Isaacman et al. |
| 5,978,466 A | 11/1999 | Quattrocchi |
| 5,987,149 A | 11/1999 | Poor |
| 6,005,680 A | 12/1999 | Luther et al. |
| 6,014,438 A | 1/2000 | Quattrocchi |
| 6,077,106 A | 6/2000 | Mish |
| 6,078,928 A | 6/2000 | Schnase et al. |
| 6,081,793 A | 6/2000 | Challener et al. |
| 6,092,051 A | 7/2000 | Kilian et al. |
| 6,097,301 A | 8/2000 | Tuttle |
| 6,112,240 A | 8/2000 | Pogue et al. |
| 6,173,154 B1 | 1/2001 | Kucinski et al. |
| 6,176,429 B1 | 1/2001 | Redderson et al. |
| 6,250,548 B1 | 6/2001 | McClure et al. |
| 6,287,765 B1 | 9/2001 | Cubicciotti |
| 6,366,777 B1 | 4/2002 | Uusitalo |
| 6,412,692 B1 | 7/2002 | Miyagawa |
| 6,418,372 B1 | 7/2002 | Hofmann |
| 6,427,073 B1 | 7/2002 | Kortesalmi et al. |
| 6,457,643 B1 | 10/2002 | Way |
| 6,505,778 B1 | 1/2003 | Reddersen et al. |
| 6,540,138 B2 | 4/2003 | Hall et al. |
| 6,550,675 B2 | 4/2003 | Davis et al. |
| 6,581,824 B1 | 6/2003 | McClure et al. |
| 6,607,126 B2 | 8/2003 | Altini et al. |
| 6,607,137 B2 | 8/2003 | Morales |
| 6,641,033 B2 | 11/2003 | McClure et al. |
| 6,662,998 B2 | 12/2003 | McClure et al. |
| 6,688,517 B1 | 2/2004 | McClure et al. |
| 6,726,090 B1 | 4/2004 | Kargel |
| 6,739,508 B2 | 5/2004 | Ushioda et al. |
| 6,741,738 B2 | 5/2004 | Taylor |
| 6,769,613 B2 | 8/2004 | McDermott et al. |
| 6,779,727 B2 | 8/2004 | Warther |
| 6,799,723 B2 | 10/2004 | Kotob et al. |
| 6,817,515 B2 | 11/2004 | Winnett |
| 6,854,644 B1 | 2/2005 | Bolton et al. |
| 6,865,543 B2 | 3/2005 | Gibbs, Sr. |
| 6,892,944 B2 | 5/2005 | Chung |
| 6,942,142 B2 | 9/2005 | Barmettler et al. |
| 6,968,999 B2 | 11/2005 | Reardon |
| 6,971,574 B1 | 12/2005 | Herskowitz |
| 7,032,821 B2 | 4/2006 | McClure et al. |
| 7,077,313 B2 * | 7/2006 | Chung et al. ............... 235/386 |
| 7,080,779 B2 | 7/2006 | Cummings |
| 7,100,828 B2 | 9/2006 | Cummings |
| 7,117,356 B2 | 10/2006 | La Cous |
| 7,128,263 B1 | 10/2006 | Nguyen et al. |
| 7,152,045 B2 | 12/2006 | Hoffman |
| 7,152,792 B2 | 12/2006 | Gaston |
| 7,178,730 B1 | 2/2007 | Jamison et al. |
| 7,222,787 B2 | 5/2007 | Cummings |
| 7,231,082 B2 | 6/2007 | Lenoir |
| 7,243,846 B2 | 7/2007 | Reardon |
| 2001/0035455 A1 | 11/2001 | Davis et al. |
| 2002/0029163 A1 | 3/2002 | Joao |
| 2002/0066780 A1 | 6/2002 | Balolia |
| 2002/0072961 A1 | 6/2002 | McDermott et al. |
| 2002/0074399 A1 | 6/2002 | Hall et al. |
| 2002/0078358 A1 | 6/2002 | Neff et al. |
| 2002/0084325 A1 | 7/2002 | Reardon |
| 2002/0091673 A1 | 7/2002 | Seibel et al. |
| 2002/0092908 A1 | 7/2002 | Chumbley |
| 2002/0133396 A1 | 9/2002 | Barnhart |
| 2002/0161628 A1 | 10/2002 | Lane Poor, Jr. et al. |
| 2002/0169756 A1 | 11/2002 | Biddulph |
| 2002/0175514 A1 | 11/2002 | Warther |
| 2002/0194060 A1 | 12/2002 | Chernomorov |
| 2003/0034393 A1 | 2/2003 | Chung |
| 2003/0042731 A1 | 3/2003 | Li |
| 2003/0062411 A1 | 4/2003 | Chung |
| 2003/0066872 A1 | 4/2003 | McClure |
| 2003/0173404 A1 | 9/2003 | Chung |
| 2004/0016802 A1 | 1/2004 | Cummings |
| 2004/0016803 A1 | 1/2004 | Cummings |
| 2004/0046021 A1 | 3/2004 | Chung |
| 2004/0060983 A1 | 4/2004 | Davis et al. |
| 2004/0169077 A1 | 9/2004 | Petersen et al. |
| 2004/0195323 A1 | 10/2004 | Vadura et al. |
| 2004/0217168 A1 | 11/2004 | Cummings |
| 2005/0092835 A1 | 5/2005 | Chung |
| 2005/0161507 A1 | 7/2005 | Openshaw, II et al. |
| 2005/0211778 A1 | 9/2005 | Biddulph |
| 2006/0000906 A1 | 1/2006 | Reardon |

| 2006/0202031 | A1 | 9/2006 | Chung et al. |
| 2006/0255145 | A1 | 11/2006 | Chung et al. |
| 2007/0170253 | A1 | 7/2007 | Chung et al. |
| 2009/0020606 | A1 | 1/2009 | Chung et al. |
| 2009/0037260 | A1 | 2/2009 | Felten et al. |
| 2009/0072030 | A1 | 3/2009 | Cardone et al. |

FOREIGN PATENT DOCUMENTS

| CN | 101086691 | 12/2007 |
| EP | 0199683 | 10/1986 |
| EP | 0556853 | 8/1993 |
| IT | 1234224 | 5/1992 |
| JP | 7-57014 | 3/1995 |
| JP | 9-160988 | 6/1997 |
| JP | 2005-25392 | 1/2005 |
| WO | 96/02044 | 1/1996 |
| WO | 00/79469 | 12/2000 |
| WO | 02/31629 | 4/2002 |

OTHER PUBLICATIONS

Defendants' Witness, Larry Hyer, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 2, 2009, 19 pages.

Transcript of Jury Trial, vol. II-A, *Avante International Technology Corporation, Plaintiff, v. Premier Election Solutions, et al, Defendants*; United States Eastern District of Missouri Eastern Division: Case No. 4:06-CV-978 TCM, Feb. 3, 2009, 112 pages.

Transcript of Jury Trial, vol. II-B, *Avante International Technology Corporation, Plaintiff, v. Premier Election Solutions, et al, Defendants*; United States Eastern District of Missouri Eastern Division: Case No. 4:06-CV-978 TCM, Feb. 3, 2009, 163 pages.

Defendants' Witness, John Hanna, Transcript of Video Deposition Excerpts Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 3, 2009, 16 pages.

Defendants' Witness, Brian Clubb, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 4, 2009, 12 pages.

Transcript of Jury Trial, vol. III-A, *Avante International Technology Corporation, Plaintiff, v. Premier Election Solutions, et al, Defendants*; United States Eastern District of Missouri Eastern Division: Case No. 4:06-CV-978 TCM, Feb. 4, 2009, 127 pages.

Transcript of Jury Trial, vol. III-B, *Avante International Technology Corporation, Plaintiff, v. Premier Election Solutions, et al, Defendants*; United States Eastern District of Missouri Eastern Division: Case No. 4:06-CV-978 TCM, Feb. 4, 2009, 81 pages.

Defendants' Witness, Frank Kaplan, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 4, 2009, 21 pages.

Defendants' Witness, Stephen Knecht, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 4, 2009, 7 pages.

Plaintiff's Witness, Kevin Chung, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 6 pages.

Plaintiff's Witness, Brian Clubb, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 9 pages.

Plaintiff's Witness, Timothy Cordes, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 3 pages.

Plaintiff's Witness, Herman Deutsch, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 2 pages.

Plaintiff's Witness, Luis Diaz, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 5 pages.

Transcript of Jury Trial, vol. IV-A, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 102 pages.

Transcript of Jury Trial, vol. IV-B, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 89 pages.

Plaintiff's Witness, Mauro Rivero, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 3 pages.

Plaintiff's Witness, Eric Wall, Transcript of Video Deposition Played to the Jury, *Avante International Technology Corporation, Plaintiff, v. Premier Election Solutions, et al, Defendants*; United States Eastern District of Missouri Eastern Division: Case No. 4:06-CV-978 TCM, Feb. 5, 2009, 4 pages.

Transcript of Jury Trial, vol. V-A, *Avante International Technology Corporation, Plaintiff, v. Premier Election Solutions, et al, Defendants*; United States Eastern District of Missouri Eastern Division: Case No. 4:06-CV-978 TCM, Feb. 6, 2009, 115 pages.

Transcript of Jury Trial, vol. V-B, *Avante International Technology Corporation, Plaintiff, v. Premier Election Solutions, et al, Defendants*; United States Eastern District of Missouri Eastern Division: Case No. 4:06-CV-978 TCM, Feb. 6, 2009, 62 pages.

Transcript of Jury Trial, vol. VI, *Avante International Technology Corporation, Plaintiff, v. Premier Election Solutions, et al, Defendants*; United States Eastern District of Missouri Eastern Division: Case No. 4:06-CV-978 TCM, Feb. 9, 2009, 88 pages.

Exhibit List, *Avante International Technology Corporation, Plaintiff, v. Premier Election Solutions, et al, Defendants*; United States Eastern District of Missouri Eastern Division: Case No. 4:06-CV-978 TCM, Feb. 2009, 6 pages.

Plaintiff's Exhibit 9, Consulting Invoices, admitted Feb. 2009, 5 pages.

Plaintiff's Exhibit 18, Correspondence, admitted Feb. 2009, 2 pages.
Plaintiff's Exhibit 19, Correspondence, admitted Feb. 2009, 2 pages.
Plaintiff's Exhibit 23, Correspondence, admitted Feb. 2009, 4 pages.
Plaintiff's Exhibit 32, County of Sacramento, admitted Feb. 2009, 39 pages.

Plaintiff's Exhibit 37, Declaration, admitted Feb. 2009, 69 pages.
Plaintiff's Exhibit 68, Email from Lancaster, admitted Feb. 2009, 3 pages.

Plaintiff's Exhibit 70, Resignation Email, admitted Feb. 2009, 1 page.

Plaintiff's Exhibit 127, US Patent 5610383, admitted Feb. 2009, 9 pages.

Plaintiff's Exhibit 152, U.S. Appl. No. 10/260,167, admitted Feb. 2009, 192 pages.

Plaintiff's Exhibit 191, U.S. Appl. No. 60/326,265, admitted Feb. 2009, 84 pages.

Plaintiff's Exhibit 198, VIDEO, admitted Feb. 2009.
Plaintiff's Exhibit 201, Letter to Ewald from Diebold, admitted Feb. 2009, 5 pages.

Plaintiff's Exhibit 202, Interrogatories, admitted Feb. 2009, 2 pages.
Plaintiff's Exhibit 203, Interrogatories, admitted Feb. 2009, 5 pages.
Defendant's Exhibit A, Chung Patent 6,892,944, admitted Feb. 2009, 22 pages.

Defendant's Exhibit A-3, Report of Sacramento Election, admitted Feb. 2009, 13 pages.
Defendant's Exhibit A-8, Provisional Application, admitted Feb. 2009, 84 pages.
Defendant's Exhibit A-9, Action Summary, admitted Feb. 2009, 7 pages.
Defendant's Exhibit B, Chung Patent 7,077,313, admitted Feb. 2009, 35 pages.
Defendant's Exhibit B-1, Tulare County Ballot, admitted Feb. 2009, 2pages.
Defendant's Exhibit B-9, Amendment, admitted Feb. 2009, 24 pages.
Defendant's Exhibit C, File History 6,892,944, admitted Feb. 2009, 210 pages.
Defendant's Exhibit D-2, Letter from State of Alabama, admitted Feb. 2009, 2 pages.
Defendant's Exhibit D-4, Slipedit Program User Manual, admitted Feb. 2009, 7 pages.
Defendant's Exhibit E, File History 7,077,313, admitted Feb. 2009, 346 pages.
Defendant's Exhibit E-2, GEMS User Guide, admitted Feb. 2009, 41 pages.
Defendant's Exhibit E-4, Specification for Slipedit Editor, admitted Feb. 2009, 11 pages.
Defendant's Exhibit F-3, Letter from California, admitted Feb. 2009, 1 pages.
Defendant's Exhibit F-4, Specification of Pagescan II, admitted Feb. 2009, 42 pages.
Defendant's Exhibit F-7, Supplemental Declaration, admitted Feb. 2009, 2 pages.
Defendant's Exhibit F-8, Declaration of Clubb, admitted Feb. 2009, 66 pages.
Defendant's Exhibit G, McMillan Patent 4,300,123, admitted Feb. 2009, 14 pages.
Defendant's Exhibit G-4, PA Assoc. Marketing Strategy, admitted Feb. 2009, 26 pages.
Defendant's Exhibit G-7, Work Order, admitted Feb. 2009, 1 pages.
Defendant's Exhibit G-8, Action Summary, admitted Feb. 2009, 6 pages.
Defendant's Exhibit G-9, Declaration of Childers, admitted Feb. 2009, 28 pages.
Defendant's Exhibit H, Patent 5,103,490, admitted Feb. 2009, 14 pages.
Defendant's Exhibit H-1, Test Report from Wyle, admitted Feb. 2009, 265 pages.
Defendant's Exhibit H-2, Data Sheet for Vision Series 8000, admitted Feb. 2009, 2 pages.
Defendant's Exhibit H-4, Pagescan 280 Fact Sheet, admitted Feb. 2009, 2 pages.
Defendant's Exhibit H-7, Equipment Order, admitted Feb. 2009, 1 pages.
Defendant's Exhibit H-8, Response to Action Summary, admitted Feb. 2009, 43 pages.
Defendant's Exhibit I, Patent No. 5,134,669, admitted Feb. 2009, 16 pages.
Defendant's Exhibit I-1, Wyle Leter, admitted Feb. 2009, 26 pages.
Defendant's Exhibit I-4, Letter from Hanna to Chung, admitted Feb. 2009, 2 pages.
Defendant's Exhibit I-9, Email from Martin to Global, admitted Feb. 2009, 2 pages.
Defendant's Exhibit J, Patent No. 5,248,872, admitted Feb. 2009, 13 pages.
Defendant's Exhibit K, Patent No. 6,250,548, admitted Feb. 2009, 54 pages.
Defendant's Exhibit K-1, Ballot Production Handbook, admitted Feb. 2009, 50 pages.
Defendant's Exhibit K-3, GEMS FEC Compliance Overview, admitted Feb. 2009, 107 pages.
Defendant's Exhibit K-8, Duty of Disclosure, admitted Feb. 2009, 14 pages.
Defendant's Exhibit K-11, San Diego County Contract, admitted Feb. 2009, 209 pages.
Defendant's Exhibit L-1, Model 100 Hardware Specification, admitted Feb. 2009, 106 pages.
Defendant's Exhibit L-2, GEMS System Software Specifications, admitted Feb. 2009, 154 pg.
Defendant's Exhibit L-3, Global Certification Compliance Summary, admitted Feb. 2009, 13 pgs.
Defendant's Exhibit L-7, Developer's Guide, admitted Feb. 2009, 125 pages.
Defendant's Exhibit M-1, Model 100 Software Specification, admitted Feb. 2009, 110 pages.
Defendant's Exhibit M-2, Email from Knecht, admitted Feb. 2009, 2 pages.
Defendant's Exhibit M-3, Product Proposal by Martin, admitted Feb. 2009, 24 pages.
Defendant's Exhibit M-8, Action Summary, admitted Feb. 2009, 8 pages.
Defendant's Exhibit N-2, Video of Highspeed Central Count, admitted Feb. 2009, 1 pages.
Defendant's Exhibit N-3, Review of Sacramento Election, admitted Feb. 2009, 8 pages.
Defendant's Exhibit N-8, Response to Action Summary, admitted Feb. 2009, 20 pages.
Defendant's Exhibit O-2, Software Source Code, admitted Feb. 2009, 11 pages.
Defendant's Exhibit O-3, User Manual for Scanner, admitted Feb. 2009, 68 pages.
Defendant's Exhibit O-6, Video Demo of AccuVote, admitted Feb. 2009, 1 pages.
Defendant's Exhibit O-8, Notice of Allowance, admitted Feb. 2009, 5 pages.
Defendant's Exhibit P-3, Listing of Time Tracking for Martin, admitted Feb. 2009, 11 pages.
Defendant's Exhibit R-9, Sacramento Ballot, admitted Feb. 2009, 3 pages.
Defendant's Exhibit R-11, Contract Report Sep. 27, 2001, admitted Feb. 2009, 2 pages.
Defendant's Exhibit T-3, Memorandum from Meehan, admitted Feb. 2009, 2 pages.
Defendant's Exhibit T-4, Cummings Patent Application, admitted Feb. 2009, 36 pages.
Defendant's Exhibit T-11, Email from Lancaster to Martin, admitted Feb. 2009, 1 pages.
Defendant's Exhibit U-1, Invoice for Dallas Co. TX, admitted Feb. 2009, 3 pages.
Defendant's Exhibit U-3, Memo from Dobson, admitted Feb. 2009, 2 pages.
Defendant's Exhibit U-4, Cummings Patent Application, admitted Feb. 2009, 29 pages.
Defendant's Exhibit U-11, Peripheral Dynamics Letter, admitted Feb. 2009, 12 pages.
Defendant's Exhibit V-2, Memo from Dean to Ensiminger, admitted Feb. 2009, 3 pages.
Defendant's Exhibit V-3, Manufacturing Request, admitted Feb. 2009, 5 pages.
Defendant's Exhibit V-11, Peripheral Dynamics Email, admitted Feb. 2009, 4 pages.
Defendant's Exhibit W-3, Peripheral Dynamics Invoice, admitted Feb. 2009, 2 pages.
Defendant's Exhibit W-5, Patent No. 4,813,708, admitted Feb. 2009, 8 pages.
Defendant's Exhibit W-11 Sample Ballot, admitted Feb. 2009, 6 pages.
Defendant's Exhibit X-2, Proposal from Global to Sacramento, admitted Feb. 2009, 9 pages.
Defendant's Exhibit X-3, Specifications for PageScan II, admitted Feb. 2009, 52 pages.
Defendant's Exhibit X-11, Dr. Singh's Invoices, admitted Feb. 2009, 29 pages.
Defendant's Exhibit Y-7, Cummings Patent Application, admitted Feb. 2009, 32 pages.
Defendant's Exhibit Y-11, Small Binder of PDI, admitted Feb. 2009, 71 pages.
Defendant's Exhibit Z-2, Email from Martin, admitted Feb. 2009, 4 pages.

Defendant's Exhibit Z-3, PageScan User Manual, admitted Feb. 2009, 7 pages.

Defendant's Exhibit Z-7, Cummings Patent Application, admitted Feb. 2009, 12 pages.

Order, Findings, and Conclusions on Inequitable Conduct, *Avante International Technology Corporation, Plaintiff,* v. *Premier Election Solutions, et al, Defendants*; United States Eastern District of Missouri Eastern Division: Case No. 4:06-CV-0978 TCM, Document 649, Mar. 17, 2009, 14 pages.

Order, Findings, and Conclusions on the Obviousness of the '944 and '313 Patents, *Avante International Technology Corporation, Plaintiff,* v. *Premier Election Solutions, et al, Defendants*; United States Eastern District of Missouri Eastern Division: Case No. 4:06-CV-0978 TCM, Document 650, Mar. 17, 2009, 6 pages.

Judgment, *Avante International Technology Corporation, Plaintiff,* v. *Premier Election Solutions, et al, Defendants*; United States Eastern District of Missouri Eastern Division: Case No. 4:06-CV-0978 TCM, Document 651, Mar. 17, 2009, 2 pages.

Plaintiffs Exhibit 198, VIDEO, admitted Feb. 2009.

Written Offer of Proof, *Avante International Technology Corporation, Plaintiff,* v. *Premier Election Solutions, et al, Defendants*; United States Eastern District of Missouri Eastern Division: Case No. 4:06-CV-978 TCM, Document 613, Feb. 9, 2009, 4 pages.

Defendants' Proposed Findings of Fact and Conclusions of Law Re Inequitable Conduct in the Prosecution of the '313 and '944 Patents, *Avante International Technology Corporation, Plaintiff,* v. *Premier Election Solutions, et al, Defendants*; United States Eastern District of Missouri Eastern Division: Case No. 4:06-CV-978 TCM, Document 615, Feb. 11, 2009, 12 pages.

Plaintiff Avante International Technology Corp.'s Proposed Findings of Fact and Conclusions of Law That There Was No Inequitable Conduct, *Avante International Technology Corporation, Plaintiff,* v. *Premier Election Solutions, et al, Defendants*; United States Eastern District of Missouri Eastern Division: Case No. 4:06-CV-978 TCM, Document 616, Feb. 11, 2009, 3 pages.

Plaintiff's Proposed Findings of Fact and Conclusions of Law That There Was No Inequitable Conduct, *Avante International Technology Corporation, Plaintiff,* v. *Premier Election Solutions, et al, Defendants*; United States Eastern District of Missouri Eastern Division: Case No. 4:06-CV-978 TCM, Document 616-2, Feb. 11, 2009, 13 pages.

Plaintiff's Combined Post-Trial Motion and Memorandum for Judgment as a Matter of Law, or, in the Alternative, for a New Trial, *Avante International Technology Corporation, Plaintiff,* v. *Premier Election Solutions, et al, Defendants*; United States Eastern District of Missouri Eastern Division: Case No. 4:06-CV-978 TCM, Document 642, Feb. 24, 2009, 23 pages.

Plaintiff's Unopposed Motion to Withdraw Plaintiff's Combined Post-Trial Motion and Memorandum for Judgment as a Matter of Law, or, In the Alternative, for a New Trial, *Avante International Technology Corporation, Plaintiff,* v. *Premier Election Solutions, et al, Defendants*; United States Eastern District of Missouri Eastern Division: Case No. 4:06-CV-978 TCM, Document 644, Feb. 26, 2009, 3 pages.

Defendants' Renewed Motion for Judgment as a Matter of Law or, in the Alternative, for a New Trial that the '944 and '323 Patents are Unenforceable, *Avante International Technology Corporation, Plaintiff,* v. *Premier Election Solutions, et al, Defendants*; United States Eastern District of Missouri Eastern Division: Case No. 4:06-CV-978 TCM, Document 661, Mar. 31, 2009, 2 pages.

Memorandum in Support of Defendants' Renewed Motion for Judgment as a Matter of Law or, in the Alternative, for a New Trial That the '944 and '313 Patents are Unenforceable, *Avante International Technology Corporation, Plaintiff,* v. *Premier Election Solutions, et al, Defendants*; United States Eastern District of Missouri Eastern Division: Case No. 4:06-CV-978 TCM, Document 662, Mar. 31, 2009, 14 pages.

Exhibit A, Transcript of Videotaped Deposition of Larry Hyer, *Avante International Technology Corporation, Plaintiff,* v. *Premier Election Solutions, et al, Defendants*; United States Eastern District of Missouri Eastern Division: Case No. 4:06-CV-978 TCM, Document 662-2, Mar. 31, 2009, 4 pages.

Exhibit B, Transcript of Videotaped Deposition of John W. Hanna, *Avante International Technology Corporation, Plaintiff,* v. *Premier Election Solutions, et al, Defendants*; United States Eastern District of Missouri Eastern Division: Case No. 4:06-CV-978 TCM, Document 662-3, Mar. 31, 2009, 4 pages.

Defendants' Motion for a Finding that the Case is Exceptional Under 35 U.S.C. § 285 and for Attorney Fees on Multiple Grounds, *Avante International Technology Corporation, Plaintiff,* v. *Premier Election Solutions, et al, Defendants*; United States Eastern District of Missouri Eastern Division: Case No. 4:06-CV-978 TCM, Document 664, Apr. 6, 2009, 3 pages.

Defendants' Memorandum in Support of Their Motion for a Finding that the Case is Exceptional Under 35 U.S.C. § 285 and for Attorney Fees on Multiple Grounds, *Avante International Technology Corporation, Plaintiff,* v. *Premier Election Solutions, et al, Defendants*; United States Eastern District of Missouri Eastern Division: Case No. 4:06-CV-978 TCM, Document 665, Apr. 6, 2009, 15 pages.

Exhibit 1, Letter of James A. Oliff, Feb. 9, 2007, *Avante International Technology Corporation, Plaintiff,* v. *Premier Election Solutions, et al, Defendants*; United States Eastern District of Missouri Eastern Division: Case No. 4:06-CV-978 TCM, Document 665-2, Apr. 6, 2009, 5 pages.

Exhibit 2, Transcript of Videotaped Deposition of Steve Bolton, *Avante International Technology Corporation, Plaintiff,* v. *Premier Election Solutions, et al, Defendants*; United States Eastern District of Missouri Eastern Division: Case No. 4:06-CV-978 TCM, Document 665-3, Apr. 6, 2009, 49 pages.

Exhibit 3, Transcript of Videotaped Deposition of Peter Martin, *Avante International Technology Corporation, Plaintiff,* v. *Premier Election Solutions, et al, Defendants*; United States Eastern District of Missouri Eastern Division: Case No. 4:06-CV-978 TCM, Document 665-4, Apr. 6, 2009, 37 pages.

Exhibit 4, Defendant Premier's Requests for Admission to Plaintiff, *Avante International Technology Corporation, Plaintiff,* v. *Premier Election Solutions, et al, Defendants*; United States Eastern District of Missouri Eastern Division: Case No. 4:06-CV-978 TCM, Document 665-5, Apr. 6, 2009, 7 pages.

Motion for Bill of Costs by Counter Claimaint Sequoia, *Avante International Technology Corporation, Plaintiff,* v. *Premier Election Solutions, et al, Defendants*; United States Eastern District of Missouri Eastern Division: Case No. 4:06-CV-978 TCM, Document 666, Apr. 6, 2009, 2 pages.

Motion for Bill of Costs by Premier Election Solutions, Inc., *Avante International Technology Corporation, Plaintiff,* v. *Premier Election Solutions, et al, Defendants*; United States Eastern District of Missouri Eastern Division: Case No. 4:06-CV-978 TCM, Document 667, Apr. 6, 2009, 2 pages.

Defendants' Joint Memorandum in Support of Defendant's Bill of Costs, *Avante International Technology Corporation, Plaintiff,* v. *Premier Election Solutions, et al, Defendants*; United States Eastern District of Missouri Eastern Division: Case No. 4:06-CV-978 TCM, Document 668, Apr. 6, 2009, 11 pages.

Defendants' Reply in Support of Renewed Motion for Judgment as a Matter of Law, or in the Alternative for a New Trial, that the '944 and '313 Patents are Unenforceable, *Avante International Technology Corporation, Plaintiff,* v. *Premier Election Solutions, et al, Defendants*; United States Eastern District of Missouri Eastern Division: Case No. 4:06-CV-978 TCM, Document 678 Apr. 20, 2009, 7 pages.

Intellectual Property Office of the People's Republic of China, "Search Report for Hong Kong Short-Term Patent Application No. 10103450.5", including a brief translation, Jun. 17, 2010, 6 pages.

Frontline Solutions, "RFID Standards Buoy Packaging", Jul. 2001, 3 pages.

Frontline Solutions, "Packagers Think Outside the Box", May 2001, 3 pages.

Frontline Solutions, "RFID Baggage Tracking Solution Helps Keep SFIA Secure", Jul. 2001, 4 pg.

Frontline Solutions, "Standard Response", Jul. 2001, 1 page.

Avante International Technology, Inc., "How Does Leads-Trakker Work to Enhance the Values for Exhibitors and Visitors?", 2002, 3 pages.

Leads-Trakker Web Pages, http://www.leads-trakker.com/Printed Nov. 18, 2002, 17 pages.

International Search Report, PCT/US01/42563, Sep. 18, 2002, 5 pages.
T. Costlow, "Computer Kiosk Expedites Voter Registration", IEEE Spectrum, Oct. 2002, 2 pgs.
AccuVote-TS, http://www.gesn.com/AccuVote-TS/accuvote-ts.html, Global Election Systems, Inc., Not Dated, © 2000, 4 pages.
NEDAP, "Voting System", © 2000, 4 pages.
Hart Intercivic, "eSlate Electronic Voting System", http://www.worldwideelection.com/GoveSlate.cfm, © 1998-2000, 2 pages.
Alan Dechert, "The Voter Certified Ballot", Granite Bay, CA, http://www.go2zero.com/voterform.html, Feb. 13, 2001, 15 pages.
Robert Wright, "Recasting the Voting Process", www.varbusiness.com, Mar. 5, 2001, 4 pages.
Rebecca Mercuri, "A Better Ballot Box?", IEEE Spectrum, Oct. 2002, pp. 46-50.
Michael Stanton, "The importance of Recounting Votes", http://www.notablesoftware.com/Press/electronic_voting_in_brasil.html, Nov. 13, 2000, 3 pg.
Bruce Schneier, "Voting and Technology", Crypto-Gram, http://www.notablesoftware.com/Press/Schneier.html, Dec. 15, 2000, 3 pages.
Holli Riebeek, "Brazil Holds All-Electronic National Election", Oct. 15, 2002, 1 page.
Mike He, Rogerio Almeida and Edson Gissoni, "National Semiconductor and Unisys Equip Brazil with New Voting Machines for Fast and Accurate Election Results in the Fall", National Semiconductor, http://www.national.com/news/item/0,735,757,00.html, May 6, 2002, 2 pages.
Peter G. Neumann, "Security Criteria for Electronic Voting", http://www.csl.sri.com/users/neumann/ncs93.html, © 1993, 7 pages.
E-mail message from: R. Mercuri [notable@mindspring.com] To: Clement Berard; plesko@simmonscooper.com, "Avante Patent 7036730 and infringement suit", Jul. 13, 2006, 4 pages.
Rebecca Mercuri, "Electronic Voting", http://web.archive.org/web20010201193800/http://www.notablesoftware.com/; updated Jan. 28, 2001; 11 pages.
Bruce Schneier, Crypto-Gram Newsletter, Dec. 15, 2000, http://www.counterpane.com; 17 pages (from www.schneier.com/crypto-gram-0012.html).
Rebecca Mercuri, Explanation of Voter-Verified Ballot Systems, The Risks Digest, ACM Comm. on Computers & Public Policy, vol. 22: 17, Jul. 24, 2002, 15:54:47-0400, 2 pages.
Yahoo Finance, Press Release, Inventor of Electronic Voting Verification System Takes Industry Giants to Court for Patent Infringement; Wed., Jul. 12, 2006 11:19 am, 2 pages.
Rebecca Mercuri, "Why Computers Shouldn't Count Votes", Princeton ACM/IEEE Computer Society Chapters, Nov. 2000 Joint Meeting, Thurs. Nov. 16, 2000, 8:00 pm, 2 pages.
Rebecca Mercuri, "Electronic Vote Tabulation Checks & Balances", Dissertation, 2001, Presented to Faculty of Univ. of Pennsylvania, 235 pages.
Rebecca Mercuri, The FEC Proposed Voting Systems Standard Update, A Detailed Comment, Submitted to Fed. Election Commission, Sep. 10, 2001, FEC Not Sep. 2001. vol. 66, No. 132, 8 pages.
Terri Gauchat, [Abstract] Computer Assisted Vote Tallying, An Overview of the Problems, Implications, and Solutions, Univ. of Waterloo, Term Res Project, Apr. 11, 1991, 14 pages.
Document submitted to Patent Office, Archive Date Jul. 11, 2000, ACCUVote-TS, http://web.archive.org/web/20000711160152/www.globalelection.com., 5 pages.
AccuVote TS reference, Archive Date Oct. 12, 1999, http://web.archive.org/web/19991012074217/www.gesn.com/Product..., 3 pages.
Roy G. Saltman, Accuracy, Integrity, and Security in Computerized Vote-Tallying, Computer Science & Technology, NBS Special Pub. 500-158, Aug. 1998, 109 pages.
Michael Ian Shamos, CFP'93-Electronic Voting-Evaluating the Threat, Mar. 1993, CPSR, http://web.archive.org/web20011224071421/www.cpsr.org/conference.., 9 pages.
Description of AccuVote OS, Archived Oct. 12, 1999, "The AccuVote" http://web.archive.org/web/19991012093810/www.gesn.com/Product. 4 pages.

Description of GEMS, Archived Nov. 9, 1999, "Global Election Management System," http://web.archive.org/web/19991109003219/www.gesn.com/Product.. 5 pages.
Excerpts from current AccuVote TSX Pollworkers Guide, AccuVote-TSX Pollworker's Guide, DIEBOLD Election Systems, Revision 5.0, Mar. 22, 2005, 3 pages.
CALTECH-MIT, "Voting What is What Could Be", Jul. 2001, 95 pages.
Rebecca Mercuri, "Rebecca Mercuri's Statement on Electronic Voting", http://www.notablesoftware.com/RMstatement.html, © 2001, 2 pages.
Rebecca Mercuri, "Electronic Voting", http://www.notablesoftware.com/evote.html, Oct. 15, 2001, 8 pages.
Bruce Schneier, "Voting and Technology," from Crypto-Gram Newsletter, Dec. 15, 2000, http://www.notablesoftware.com/press/schneier.html; 3 pages.
Rebecca Mercuri, *Voting-Machine Risks*, Nov. 11, 1992, 2 pages.
*The Risks Digest*, vol. 2, Issue 22, Mar. 5, 1986, 4 pages, includes inter alia: Michael McGlaughlin, *Voting Receipt*, http://catless.ncl.ac.uk/Risks/2.22.html Tom Benson, *Computerized Voting*, http://catless.ncl.ac.uk/Risks/2.22.html.
*The Risks Digest*, vol. 2, Issue 24, Mar. 8, 1986, 4 pages, includes inter alia: Kurt Hyde, *Progress Report on Computerized Voting*, http://catless.ncl.ac.uk/Risks/2.24.html.
*The Risks Digest*, vol. 10, Issue 78, Jan. 22, 1991, 6 pages, includes inter alia: Evan Ravitz, *Voting by Phone*, http://catless.ncl.ac.uk/Risks/10.78.html.
Strini Giorgio, *Data Capture and Processing Device, Particularly For Voting and Associated Polling*, Abstract of IT No. 1234224, Patent for Industrial Invention, Date: May 6, 1992, 1 page.
Bruce Schneier, *Applied Cryptography*, Second Edition © 1996, Cover and title pages, Chapter 6, pp. 125-147, 170-175 185-187 and 587.
Rebecca Mercuri, Physical Verifyability of Computer Systems, *Secure Networks*, Proceedings: Fifth International Computer Virus & Security Conference, 1992, 11 pages.
*The Risks Digest*, vol. 2, Issue 23, Mar. 6, 1986, 5 pages.
*The Risks Digest*, vol. 16, Issue 52, Oct. 31, 1994, 11 pages.
*The Risks Digest*, vol. 21, Issue 10, Nov. 7, 2000, 10 pages.
*The Risks Digest*, vol. 22, Issue 66, Apr. 1, 2003, 11 pages.
*The Risks Digest*, vol. 22, Issue 54, Feb. 3, 2003, 11 pages.
Granite Creek Technology Incorporated Report No. OR9202, "Certification Tests of the OPTECH IV-C Model 400 Central Ballot Tabulator", Jul. 7, 1992, 14 pages (S003596-S003609).
Granite Creek Technology Incorporated Report No. KS9305, "Certification Tests of the OPSCAN 5/TeamWork Electronic Voting System", Dec. 15, 1993, 10 Pages (S003656-S003655).
"OTECH IV-C Central Ballot Counter Operator's Manual", Jul. 29, 1990, 46 Pages (S003610-S003655).
Federal Election Commission, "Performance and Test Standards for Punchcard, Marksense, and Direct Recording Electronic Voting Systems" Jan. 1990, 204 Pages.
CJvK Translation 10206 It:Eng Patent Application No. 1234224; prepared May 6, 1992; 22 pages.
A. Riera, J. Borrell, J. Rifa, "An uncoercible verifiable electronic voting protocol," Proceedings of IFIP SEC '98, Online, Sep. 4, 1998, XP002272039, 10 Pages.
D. Dill, R. Mercuri, P. Neumann, D. Wallach, "Frequently Asked Questions about DRE Voting Systems", http://www.verifiedvoting.org/drefag.asp, printed Aug. 24, 2004, 7 pages.
The Open Voting Consortium, "Frequently Asked Questions (FAQ)", © 2004 http://www.openvotingconsortium.org/faq.html, printed Aug. 24, 2004, 17 pages.
Verified Voting Foundation, "E-Voting Misconceptions", http://www.verifiedvoting.org/article.asp?id+2609, printed Aug. 24, 2004, 3 pages.
A. Dechert, "Statement at Utah State Capital", Jul. 13, 2004, http://www.openvotingconsortium.org/ad/alan-ut-7-13.html, printed Aug. 24, 2004, 2 pages.
M. Shamos, "Paper v. Electronic Voting Records—An Assessment", Apr. 2004, http://euro.ecom.cmu.edu/people/faculty/mshamos/paper.htm, printed Aug. 24, 2004, 20 pages.

A. Dechert, "OVC Response to Paper v. Electronic Voting Records—An Assessment, by Michael Ian Shamos", Jul. 30, 3004, http://gnosis.python-hosting.com/voting-project/July.2004/0240.html, printed Aug. 24, 2004, 6 pages.
K. Zetter, "California Bans E-Vote Machines", Apr. 30, 2004, http://www.wirednew.com/news/evote/0,2645,63298,00.html?tw=wn_story_page_prev2, printed Jun. 22, 2004, 3 pages.
Associated Press "Prototype E-Vote Printer Fails to Satisfy", © 2005, Feb. 3, 2005, 2 pages, http://start.earthlink.net/channel/news/print?guid=20050203/4201afd0_3ca6_15526200502 . . . .
R. Mercuri, "Computer Security Act and Computerized Voting Systems", Nov. 27, 1992, Risks Digest vol. 14: Issue 11, pp. 3-4.
Westinghouse DataScore Systems, "Optical Mark Reader Systems", no date marked; prior to Mar. 30, 2007; 13 pages.
Tallone, "Business Point of View: A Better Voting System", ca. 2004, 2 pages.
Election Systems & Software, "Integrated Hardware Solutions", © 2001 (on last sheet, but date "Oct. 6, 2004" on sheet AV-17423), 14 pages.
National Computer Systems, "Precept Image System", © 1991 or 1992, 10 pages.
*The Risks Digest*, vol. 21: Issue 23; Jan. 30, 2001; 12 pages.
Global Election Systems, Inc., "AccuVote-TS", http://www.archive.org/web/20000830141622/http:/www.gesn.com/AccuVote-TS/accuvot..., Web Archive date Aug. 30, 2000, 4 pages.
VoteHere, Inc., "November Election in Arizona and California will be first-ever cooperative trial of online voting", "VoteHere Platinum" and "VoteHere Gold", http://web.archive.org/web/20001019071003/votehere.net/VH-Content-v2.0/default.htm, Web Archive date Oct. 19, 2000, 5 pages.
Diebold Election Systems, "Election Solutions Diebold Election Systems Solutions", "Election Solutions AccuVote-TS", "Election Solutions AccuVote-OS", and "Election Solutions Global Election Management System—GEMS", http://web.archive.org/web/20020811050628/www.diebold.com/solutions/election/solutio..., Web Archive date Oct. 3, 2002, 10 pages.
Peripheral Dynamics, Inc., "PAGESCAN II", no date marked; prior to Mar. 29, 2007; 2 pages.
Avante International Technology, Inc., "Optical Vote-Trakker: A "Mark-Sense" Absentee & Precinct-Based Voting System that Minimizes Both Voter and System Errors", Jan. 2004, 7pg.
European Patent Office, "Communication Pursuant to Article 96(2) EPC", Application No. 01273930.6, May 8, 2004, 10 pages.
European Patent Office, "Communication Pursuant to Article 96(2) EPC", Application No. 01273930.6, Jun. 20, 2005, 10 pages.
European Patent Office, Communication, Application No. 01273930.6, Oct. 15, 2004, 8 pages.
D. Dixon, "Technology & the Polls: Rebecca Mercuri", Nov. 15, 2000, 8 pages.
Internet Archive Wayback Machine, VoteHere.net, The Secure Internet Voting Company, http://web.archive.org/web/*/http://votehere, pp. HL00068-HL00092, allegedly Oct. 19, 2000, printed May 8, 2007, 25 pages.
Avante International Technology, Inc., "Optical VOTE-TRAKKER™: A "Mark-Sense" Absentee & Precinct Based Voting System that Minimizes Both Voter and System Errors", link available at htto://www.vote-trakker.com/optical.html, Jan. 2004, 10 pages.
Avante International Technology, Inc., "Avante Optical VOTE-TRAKKER™", © 2001-2004, 2 pages, printed Jun. 11, 2007.
Avante International Technology, Inc., "Avante VOTE-TRAKKER™"and "Avante VOTE-TRAKKER™ Overview", Mar. 16, 2004, 6 pages, printed Jun. 11, 2007.
Avante International Technology, Inc., "Avante VOTE-TRAKKER™ EVC308-SPR"and "Avante VOTE-TRAKKER™ EVC308-SPR-FF", © 2001-2004, 6 pages, printed Jun. 11, 2007.
Avante International Technology, Inc., "Accessible Voting Integrating the Touch-Screen Accessibility of DRE System with the Optical Scanning Paper Ballots", © 2001-2004, certain parts updated Mar. 16, 2004, Apr. 8, 2004 and May 18, 2004, 17 pages, printed Jun. 11, 2007.
Federal Election Commission, "Voting Systems Performance and Test Standards" Overview and vols. I & II, 2002, 307 pages.
Ramin Safarl-Foroushani, "Form Registration: A Computer Vision Approach", © 1997, 121 pages.
Ashraf Nasr Sayed, "Extraction and Photogrammetric Exploitation of Features in Digital Images", Aug. 1990, 263 pages.
Scientific Translation Services, "*Novel Voting Process and Means for Carrying Out Same*," [EPO 0 419 335 A1] English Translation of col. 1-10, (Translated May 2004), 8 pages.
Benaloh J et al, "Receipt-Free Secret-Ballot Elections (Extended Abstract)," Proceedings of the Annual ACM Symposium on the Theory of Computing, XX, XX, 1994, pp. 544-551, XP002099996.
Roy G. Saltman, "Effective Use of Computing Technology in Vote-Tallying", Mar. 1975, 139 pgs.
Douglas Jones, "A Brief Illustrated History of Voting", 2001, 18 pages.
North American Professional Technologies, "Vote Tally System Ballot Production Guide", Jun. 1989, 16 pages.
Michael I. Shamos, "American Information Systems, AIS 115 and 315 Vote Tabulation Systems, An Evaluation", Dec. 1989, 9 pages.
Michael I. Shamos, "American Information Systems, AIS 150 and 550 Mark-Sense Vote Tabulation Systems and Election Reporting System (ERS), An Evaluation", Mar. 1994, 5 pages.
Michael I. Shamos, "Business Records Corporation, Optech IV-C Model 200 Mark-Sense Central Tabulation Unit, An Evaluation", Nov. 1991, 8 pages.
Michael I. Shamos, "American Information Systems, AIS 315 Ballot Counter, An Evaluation", Nov. 1983, 5 pages.
Michael I. Shamos, "The Sequoia Pacific Datavote System, An Evaluation", Jun. 1984, 7 pages.
Michael I. Shamos, "Shoup Corporation, Shouptronic Direct Recording Electronic Voting System, An Evaluation", Jul. 1991, 3 pages.
American Information Systems, Inc., AIS Model 150 Central Ballot Scanner Operator's Manual Version 5.6.1.7, © 1997, Apr. 1997, 64 pages.
Peripheral Dynamics, Inc., "Manufacturing Request", Oct. 3, 2001, 1 page.
Peripheral Dynamics, Inc., "Specification No. 3-1308-7071D for Peripheral Dynamics, Inc., Pagescan II Full-Page Image Scanner", Sep. 6, 2000, 52 pages.
Peripheral Dynamics, Inc., "SlipEdit User Manual No. 3-1305-7034B", Undated, 5 pages.
Ltr. to Paul Lesko, Esq. Jun. 28, 2006, Re: U.S. Appl. No. 10/255,348, "Electronic Voting Apparatus, System and Method", From Nancy L. Reeves, Walker & Jocke, 5 pages.
Diebold Election Systems, Inc.'s Invalidity Contentions for the '944 and '730 Patents, *Avante International Technology Corporation, Plaintiff*, v. *Diebold Election Systems, et al, Defendants*; United States Eastern District of Missouri Eastern Division: Case No. 4:06-cv-00978 TCM, Nov. 28, 2006, 71 pages.
Defendant Election Systems and Software, Inc.'s Preliminary Invalidity Contentions, *Avante International Technology Corporation, Plaintiff*, v. *Diebold Election Systems, et al, Defendants*; United States Eastern District of Missouri Eastern Division: Case No. 4:06-cv-00978 TCM, Nov. 30, 2006 , 34 pages.
Sequoia Voting Systems' Preliminary Invalidity Contentions, *Avante International Technology Corporation, Plaintiff*, v. *Diebold Election Systems, et al, Defendants*; United States Eastern District of Missouri Eastern Division: Case No. 4:06-cv-00978 TCM, Nov. 28, 2006, 46 pages.
Letter, Paul A. Lesko, (Simons Cooper) to Clement Berard, "*Avante International Technology Corporation* vs. *Diebold Election Software et al*, Cause No. 4:06-cv-00978 TCM" dated Dec. 5, 2006, 2 pages.
Defendant Election Systems & Software, Inc.'s Preliminary Invalidity Contentions for U.S. Patent No. 7,077,313, *Avante International Technology Corporation, Plaintiff*, v. *Diebold Election Systems, et al, Defendants*; United States Eastern District of Missouri Eastern Division: Case No. 4:06-cv-00978 TCM, Mar. 2, 2007, 22 Pages.
Sequoia Voting System's Preliminary Invalidity Contentions for U.S. Patent No. 7,077,313, *Avante International Technology Corporation, Plaintiff*, v. *Diebold Election Systems, et al, Defendants*; United States Eastern District of Missouri Eastern Division: Case No. 4:06-cv-00978 TCM, Mar. 2, 2007, 34 Pages.

Diebold Election Systems, Inc.'s Invalidity Contentions for the '313 Patent, *Avante International Technology Corporation, Plaintiff*, v. *Diebold Election Systems, et al, Defendants*; United States Eastern District of Missouri Eastern Division: Case No. 4:06-cv-00978 TCM, Mar. 5, 2007, 26pg.

Defendants' Preliminary Claim Construction and Preliminary Identification of Extrinsic Evidence, *Avante International Technology Corporation, Plaintiff*, v. *Diebold Election Systems, et al, Defendants*; United States Eastern District of Missouri Eastern Division: Case No. 4:06-cv-00978 TCM, Apr. 17, 2007, 3 pages.

Defendants' Proposed Construction For 730 Patent, *Avante International Technology Corporation, Plaintiff*, v. *Diebold Election Systems, et al, Defendants*; United States Eastern District of Missouri Eastern Division: Case No. 4:06-cv-00978 TCM, Apr. 17, 2007, 23 pages.

Defendants' Proposed Construction For '944 Patent, *Avante International Technology Corporation, Plaintiff*, v. *Diebold Election Systems, et al, Defendants*; United States Eastern District of Missouri Eastern Division: Case No. 4:06-cv-00978 TCM, Apr. 17, 2007, 17 pages.

Defendants' Proposed Construction for '313 Patent, *Avante International Technology Corporation, Plaintiff*, v. *Diebold Election Systems, et al, Defendants*; United States Eastern District of Missouri Eastern Division: Case No. 4:06-cv-00978 TCM, Apr. 17, 2007, 6 pages.

Defendants' Initial Claim Construction Brief, *Avante International Technology Corporation, Plaintiff*, v. *Diebold Election Systems, et al, Defendants*; United States Eastern District of Missouri Eastern Division: Case No. 4:06-cv-00978 TCM, May 8, 2007, Document 161, 245 pages.

Motion for Leave to File Amended Counterclaim and "Amended Answer and Counterclaim of Diebold Election Systems", *Avante International Technology Corporation, Plaintiff*, v. *Diebold Election Systems, et al, Defendants*; United States Eastern District of Missouri Eastern Division: Case No. 4:06-cv-00978 TCM, May 14, 2007, Document 168, 40 pages.

Defendant Election Systems & Software, Inc's Motion for Leave to File First Amended Answer to Plaintiff's Third Amended Complaint and Memorandum of Law in Support of Motion and First Amended Answer of Election Systems & Software, Inc. To Plaintiff's Third Amended Complaint and Amended Counterclaim of Election Systems & Software, Inc., *Avante International Technology Corporation, Plaintiff*, v. *Diebold Election Systems, et al, Defendants*; United States Eastern District of Missouri Eastern Division: Case No. 4:06-cv-00978 TCM, May 14, 2007, Document 169, 30 pages.

Defendant Sequoia Voting Systems' Motion for Leave to Amend Its Answer, Affirmative Defenses and Counterclaims to State Additional Facts Supporting Its Counterclaim for Inequitable Conduct and Amended Answer, Affirmative Defenses and Counterclaims of Sequoia Voting Systems, *Avante International Technology Corporation, Plaintiff*, v. *Diebold Election Systems, et al, Defendants*; United States Eastern District of Missouri Eastern Division: Case No. 4:06-cv-00978 TCM, May 14, 2007, Document 170, 35 pages.

Defendants' Response to Plaintiff Avante's Claim Construction Brief, *Avante International Technology Corporation, Plaintiff*, v. *Diebold Election Systems, et al, Defendants*; United States Eastern District of Missouri Eastern Division: Case No. 4:06-cv-00978 TCM, May 21, 2007, Document 179, 64 pages.

Joint Claim Construction and Prehearing Statement, *Avante International Technology Corporation, Plaintiff*, v. *Diebold Election Systems, et al, Defendants*; United States Eastern District of Missouri Eastern Division: Case No. 4:06-cv-00978 TCM, Apr. 24, 2007, DN 150, 63pg.

Motion For Partial Summary Judgment, *Avante International Technology Corporation, Plaintiff*, v. *Diebold Election Systems, et al, Defendants*; United States Eastern District of Missouri Eastern Division: Case No. 4:06-cv-00978 TCM, Jun. 15, 2007, Document 197, 3 pages.

Memorandum In Support of Election Systems & Software Inc.'s Motion for Partial Summary Judgment of Invalidity of Certain Claims of the '944 Patent (with Exhibits), *Avante International Technology Corporation, Plaintiff*, v. *Diebold Election Systems, et al, Defendants*; United States Eastern District of Missouri Eastern Division: Case No. 4:06-cv-00978 TCM, Jun. 15, 2007, Document 198, 34 pages.

Motion for Leave to File Suggestions In Support of Defendant Election Systems & Software Inc.'s Motion for Partial Summary Judgment and Diebold Election Systems Suggestions In Support of Defendant Election Systems & Software Inc. Motion for Partial Summary Judgment of Invalidity of Certain Claims of the '944 Patent (with Exhibit), *Avante International Technology Corporation, Plaintiff*, v. *Diebold Election Systems, et al, Defendants*; United States Eastern District of Missouri Eastern Division: Case No. 4:06-cv-00978 TCM, Aug. 1, 2007, Document 259, 171 pages.

Plaintiff's Opposition to Election Systems & Software Inc.'s Motion for Partial Summary Judgment of Invalidity of Certain Claims of the '944 Patent, *Avante International Technology Corporation, Plaintiff*, v. *Diebold Election Systems, et al, Defendants*; United States Eastern District of Missouri Eastern Division: Case No. 4:06-cv-00978 TCM, Aug. 6, 2007, Document 266, 204 pages.

Memorandum and Order on Claim Construction, *Avante International Technology Corporation, Plaintiff*, v. *Diebold Election Systems, et al, Defendants*; United States Eastern District of Missouri Eastern Division: Case No. 4:06-cv-00978 TCM, Aug. 20, 2007, Document 276, 50 pages.

Defendant Hart Intercivic, Inc.'s Preliminary Invalidity Contentions for U.S. Patent Nos. 6,892,944, 7,036,730, and 7,077,313, *Avante International Technology Corporation, Plaintiff and Counter-Defendant*, v. *Hart Intercivic, Inc., Defendant and Counter-Plaintiff*; United States Southern District of Illinois East St. Louis Division: Case No. 3:07-cv-00169-DRH-CJP, Sep. 10, 2007, 49 pages.

Content Listing of Hart Intercivic's Invalidity Contentions, Exhibit F (disk), *Avante International Technology Corporation, Plaintiff and Counter-Defendant*, v. *Hart Intercivic, Inc., Defendant and Counter-Plaintiff*; United States Southern District of Illinois East St. Louis Division: Case No. 3:07-cv-00169-DRH-CJP, Sep. 10, 2007, 3 pages.

Sequoia Voting Systems' Updated Invalidity Contentions, *Avante International Technology Corporation, Plaintiff*, v. *Premier Election Solutions, et al, Defendants*; United States Eastern District of Missouri Eastern Division: Case No. 4:06-cv-00978 TCM, Oct. 22, 2007, 42 pages.

Premier Election Solution, Inc.'s Invalidity Contentions for the '944 and '313 Patents, *Avante International Technology Corporation, Plaintiff*, v. *Premier Election Solutions, et al, Defendants*; United States Eastern District of Missouri Eastern Division: Case No. 4:06-cv-00978 TCM, Oct. 23, 2007, 39 pages.

Defendant Election Systems & Software, Inc.'s Updated Invalidity Contentions, *Avante International Technology Corporation, Plaintiff*, v. *Premier Election Solutions, et al, Defendants*; United States Eastern District of Missouri Eastern Division: Case No. 4:06-cv-00978 TCM, Oct. 22, 2007, 32 pages.

Defendant's Premier Election Solutions, Inc. And Election Systems & Software, Inc.'s Memorandum of Law in Support of its Motion for Summary Judgement of Non-Infringement on Claims 26-28, 30 and 49-51 of U.S. Patent No. 6,892,944, *Avante International Technology Corporation, Plaintiff*, v. *Premier Election Solutions, et al, Defendants*; United States Eastern District of Missouri Eastern Division: Case No. 4:06-cv-00978 TCM, Document 334, Nov. 2, 2007, 14 pages.

Memorandum in Support of Defendants' Joint Motion for Summary Judgement of Invalidity of Claims 26-28, 30 and 49-51 of U.S. Patent No. 6,892,944, *Avante International Technology Corporation, Plaintiff*, v. *Premier Election Solutions, et al, Defendants*; United States Eastern District of Missouri Eastern Division: Case No. 4:06-cv-00978 TCM, Document 337, Nov. 2, 2007, 20 pages.

Memorandum in Support of Defendants' Joint Motion for Summary Judgement of Invalidity of the Asserted Claims from U.S. Patent Nos. 6,892,944 and 7,077,313 Under 35 U.S.C. §§ 102 and 103, *Avante International Technology Corporation, Plaintiff*, v. *Premier Election Solutions, et al, Defendants*; United States Eastern District of Missouri Eastern Division: Case No. 4:06-cv-00978 TCM, Document 339, Nov. 2, 2007, 26 pages.

Statement of Uncontroverted Material Facts in Support of Defendants' Joint Motion for Summary Judgment that U.S. Patent Nos.

6,892,944 and 7,077,313 Are Invalid Under 35 U.S.C. §§ 102 and 103, *Avante International Technology Corporation, Plaintiff*, v. *Premier Election Solutions, et al, Defendants*; United States Eastern District of Missouri Eastern Division: Case No. 4:06-cv-00978 TCM, Document 340, Nov. 2, 2007, 192 pages.

Statement of Uncontroverted Material Facts in Support of Defendants' Election Systems and Software Inc. and Premier Election Solutions, Inc.'s Motion for Summary Judgment of Non-Infringement of Claims 26-28, 30 and 49-51 of U.S. Patent 6,892,944, *Avante International Technology Corporation, Plaintiff*, v. *Premier Election Solutions, et al, Defendants*; United States Eastern District of Missouri Eastern Division: Case No. 4:06CV00978 TCM, Document 333, Nov. 2, 2007, 29 pages.

Statement of Uncontroverted Material Facts in Support of Defendants' Joint Motion for Summary Judgment of Invalidity of Claims 26-28, 30 and 49-51 of U.S. Patent No. 6,892,944, *Avante International Technology Corporation, Plaintiff*, v. *Premier Election Solutions, et al, Defendants*; United States Eastern District of Missouri Eastern Division: Case No. 4:06CV00978 TCM, Document 336, Nov. 2, 2007, 95 pages.

Motion for Summary Judgment of Invalidity of the Asserted Claims from U.S. Patent Nos. 6,892,944, and 7,077,313 Under 35 U.S.C. §§ 102 and 103, *Avante International Technology Corporation, Plaintiff*, v. *Premier Election Solutions, et al, Defendants*; United States Eastern District of Missouri Eastern Division: Case No. 4:06CV00978 TCM, Document 338, Nov. 2, 2007, 3 pages.

Declaration of Michael I. Shamos, Ph.D., J.D. in Support of Defendants' Joint Motion for Summary Judgment that U.S. Patent Nos. 6,892,944, and 7,077,313 are Invalid Under 35 U.S.C. §§ 102(b) and 103(a), *Avante International Technology Corporation, Plaintiff*, v. *Premier Election Solutions, et al, Defendants*; United States Eastern District of Missouri Eastern Division: Case No. 4:06CV00978 TCM, Document 342, Nov. 2, 2007, 332 pages.

Plaintiff Avante International Technology, Corporation's Memorandum in Opposition to Defendants' Joint Motion for Summary Judgment of Invalidity of Claims 26-28, 30 and 49-51 of U.S. Patent No. 6,892,944, *Avante International Technology Corporation, Plaintiff*, v. *Premier Election Solutions, et al, Defendants*; United States Eastern District of Missouri Eastern Division: Case No. 4:06CV00978 TCM, Document 388, Dec. 14, 2007, 180 pages.

Defendants' Response to Plaintiff Avante International Technology Corporation's Statement of Uncontroverted Facts in Support of its Motion for Summary Judgment that U.S. Patent Nos. 6,892,944 and 7,077,313 are not Invalid, in View of Defendants' References or 35 U.S.C. §112 Arguments, *Avante International Technology Corporation, Plaintiff*, v. *Premier Election Solutions, et al, Defendants*; United States Eastern District of Missouri Eastern Division: Case No. 4:06CV00978 TCM, Document 395, Dec. 14, 2007, 90 pages.

Premier Voting Solutions, Inc.'s Memorandum in Opposition to Avante International Technology Corporation's Motion for Summary Judgment that Premier Election Solutions, Inc.'s Equipment Infringes U.S. Patent Nos. 6,892,944 and 7,077,313, *Avante International Technology Corporation, Plaintiff*, v. *Premier Election Solutions, et al, Defendants*; United States Eastern District of Missouri Eastern Division: Case No. 4:06CV00978 TCM, Document 396, Dec. 14, 2007, 10 pages.

Sequoia Voting Systems' Opposition to Plaintiff's Motion for Summary Judgment that Sequoia's Equipment Infringes U.S. Patent Nos. 6,892,944 and 7,077,313, *Avante International Technology Corporation, Plaintiff*, v. *Premier Election Solutions, et al, Defendants*; United States Eastern District of Missouri Eastern Division: Case No. 4:06CV00978 TCM, Document 417, Jan. 9, 2008, 151 pages.

Avante International Technology Corporation's Reply in Support of its Motion for Summary Judgment that Diebold Election Systems, Inc.'s Equipment Infringes U.S. Patent Nos. 6,892,944 and 7,077,313, *Avante International Technology Corporation, Plaintiff*, v. *Premier Election Solutions, et al, Defendants*; United States Eastern District of Missouri Eastern Division: Case No. 4:06CV00978 TCM, Document 425, Jan. 11, 2008, 14 pages.

Defendants' Reply in Support of Their Joint Motion for Summary Judgment of Invalidity of Claims 26-28, 30 and 49-51 of U.S. Patent No. 6,892,944 Based on 35 U.S.C. §112 ¶ 1, *Avante International Technology Corporation, Plaintiff*, v. *Premier Election Solutions, et al, Defendants*; United States Eastern District of Missouri Eastern Division: Case No. 4:06CV00978 TCM, Document 428, Jan. 11, 2008, 101 pages.

Defendants Premier Election Solutions, Inc. and Election Systems & Software, Inc.'s Reply in Support of Their Motion for Summary Judgment of Non-Infringement of Claims 26-28, 30 and 49-51 of U.S. Patent No. 6,892,944, *Avante International Technology Corporation, Plaintiff*, v. *Premier Election Solutions, et al, Defendants*; United States Eastern District of Missouri Eastern Division: Case No. 4:06CV00978 TCM, Document 429, Jan. 11, 2008, 17 pages.

Defendant Hart Intercivic, Inc.'s Response to Plaintiff's Claim Construction Brief for U.S. Patent Nos. 6,892,944, 7,036,730, and 7,077,313, *Avante International Technology, Inc., Plaintiff*, v. *Hart Intercivic, Inc., Defendant*; United States Southern District of Illinois East St. Louis Division: Case No. 3:07-cv-00169-DRH-CJP, Document 58, Feb. 1, 2008, 304 pgs.

Avante International Technology, Inc.'s Reply in Support of its Claim Construction Brief for U.S. Patent No. 7,036,730, U.S. Patent No. 6,892,944, and U.S. Patent No. 7,077,313, *Avante International Technology, Inc., Plaintiff*, v. *Hart Intercivic, Inc., Defendant*; United States Southern District of Illinois East St. Louis Division: Case No. 3:07-cv-00169-DRH-CJP, Document 60, Feb. 8, 2008, 71 pgs.

Avante International Technology, Inc.'s Claim Construction Brief for U.S. Patent No. 7,036,730, U.S. Patent No. 6,892,944, and U.S. Patent No. 7,077,313, *Avante International Technology, Inc., Plaintiff*, v. *Hart Intercivic, Inc., Defendant*; United States Southern District of Illinois East St. Louis Division: Case No. 3:07-cv-00169-DRH-CJP, Document 57, Jan. 18, 2008, 364 pgs.

Declaration of Peter G. Martin Filed in Support of Defendants' Joint Motion for Summary Judgment of Invalidity of the Asserted Claims from U.S. Patent Nos. 6,892,944 and 7,077,313 Under 35 U.S.C. §§ 102 and 103, *Avante International Technology Corporation, Plaintiff*, v. *Premier Election Solutions, et al, Defendants*; United States Eastern District of Missouri Eastern Division: Case No. 4:06CV00978 TCM, Document 341, Nov. 2, 2007, 105 pages.

Defendants' Memorandum in Opposition to Avante International Technology Corporation's Motion for Summary Judgment that U.S. Patent Nos. 6,892,944 and 7,077,313 Are Not Invalid In View of Defendants' References or 35 U.S.C. § 112 Arguments, *Avante International Technology Corporation, Plaintiff*, v. *Premier Voting Solutions, Inc., et al, Defendants*; United States Eastern District of Missouri Eastern Division: Case No. 4:06CV00978 TCM, Document 394, Dec. 14, 2007, 199 pages.

Defendant Premier Voting Solutions, Inc.'s Response to Statement of Uncontroverted Facts in Support of Avante International Technology Corporation's Motion for Summary Judgment that Premier Voting Solutions, Inc. Equipment Infringes U.S. Patent Nos. 6,892,944 and 7,077,313 and Additional Facts In Support of Its Opposition to Avante's Motion for Summary Judgement, *Avante International Technology Corporation, Plaintiff*, v. *Premier Voting Solutions, Inc., et al, Defendants*; United States Eastern District of Missouri Eastern Division: Case No. 4:06CV00978 TCM, Document 399, Dec. 15, 2007, 197 pgs.

Defendants' Response to Avante International Technology Corporation's Statement of Material Facts In Support of Its Opposition to Defendants' Joint Motion for Summary Judgment That U.S. Patent Nos. 6,892,944 and 7,077,313 Are Invalid Under 35 U.S.C. §§ 102 and 103, *Avante International Technology Corporation, Plaintiff*, v. *Premier Voting Solutions, et al, Defendants*; United States Eastern District of Missouri Eastern Division: Case No. 4:06CV00978 TCM, Document 430, Jan. 11, 2008, 68 pages.

Defendants' Reply In Support of Their Joint Motion for Summary Judgment of Invalidity of the Asserted Claims From U.S. Patent Nos. 6,892,944 and 7,077,313 Are Invalid Under 35 U.S.C. §§ 102 and 103, *Avante International Technology Corporation, Plaintiff*, v. *Premier Election Solutions, et al, Defendants*; United States Eastern District of Missouri Eastern Division: Case No. 4:06CV00978 TCM, Document 431, Jan. 11, 2008, 66 pages.

Notice of Allowance of U.S. Appl. No. 11/709,449 which has Bearing on Pending Summary Judgement Motions, *Avante International Technology Corporation, Plaintiff*, v. *Premier Voting Solutions, et al,*

*Defendants*; United States Eastern District of Missouri Eastern Division: Case No. 4:06CV00978 TCM, Document 467, Mar. 18, 2008, 4 pages.

Defendants' Memorandum Regarding Plaintiff's Notice, *Avante International Technology Corporation, Plaintiff v. Premier Voting Solutions, et al, Defendants*; United States Eastern District of Missouri Eastern Division: Case No. 4:06CV00978 TCM, Document 469, Mar. 24, 2008, 6 pages.

Avante's Response to Defendant's Memorandum, *Avante International Technology Corporation, Plaintiff, v. Premier Voting Solutions, et al, Defendants*; United States Eastern District of Missouri Eastern Division: Case No. 4:06CV00978 TCM, Document 470, Mar. 26, 2008, 3 pages.

Defendant's Supplemental Responses and Objections to Plaintiff's First Requests for Admission, *Avante International Technology, Inc., Plaintiff, v. Hart Intercivic, Inc., Defendant*; United States Southern District of Illinois East St. Louis Division: Case No. 3:07-cv-00169-DRH-CJP, Document 102, Jun. 4, 2008, 6 pages.

Defendant's Supplemental Responses to Plaintiff's First Set of Interrogatories, *Avante International Technology, Inc., Plaintiff, v. Hart Intercivic, Inc., Defendant*, United States Southern District of Illinois East St. Louis Division: Case No. 3:07-cv-00169-DRH-CJP, Jun. 4, 2008, 88 pgs.

Premier Election Solutions, Inc.'s Response to Plaintiff's Fourth Set of Interrogatories, *Avante International Technology Corporation, Plaintiff, v. Premier Election Solutions, et al, Defendants*; United States Eastern District of Missouri Eastern Division: Case No. 4:06CV00978 TCM, Jul. 15, 2008, 16 pages.

Response to Plaintiff's Fifth Set of Interrogatories to Defendant Election Systems and Software, *Avante International Technology Corporation, Plaintiff, v. Premier Election Solutions, et al, Defendants*; United States Eastern District of Missouri Eastern Division: Case No. 4:06CV00978 TCM, Jul. 15, 2008, 15 pages.

Sequoia Voting Systems' Objections and Response to Plaintiff's Sixth Set of Interrogatories, *Avante International Technology Corporation, Plaintiff, v. Premier Election Solutions, et al, Defendants*; United States Eastern District of Missouri Eastern Division: Case No. 4:06CV00978 TCM, Jul. 15, 2008, 10 pages.

Memorandum and Order, *Avante International Technology Corporation, Plaintiff, v. Premier Election Solutions, et al, Defendants*; United States Eastern District of Missouri Eastern Division: Case No. 4:06CV00978 TCM, Document 486, Jul. 16, 2008, 33 pages.

Written Report of John D. Bakker, *Avante International Technology Corporation, Plaintiff, v. Premier Election Solutions, et al, Defendants*; United States Eastern District of Missouri Eastern Division: Case No. 4:06CV00978 TCM, Sep. 5, 2008, 8 pages.

Report of J. Michael Thesz, Pursuant to Rule 26, Federal Rules of Civil Procedure, *Avante International Technology Corporation, Plaintiff, v. Premier Election Solutions, et al, Defendants*; United States Eastern District of Missouri Eastern Division: Case No. 4:06CV00978 TCM, Sep. 9, 2008, 48 pages.

Report of Peter G. Martin, *Avante International Technology Corporation, Plaintiff, v. Premier Election Solutions, et al, Defendants*; United States Eastern District of Missouri Eastern Division: Case No. 4:06CV00978 TCM, Sep. 9, 2008, 35 pages.

Report of Defendants' Expert Michael Ian Shamos, Ph.D., J.D. Concerning Inequitable Conduct, *Avante International Technology Corporation, Plaintiff, v. Premier Election Solutions, et al, Defendants*; United States Eastern District of Missouri Eastern Division: Case No. 4:06CV00978 TCM, Sep. 9, 2008, 15 pages.

Report of Defendants' Expert Michael Ian Shamos, Ph.D., J.D. Concerning Invalidity, *Avante International Technology Corporation, Plaintiff, v. Premier Election Solutions, et al, Defendants*; United States Eastern District of Missouri Eastern Division: Case No. 4:06CV00978 TCM, Sep. 9, 2008, 53 pages.

Premier Election Solutions, Inc.'s Supplemental Responses Avante's Interrogatories, *Avante International Technology Corporation, Plaintiff, v. Premier Election Solutions, et al, Defendants*; United States Eastern District of Missouri Eastern Division: Case No. 4:06CV00978 TCM, Sep. 11, 2008, 9 pages.

Supplemental Responses to Interrogatory Nos. 1, 2, 3, 4 and 20 from Plaintiff's Interrogatories to Defendant Election Systems and Software, *Avante International Technology Corporation, Plaintiff, v. Premier Election Solutions, et al, Defendants*; United States Eastern District of Missouri Eastern Division: Case No. 4:06CV00978 TCM, Sep. 17, 2008, 9 pages.

Plaintiff Election Systems & Software, Inc.'s Answers to Defendant's First Set of Interrogatories to Plaintiff, *Election Systems & Software, Inc., Plaintiff, v. Avante International Technology Corporation, Defendant*; United States Eastern District of Missouri Eastern Division: Case No. 4:08-CV-695-TCM, Sep. 22, 2008, 46 pages.

Supplemental Report of Defendant's Expert Michael I. Shamos, Ph.D., J.D. Concerning Invalidity, *Avante International Technology Corporation, Plaintiff, v. Premier Election Solutions, et al, Defendants*; United States Eastern District of Missouri Eastern Division: Case No. 4:06CV00978 TCM, Nov. 6, 2008, 8 pages.

Exhibit 4 to Defendants' Expert Report on Invalidity, Invalidity Analysis of Chung et al. '944 and '313, *Avante International Technology Corporation, Plaintiff, v. Premier Election Solutions, et al, Defendants*; United States Eastern District of Missouri Eastern Division: Case No. 4:06CV00978 TCM, Nov. 6, 2008, 6 pages.

* cited by examiner

| STATE | COUNTY | MUNICIPALITY | PRECINCT | WARD | POLITICAL PARTY | VOTER NUMBER |
|---|---|---|---|---|---|---|
| 3-DIGIT IDENTIFIER | 3-DIGIT IDENTIFIER | 4-DIGIT IDENTIFIER | 2-DIGIT IDENTIFIER | 2-DIGIT IDENTIFIER | 2-DIGIT IDENTIFIER | 4-10 DIGIT IDENTIFIER |

| MACHINE-READABLE VID# and Human readable VID# | 120 |
|---|---|

Election Characterization
(Precinct, Date, General/Primary, etc.)

"NAME and other features of the ___ contest" Please choose and rank every candidate. Your first choice should have one filled circle, the 5th choice should have five filled circles. 112

| Candidate #1 112 | Candidate #2 | Candidate #3 112 | Candidate #4 |
|---|---|---|---|
| Candidate #5 | Write-In Candidate 116 | Write-In Candidate 116 | Write-In Candidate 116 |
| Write-In Candidate 116 | Write-In Candidate 112 | Skip-Contest/Abstain for balance of the vote  114 112 | 110-R |

"NAME and other features of the ___ contest" (Cumulative Voting)
You have five votes and thus the right to fill in five circles among the candidates below. You can put all five votes in one candidate by filling in five circles. You may also choose to distribute five in any way you want.

| Candidate #1 112 | Candidate #2 | Candidate #3 | Candidate #4 |
|---|---|---|---|
| Candidate #5 112 | Write-In Candidate 116 | Write-In Candidate 116 | Write-In Candidate 112' |
| Write-In Candidate | Write-In Candidate 116 | Skip-Contest/Abstain for balance of the vote  114 112 | 110-C |

| NAME and other features of the ___ contest. Choose 2 only |
|---|

| Candidate #1 112 | Candidate #2 | Candidate #3 | Candidate #4 |
|---|---|---|---|
| Candidate #5 112 | Candidate #6 | Candidate #7 112 | Candidate #8 |
| Candidate #9 112 | Candidate #10 | Candidate #11 | Write-In Candidate #1 116 |
| Write-In Candidate #2 116 | Skip-Contest/Abstain for balance of the vote  114 112 | | 110 |

| NAME and other features of the ___ contest. Choose 1 only |
|---|

| Candidate #1 | Write-In Candidate 116 | Skip-Contest/Abstain for balance of the vote | 110 |
|---|---|---|---|

ELECTRONIC VOTING METHOD AND SYSTEM EMPLOYING A MACHINE READABLE BALLOT ENVELOPE

This Application is a division of U.S. patent application Ser. No. 11/487,886 filed Jul. 17, 2006 now U.S. Pat. No. 7,614,553 which is a division of U.S. patent application Ser. No. 10/410,824 filed Apr. 10, 2003, now U.S. Pat. No. 7,077,313 which is a continuation-in-part of U.S. patent application Ser. No. 10/260,167 filed Sep. 30, 2002, now U.S. Pat. No. 6,892,944 which claims the benefit of:
U.S. Provisional Application Ser. No. 60/326,265 filed Oct. 1, 2001, of
U.S. Provisional Application Ser. No. 60/341,633 filed Dec. 19, 2001,
U.S. Provisional Application Ser. No. 60/377,824 filed May 7, 2002,
U.S. Provisional Application Ser. No. 60/382,033 filed May 20, 2002,
U.S. Provisional Application Ser. No. 60/385,118 filed May 30, 2002,
U.S. Provisional Application Ser. No. 60/389,635 filed Jun. 17, 2002, and
U.S. Provisional Application Ser. No. 60/403,151 filed Aug. 12, 2002.

The present invention relates to a method and system, in particular, to a method and system employing a machine readable envelope, of a sort that may be employed for voting.

Under current election law and regulations in certain jurisdictions, a paper record of certain voter's voting selections made on a paper ballot, e.g., a conventional "mark-sense" ballot, must be made and preserved. Most commonly, a paper voting record or ballot must be utilized for absentee voting and/or for provisional voting. Absentee voting is where a voter who will be absent from the jurisdiction or otherwise unable to be present at a designated polling location during the time for voting is issued a paper ballot in advance of the election and votes by completing and submitting the paper absentee ballot by hand, mail, messenger, or other permitted means. Provisional voting is where a voter who is unable to establish his eligibility to vote at a polling place during an election is issued a paper ballot and is permitted to vote thereby "provisionally," i.e. by sealed paper provisional ballot that is only opened and counted if the eligibility of the provisional voter to vote is established by election officials after the time for voting ends.

Irrespective of whether a jurisdiction utilizes paper ballots or more modern electronic voting machines, absentee and provisional ballots must be handled separately and counted manually by election officials, i.e. apart from the votes recorded by voters voting normally (e.g., by voting machine) in the election, and may delay the completion of tabulating the voting results and/or the certification thereof. Certain jurisdictions even require a paper absentee and/or provisional ballot even where the absentee and/or provisional voting is done on an electronic (DRE) voting machine. In addition, because the paper ballots approved for being counted are placed into groups so that they are anonymous for counting, there is no way for a voter to know whether his vote was counted and/or was counted correctly.

The prevalent paper ballot is an optically read or optically scanned paper ballot on which a voter marks his voting selections by darkening or otherwise marking one or more regions typically indicated by an outline in the shape of a circle, oval, rectangle, square or other desired closed shape. The marking areas of such conventional "mark-sense" ballots are typically arranged in discrete columns that correspond to the positions of the sensors in a conventional ballot reading machine. A different paper ballot, i.e. a customized ballot, is typically required to be prepared for each election and jurisdiction, e.g., voting district or precinct. In addition, a corresponding customized template must be provided for each different paper ballot, thereby necessitating the manual sorting of the paper ballots by voting district or precinct and the separate reading/scanning thereof for each voting district or precinct.

Accordingly, it would be desirable to have a method and system for processing paper ballots and/or sheets in a more versatile and/or efficient manner, and preferably one suitable for use with ballots or sheets submitted in a machine readable envelope, such as an optically scannable or optically readable envelope.

To this end, a method for reading paper ballots wherein each paper ballot is enclosed in a ballot envelope having a machine-readable envelope identifier and voter information including a signature thereon comprises:
  decoding the machine readable envelope identifier;
  displaying at least the decoded envelope identifier and signature of each ballot envelope for determining whether the ballot is a valid ballot; and
  if the ballot is determined to be a valid ballot, removing the valid ballot from its ballot envelope, and then performing the following stepson each valid ballot:
  determining the voting selections marked on each paper ballot; and
  tabulating the voting selections determined from each of the paper ballots.

In another aspect, a method for reading paper ballots wherein each paper ballot is enclosed in a ballot envelope having a machine-readable envelope identifier and voter information including a signature thereon comprises:
  reading each ballot envelope including at least the machine readable envelope identifier and signature thereon;
  decoding the machine readable envelope identifier;
  displaying at least the decoded envelope identifier and signature for determining whether the ballot is a valid ballot; and
  if the ballot is determined to be a valid ballot, removing each valid ballot from its ballot envelope, and then performing the following steps on each valid ballot:
  determining the voting selections marked on each paper ballot; and
  tabulating the voting selections determined from each of the paper ballots.

In another aspect, a method for reading paper sheets wherein each paper sheet is enclosed in an envelope having a machine-readable envelope identifier and a signature thereon comprises:
  reading each envelope including at least the machine readable envelope identifier and the signature thereon;
  decoding the machine readable envelope identifier;
  displaying at least the decoded envelope identifier and the signature for determining whether the paper sheet is a valid sheet; and
  if the sheet is determined to be a valid sheet, removing the paper sheet from its envelope, and then performing the following steps on each valid sheet:
  determining the selections marked on each paper sheet; and
  processing the selections determined from each of the paper sheets.

In yet another aspect, a system for reading paper ballots wherein each paper ballot is enclosed in a ballot envelope having a machine-readable envelope identifier and voter information including a voter signature thereon comprises:

a reader for reading at least the machine readable envelope identifier and the voter signature on each ballot envelope;

a decoder for decoding the machine readable envelope identifier;

display for displaying the decoded envelope identifier and the voter signature for determining whether the ballot is a valid ballot;

means for determining the voting selections marked on each valid paper ballot; and means for tabulating the voting selections determined from each of the valid paper ballots.

BRIEF DESCRIPTION OF THE DRAWING

The detailed description of the preferred embodiments of the present invention will be more easily and better understood when read in conjunction with the FIGURES of the Drawing which include:

FIG. 4 is a schematic diagram illustrating an example ballot including ranked and/or cumulative voting that is intended to be read by an optical reader;

Figure 1:
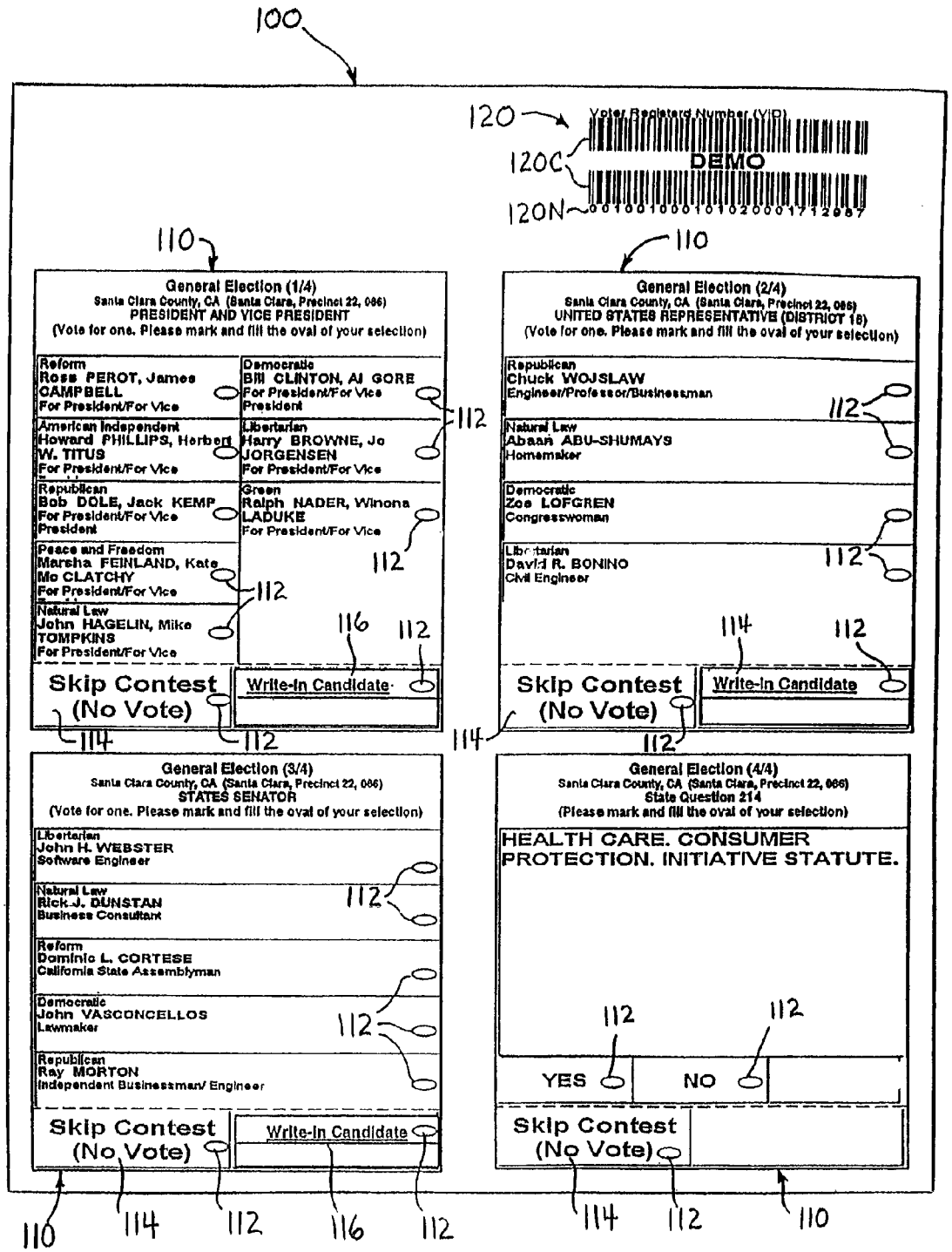
FIG. 1 is a schematic diagram illustrating an example ballot intended to be read by an optical reader.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification, but in the Drawing are followed by a character unique to the embodiment described. It is noted that, according to common practice, the various features of the drawing are not to scale, and the dimensions of the various features are arbitrarily expanded or reduced for clarity

DESCRIPTION OF THE PREFERRED EMBODIMENT(S)

The arrangement of the present application operates in conjunction with an electronic voting machine, also referred to as electronic voting apparatus and/or as a direct recording electronic (DRE) voting apparatus. Suitable voting apparatus, and methods employed therewith, are described in U.S. patent application Ser. No. 09/737,306 entitled "Electronic Voting Apparatus, System and Method" filed Dec. 15, 2000 and in U.S. patent application Ser. No. 10/255,348 entitled "Electronic Voting Apparatus, System and Method" filed Sep. 26, 2002, which applications are hereby incorporated herein by reference in their entireties.

FIG. 1 is a diagram illustrating an example ballot 100 intended to be read by an optical reader. Ballot 100 includes four regions 110 each containing information pertaining to a particular election contest or question and a number of marking regions or mark spaces 112 therein in which a voter makes a mark to select one or more voting selections for the particular election contest or question. Mark spaces 112 may be any convenient closed shape and provide a defined area in a defined location in which a voter marks his voting selections by darkening or otherwise marking therein. Mark spaces 112 are typically indicated by an outline in the shape of a circle, oval, rectangle, square or other desired closed shape. After the ballot 100 is marked by the voter, it is voted (e.g., deposited in a ballot box or otherwise submitted) and is read and tabulated, typically by a reading machine or reader that optically reads or senses the defined mark spaces to determine whether each mark space 112 is marked or unmarked, thereby indicating a voting selection. The reading machine is programmed to define a "template" corresponding to the locations on the ballot where each of the contests/questions 110 and the respective mark spaces 112 therefore are located.

In the example illustrated, a first region 110 designated "General Election (1/4)" contains the names and party affiliations of candidates for "President and Vice President" and a mark space 112 for each set of candidates, as well as mark spaces 112 for a "Skip Contest" or "No Vote" (abstain) selection 114 and for a write-in candidate selection 116. A second region 110 designated "General Election (2/4)" contains the names and party affiliations of candidates for "United States Representative (District 16)" and a mark space 112 for each candidate, as well as mark spaces 112 for a "Skip Contest" or "No Vote" (abstain) selection 114 and for a write-in candidate selection 116. A third region 110 designated "General Election (3/4)" contains the names and party affiliations of candidates for "State Senator" and a mark space 112 for each candidate, as well as mark spaces 112 for a "Skip Contest" or "No Vote" (abstain) selection 114 and for a write-in candidate selection 116. A fourth region 110 designated "General Election (4/4)" contains a question put before the voters designated as "State Question 214" and a mark space 112 for a "Yes" or "No" selection, as well as a mark space for a "Skip Contest" or "No Vote" (abstain) selection 114.

In addition, each ballot includes a voter registration number 120, also known as a voter identifier number or voter identification number, commonly abbreviated as "VID." Identifier or VID 120 is preferably located at a predefined location on ballot 100, e.g., near the upper right hand corner as illustrated. VID 120 may be provided in any convenient machine readable format, including but not limited to a bar code, two-dimensional bar code, a prescribed font, optical character recognition (OCR) characters, alphanumeric characters, non-alphanumeric characters, symbols, and the like. Typically, however, a human-readable number 120N and an equivalent simple machine-readable bar code 120C are satisfactory.

Figures 2, 3A:
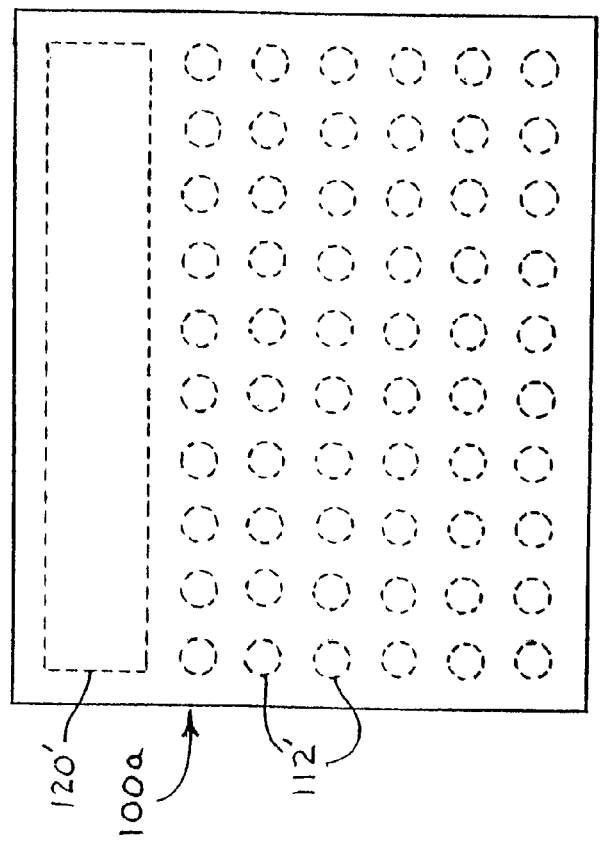
FIG. 2 is a schematic diagram illustrating an example format for a voter identifier (VID)
FIGS. 3A, 3B, 3C and 3D are schematic diagrams illustrating a generalized example ballot intended to be read by an optical reader.

FIG. 2 is a schematic diagram illustrating an example format 380 for a voter identifier (VID) 120. VID 120 is a sequence of numbers or other alphanumeric characters or symbols that uniquely identify a voter and provide voting information relating to the voter that may be utilized by a voting machine or by a ballot reading machine or by election officials. VID format 380 includes, for example, six different informational fields 381-386. Field 381 includes a number of characters, typically 3, that uniquely identify the voter's state of residence and field 382 includes a number of characters, typically 3, that uniquely identify the voter's county of residence. Fields 381-386 may be used for automatic reading and tabulation of different ballots without manual or other sorting prior to their being read and tabulated, as well as for absentee and provisional voting. While a three-digit numerical field is typical, providing up to 999 different entries, two-digit fields may be utilized where a lesser number (i.e. 99 or less) of possible entries are needed, as in the United States where there are only 50 states. Any field may be of greater or lesser number of characters as is convenient.

Field 383 includes a number of characters, typically 4, that uniquely identify the voter's municipality of residence. Field 384 includes a number of characters, typically 2, that uniquely identify the voter's voting precinct or district within the county or municipality, and field 385 includes a number of characters, typically 2, that uniquely identify the voter's voting ward, if any, within the voting precinct or district. Field 386 includes a number of characters, typically 2, that uniquely identify the voter's political party affiliation if any has been declared and may be utilized for presenting the ballot of the declared political party for voting in a party primary election or for straight party voting, where permitted.

Field 387 includes a number of characters, typically 4-10, that uniquely identifies the particular ballot in the applicable county, voting precinct, district and/or ward, as the case may be. The random generated number, field 387, is a randomly-generated unique identifier that is printed on a ballot prior to the election, and may or may not be traceable to the identity of a particular voter, as desired for security and privacy. The same unique identifiers as are printed on paper ballots, e.g., for absentee and/or provisional voting, may be stored in a voting machine or in a vote tabulating machine for verifying the authenticity and uniqueness of ballot when it is tabulated.

In the United States, voting is typically conducted on a state by state basis, and most states delegate to its counties the conduct of elections. In local voting, i.e. voting wherein a particular voting machine is dedicated for voting by voters of a particular county, municipality, precinct, district or ward, fields 382-385 may be utilized by the voting machine or vote tabulating machine to verify that the voter is using the proper ballot form before the voting session is initiated and/or before the voting selections marked on the ballot are tabulated, e.g., in provisional voting. Typically in local voting, the voting machine is situated in a location in a particular precinct, district or ward and voters from that particular voting precinct, district or ward come to that location to vote, and provisional and/or absentee voters may vote using such voting machines even though their voting selections are then reproduced on a printed ballot, e.g., as printed by a printer associated with the voting machine.

Data from fields 381-386 is utilized to select the voting screens and/or voting contests to be presented on a voting machine and/or on one or more printed ballot sheets that together comprise a proper complete election ballot for that voter in a given election. Each voting machine may generate on a voter-by-voter basis a complete election ballot by selectively combining, for example, a "general ballot" including one or more voting contests 110 that are to be presented to all voters, a "residence-specific ballot" including one or more voting contests 110 to be presented to voters according to their residence, and/or a "party-specific ballot" including one or more voting contests 110 to be presented to voters in a party primary election according to their party affiliation. Thus, a voting machine and/or ballot printer is not constrained or limited to local voting, but may be utilized for county-wide or state-wide or nation-wide voting, for regional voting, and/or for remote voting.

Where voters are issued a chip card or smart card containing his VID number 120 and an electronic voting machine is utilized for printing paper ballots, the voting machine is responsive to voting jurisdiction information 381-386 read from each voter's chip card for providing a ballot to the voter and may retain the chip card for the writing of the voter's voting selections therein and then collects the chip card in a collection container or may allow an election official to have the chip card. Optionally, the voting machine and/or vote tabulating machine may reject the chip card and/or the paper ballot 100 if the voter registration information 381-386 and/or the unique identifier 387 read therefrom do not match corresponding information stored in the voting machine and/or vote tabulating machine, and may return or collect the chip card. In either case, the chip card once inserted into the voting machine may be retained in a way that the voter may not retrieve the chip card, e.g., for securing the card against use to vote more than once. For provisional voting, the chip card may be likewise retained until the voting selections of a provisional voter are stored therein, and then may be returned to the provisional voter and/or a voting official, e.g., with a proper authorization. Unique identifiers 387 once used for an election may be "retired" and not used in one or more subsequent elections as a means to reduce the likelihood of fraudulent in a future election, e.g., either as a VID number 120 and/or by a counterfeit smart card.

FIGS. 3A, 3B, 3C and 3D are schematic diagrams illustrating a generalized example ballot 100 intended to be read by an optical reader. Generalized ballot format 100a of FIG. 3A has a plurality of locations 112' at which mark spaces 112 may be provided and has a region 120' in which a VID number 120 may be represented. Ballot format 100a is generalized in that it illustrates all possible mark space locations 112' and a relatively large region in which a VID number 120 representation may be provided. An actual ballot format will typically be on a standardized paper, such as an 80-column machine readable card or an 8½×11 inch or an A4 size paper, and have many more possible mark space locations 112'.

In any particular ballot 100, less than all of possible mark space locations 112' will be utilized as mark spaces 112 and less than the entire region 120' will typically be utilized for providing the VID number 120 representation. Generalized ballot format 100a represents a ballot pattern from which particular ballots 100 and areas for particular contests 110, each utilizing specific selected ones of mark space locations 112', according to a template, may be provided.

Figure 3B:
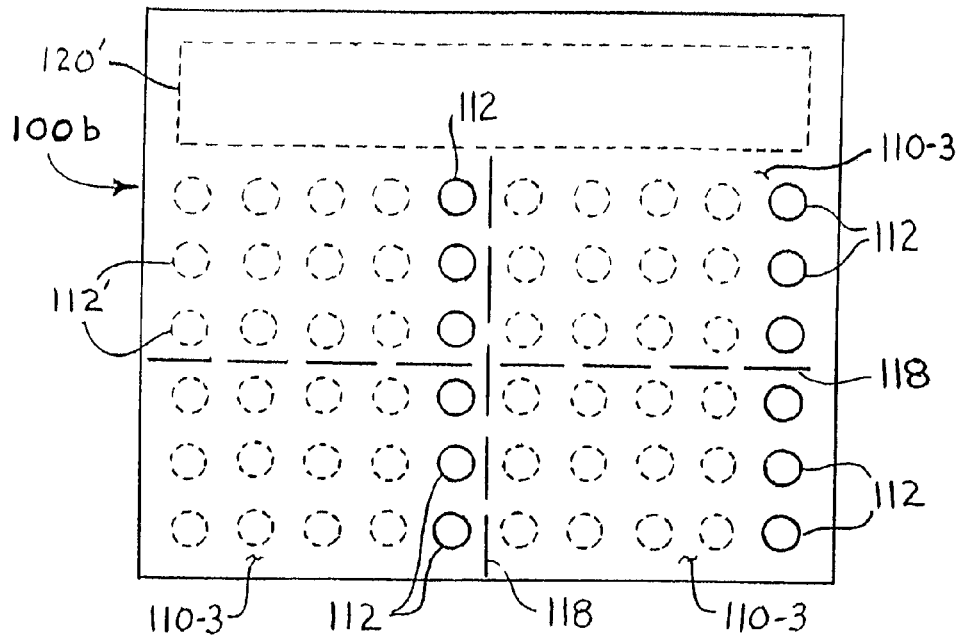

FIG. 3B illustrates an example ballot 100b which is provided from a ballot format 100a on which contest regions 110 are defined by dashed lines 118 in the region having the possible mark spaces 112' and in which ones of possible mark spaces 112' to be utilized for marking voting selections are mark spaces 112 defined by solid line circles. The dashed lines 118 defining contest regions 110 and the mark spaces 112 that may be selected together define a template for ballot 100b, i.e. define the pattern by which voting selections will be marked for each of plural voting contests as well as the pattern by which voting selections will be read by a vote tabulating machine or reader for each of the voting contests in tabulating the vote. The template of ballot 100b defines four contest areas 110 of the same size, with each having three active mark spaces 112. Each three mark space contest 110-3 might be utilized, e.g., for a contest among three candidates, or for a contest among three candidates where mark spaces are provided for a "No Vote" selection and a write-in selection, or for a public question or other "Yes-No" response matter where a mark space is provided for a "No Vote" or "Abstain" selection.

Figure 3C:
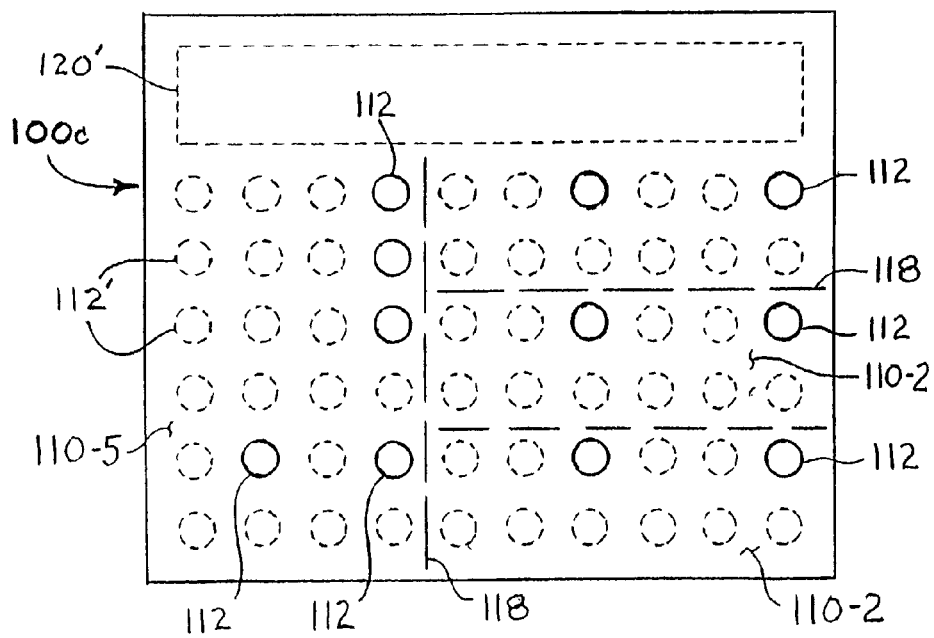

FIG. 3C illustrates an example ballot 100A which is provided from a ballot format 100A on which contest regions 110 are defined by dashed lines 118 in the region having the possible mark spaces 112' and in which ones of possible mark spaces 112' to be utilized for marking voting selections are mark spaces 112 defined by solid line circles. The dashed lines 118 defining contest regions 110 and the mark spaces 112 that may be selected together define a template for ballot 100A, i.e. define the pattern by which voting selections will be marked and tabulated. The template of ballot 100A defines four contest areas 110 of two different sizes, one having five active mark spaces 112, and three having two mark spaces 112. The five mark space contest 110-5 might be utilized, e.g., for a contest among five candidates or for a contest among three candidates where mark spaces are provided for a "No Vote" or "Abstain" selection and for a write-in selection. Each two-mark space contest 110-2 may be utilized, e.g., for a public question or other "Yes-No" response matter.

Figure 3D:
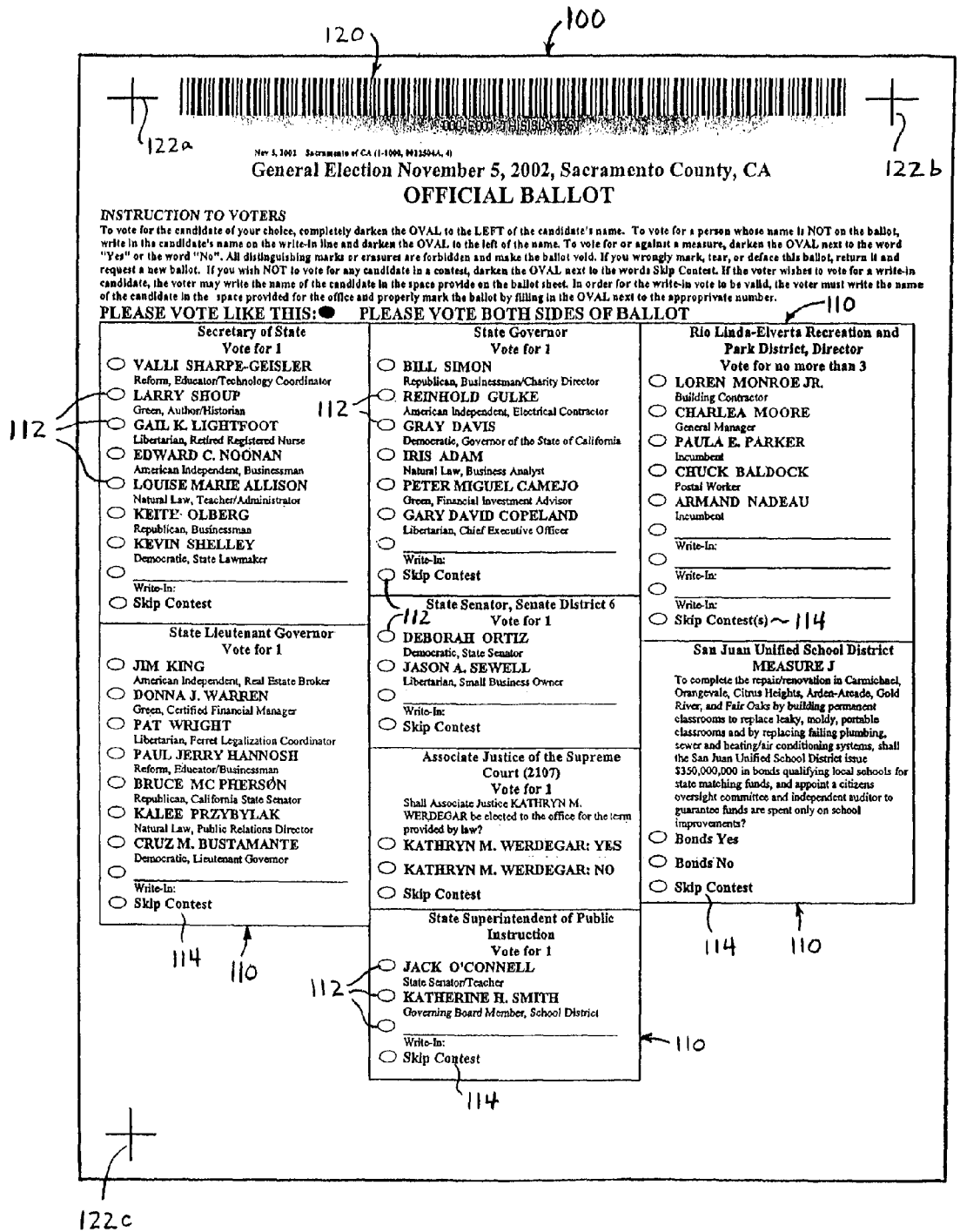

FIG. 3D illustrates a generalized example ballot 100 intended to be read by an optical reader, wherein ballot 100 includes a number of orientation indicia or fiducial marks 122 that are located in predetermined asymmetric positions that when read by a ballot reader may be utilized to define the orientation of ballot 100. Although only one indicia or fiducial mark 122 is necessary to define ballot orientation, and will satisfactorily define the orientation of ballot 100 for reading by an automatic ballot reader, plural (at least two or more) indicia or fiducial marks 122 are preferred so that the orientation of ballot 100 may be determined even when ballot 100 is not properly and precisely aligned for reading by a ballot reader and so that the scale of the ballot may be determined.

In particular, orientation indicia or fiducial mark 122a near the upper corner of ballot 100 and orientation indicia or fiducial marks 122b and 122c near the lower edge, e.g., near the right-hand and left-hand corners of ballot 100 define the orientation of ballot 100 and, because the predetermined positional locations of indicia or fiducial marks 122a, 122b and 122c are precisely known, i.e. they are spaced apart a predetermined distance, orientation indicia or fiducial marks 122 also define the scale and/or size of ballot 100. Further, each mark space 112 is in a predetermined position relative to indicia or fiducial marks 122, and so the relative locations of all mark spaces 112, as well as any other location on ballot 100, can be determined from fiducial marks 122, whether or not a mark space 112 has been marked. Where ballots are imaged, the positions of each indicia or fiducial mark 122 and of each mark space 112 is defined in the same coordinate system as are the pixels of the ballot image, e.g., in X-Y coordinates, thereby to facilitate the "reading" of the ballot via its ballot image, e.g. to determine which mark spaces 112 are marked to indicate a voting selection.

Comparing the predetermined relative positions and/or spacings of indicia or fiducial marks 122 with the imaged positions thereof permits the scale/size of the ballot image and the position of each mark space 112 to be determined. This is helpful for normalizing the ballot image provided by the ballot reader as well as for locating the proper positions of ballot identifier 120 and of marking areas 112 as defined by the appropriate ballot template. Scaling and/or normalizing the size of the ballot image can be utilized to compensate for small changes in the size of ballots, e.g., due to stress, moisture content and the like, thereby to avoid any inaccuracy that might otherwise result therefrom.

Suitable indicia or fiducial marks include, for example, cross-hair lines, cross-hair lines in a circle, targets, bulls-eye shapes, bullets, "+" marks, "X" marks, boxes, any of the foregoing with one or more black, darkened or contrasting adjacent sections, and/or any combination thereof. Symmetrical indicia or fiducial marks that uniquely define their own center are preferred. Indicia or fiducial marks 122 and/or the pattern thereof may be standardized for all ballots and/or may be different for different ballots and defined by the ballot template therefore. Indicia or fiducial marks 122 may located be any location(s) suitable for defining the orientation, and preferably also defining the scale/size, of ballot 100. To this end, an odd-number of indicia or fiducial marks 122 disposed in an asymmetric pattern are preferred. Where a two-sided or plural sheet ballot is utilized, each sheet and/or side includes marking indicia or fiducial marks 122.

In addition, where a ballot is too long to be provided on one ballot sheet, plural sheets may be provided with a page number identifier on each sheet that is read and utilized to select the proper ballot sheet template or to determine the portion of a selected ballot template applicable to each ballot sheet. Preferably, page number identifiers are human-readable and machine-readable, such as a numeral in a font easily read by a computer reader. Further, so-called "summary" ballots may be utilized wherein the candidates and questions are provided in a booklet, and each candidate and/or response is identified in the booklet by a number; in this case, the mark spaces 112 of the summary ballot are each associated with one of the numbers set forth in the booklet. In addition, a candidate name and/or response selection (e.g., a "yes" or "no") may be printed on the summary ballot with the number.

FIG. 4 is a schematic diagram illustrating an example ballot 100 including ranked and/or cumulative voting that is intended to be read by an optical reader. Ballot 100 includes a plurality of contest areas 110 (each having a region wherein "NAME and other features of the contest" information identifying the particular contest is placed and wherein mark spaces for selecting a candidate are placed) and also includes a VID area 120, as described above. Any one or more contest areas 110 may be utilized for straight voting, for ranked voting and/or for cumulative voting, as may be the case for a particular election and/or contest.

A first contest area 110-R is arranged for conducting ranked voting wherein the voter may rank the candidates in his order of preference. In this example, five candidates may be ranked. Filling one mark space 112 indicates first choice ranking, filling two mark spaces 112 indicates second choice ranking, and so forth. The opposite sense, where marking a greater number of mark spaces for a candidate indicates a greater preference, could also be utilized. Thus, five mark spaces 112 are associated with each candidate's name and with each write-in candidate position 116. Optionally and/or alternatively, plural mark spaces may be associated with rank numbers (e.g., a "1" mark space for first choice, a "2" mark space for second choice, a "3" mark space for third choice, and so forth) for each candidate in a contest.

Ranked voting may be utilized for conducting an "instant run-off" where no candidate or an insufficient number of candidates receives sufficient first-choice votes to be elected (e.g., fails to receive a majority of the votes cast) under the election rules in effect. If no candidates win or fewer than the required number win, a run-off election is required. Conventionally the run-off election occurs later in time and incurs the expense of conducting a second election. In an instant run off, so called because the voting needed for the run off are cast in the initial election and so are immediately ("instantly") available. In an instant run-off election, candidate(s) receiving the least first choice votes are eliminated and the voters' second choice rankings of candidates other than those eliminated are then counted to determine the winner(s). One mark space 112 is provided to skip the entire contest and/or to abstain 114 for the balance of that contest, i.e. to intentionally under vote. The voting apparatus and ballots described herein permit an instant run-off election to be conducted automatically and electronically if no winner emerges from the initial voting.

A second contest area 110-C of ballot 100 is arranged for conducting cumulative voting wherein the voter may distribute a given number of votes among the candidates in his order of preference, typically where more than one candidate is to be elected in a given contest. Cumulative voting allows the voter to distribute his vote among any one or more of the candidates rather than being limited to voting for or not voting for each candidate equally, as in straight voting. In this example, five votes may be cast (five mark spaces 112 may be marked) in the contest and the five votes may be cast for any one or more candidates. Filling more mark spaces 112 for a candidate indicates a greater number of votes, and thus a greater preference, for that candidate. Thus, five mark spaces 112 are associated with each candidate's name and with each write-in candidate 116. One mark space 112 is provided to skip the entire contest and/or to abstain 114 for the balance of that contest, i.e. to intentionally under vote.

Alternatively to providing plural mark spaces 112 for each candidate for conducting ranked and/or cumulative voting, mark space 112 may be arranged as a seven-segment mark space 112' wherein selected ones of the seven segment spaces thereof may be marked to define a numeral. For example, marking the two vertical segments at the left or at the right indicates the number "1", marking the top, middle and bottom horizontal segments and the upper right and lower left vertical segments indicates the number "2", marking all seven segments indicated the number "8", and so forth, in like manner to illuminating selected segments of a seven-segment display to display numbers.

The two remaining contest areas 110 of ballot 100 are examples of straight voting for two different example contests, one in which two candidates of eleven are to be elected and the other in which one candidate is to be elected. Ballot 100 may include, and preferably does include plural positional indicia 122 as described above in relation to FIG. 3D.

Figure 5:
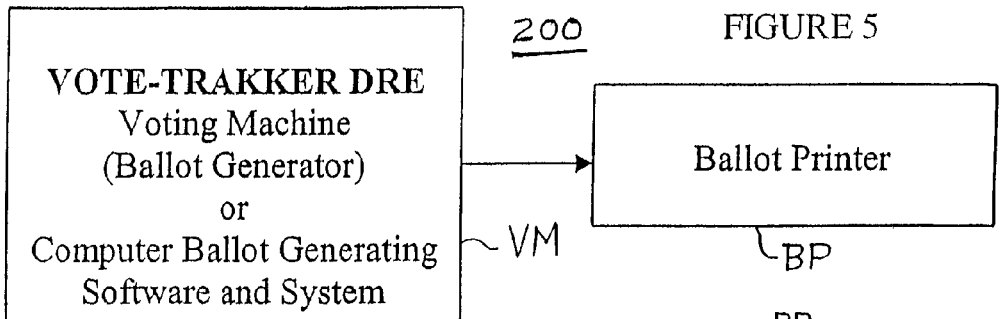
FIG. 5 is a schematic block diagram of an example ballot generating apparatus.

FIG. 5 is a schematic block diagram of an example ballot generating apparatus 200. Apparatus 200 includes a processor for generating ballots 100 from information provided thereto either by election officials entering contest information, candidate information and the like, i.e. for generating ballot form and/or formats for particular jurisdictions and/or sub-divisions thereof. The processor may be the processor included in an electronic voting machine that includes ballot generating capability, such as the VOTE-TRAKKER™ direct recording electronic voting machine available from Avante International Technology, Inc. located in Princeton Junction, N.J., described in patent application Ser. Nos. 09/737,306 and 10/255,348, or may be a computer running suitable ballot generating software.

Ballot printer BP may be a conventional ballot printer that prints ballots provided it is capable of printing the VID number 120 in machine- and/or human readable form and of printing the unique random portion of the VID 120, or may be a printer associated with voting machine VM. The actual format of ballots 100 will be in conformance to the applicable federal, state, county, and/or local legal requirements for election ballots, as is the case for conventional optically-scanned ballots. Thus, standardized paper sizes, e.g., 8½×11 inches or 8½×14 inches or A4 metric paper, may be utilized, and single-page ballot requirements, minimum font size standards, candidate ballot space standards, and the like, will be met, in a customized and/or conventional ballot format. For example, ballots 100 may be conventional ballots such as a Scantron ballot, which has an array of 48×80 elliptical mark spaces on fixed grid pattern on an 8½×11 inch paper ballot, onto which is added VID number 120 in machine- and/or human-readable form as described herein.

Figure 6:
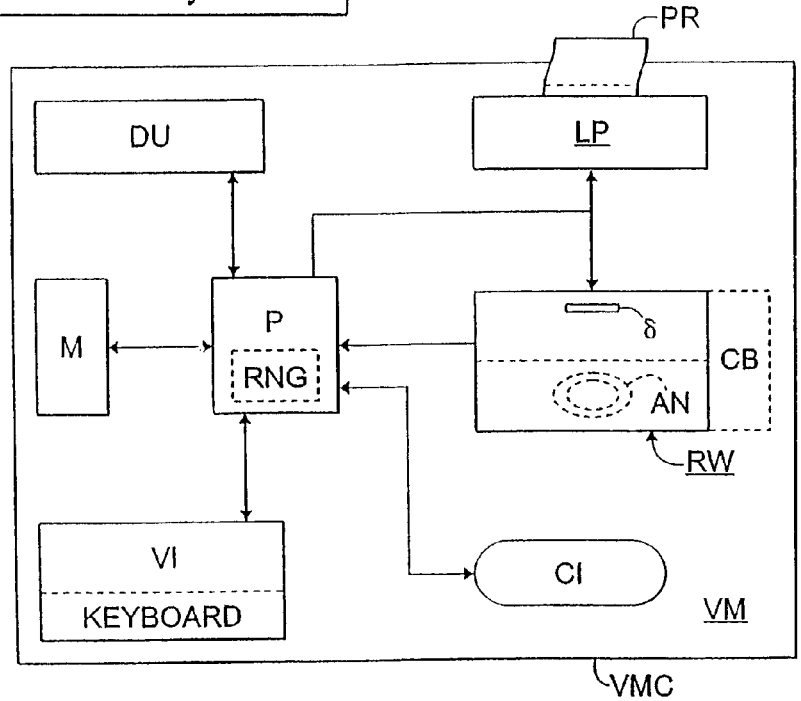
FIG. 6 is a schematic block diagram of an example voting apparatus.

FIG. 6 is a schematic block diagram of an example voting apparatus VM as shown and described in patent application Ser. Nos. 09/737,306 and 10/255,348 incorporated herein. Voting machine VM includes a processor P for processing information relative to a voter and/or voting and for providing a voting session identifier, a non-volatile memory M for storing and providing such information, a display unit DU for displaying information to the voter, and a voter interface VI whereby the voter can enter information into voting machine VM for processor P and/or memory M. It is noted that the components of voting machine VM are similar to the components of a personal computer and so a conventional personal computer, with or without modification, may be utilized in voting machine VM, although it is likely that conventional computer components, particularly processor P and memory M, may be utilized in conjunction with displays DU and input devices VI adapted to or customized for the voting machine application, for example, for ruggedness, resistance to tampering and/or abuse. In addition, processor P includes a function for providing unique voting session identifiers for each voting session, for example, a random-number or random-character generator RAG or a look-up table or other suitable generator. Voter interface VI may be a touch screen and so would provide display DU and a keyboard.

Memory M may also be of any suitable non-volatile memory type. Suitable memory devices include floppy disks, computer hard disk drives, writeable optical disks, memory cards, memory modules and flash memory modules (such as those utilized in electronic cameras), magnetic and optical tapes and disks, as well as semiconductor memories such as non-volatile random-access memory (RAM), programmable read-only memory (PROM), electronically erasable programmable read-only memory (EEPROM) and the like. Memory M or a separate memory contains the operating system, data base and application software that operates processor P as voting machine VM.

Alternatively, various programming information, a voting session identifier generator or list, voting information, candidate and office information and the like may be provided in firmware, such as in an EPROM, which provides additional resistance to tampering and/or hacking attack. Such firmware may be utilized, for example, for controlling the reading and writing of information to optional smart cards SC, the storing of voting record information in memory M, particularly, a specific memory device such as a memory chip card, an optical disk or tape, or other electronic, magnetic or optical media. Preferably, memory M of voting machine VM includes two independent non-volatile memory devices so that voting record information and a voting session identifier are stored on two separate, independent memory devices for redundancy and preservation of at least one copy of the accumulated voting records in the event one of the memory devices fails or otherwise becomes inoperative. Desirably, the two non-volatile memories are of different types, such as a semiconductor memory and a hard disk, or a memory card and an optical disk, or any other convenient combination.

Voter interface VI may be a standard or custom keyboard, as may facilitate write-in voting, or may be dedicated vote buttons or switches similar to conventional mechanical voting machines, for example, or may be a touch-screen interface associated with display unit DU, and is typically connected to processor P via cabling. Special keys can be provided for voting functions such as "Elect" or "Select" or "Vote," or for "Erase" or "Change," or for "Write-in." Alternative voter interfaces VI may include voice recognition apparatus, Braille keyboards or pen systems with writing recognition interfaces, each preferably with confirmation of the data entered displayed on display unit DU or even aurally via headphones. For a "standard" computer keyboard, for example, it is preferred that the "function keys," i.e. those keys that can be used for a purpose other than voting, such as to access and/or control the operating system and other programs, e.g., the F1-F12 keys, be disabled or rendered inoperative, either by software control or physical means.

In addition, a voter interface VI for allowing visually impaired voters to vote without assistance may employ a modified standard keyboard of which only certain keys are responded to in combination with an aural device. E.g., only the four keys (buttons) at the corners of a numeric keypad or the four areas (buttons) in the four corners of a touch screen may be enabled to indicate possible selections such as vote, skip, next, previous, and the like, with audible voice instructions and confirmation of buttons pressed provided via a headphone. A typical function assignment to the corner keys can include: upper right key="repeat" (to hear voice message again), lower right key="Enter" (to make a selection within the allotted time), lower left key="Cast Vote" (and proceed to the next contest), and upper right key="Increase Speed" (to increase the rate at which contests and/or voice indications are presented). Any or all of these functional keys may be exaggerated in size or otherwise made easily distinguished by tactile feel. Such keyboard/button programming is commonly provided by software.

Display unit DU may be of any suitable type, such as a conventional cathode ray tube or computer display, an LCD display, a touch-screen display or other suitable device, for displaying alphanumeric and/or graphical information, or a set of illuminated buttons, as desired, and is typically connected to processor P via cabling. Display unit DU may also include Braille devices, aural information via headphones, or other devices specially suited for people with handicaps.

Operatively associated with or coupled to processor P and memory M are a printer LP for providing a tangible record of the voting session, e.g., a printed paper receipt and an optional smart card reader/writer RW for writing and/or reading information from/to a smart card. Preferably, local printer LP and optional reader/writer RW are built into the physical container VMC of voting machine VM along with processor P, memory or memories M, display DU and voter interface VI, and that physical container VMC is rugged and sealable for security and to prevent unauthorized access to the components therein, thereby being resistant to tampering. Other voting booth components, such as a privacy curtain, the opening and closing mechanism therefore, or a floor stand, need not be part of voting machine container VMC, but may be permanently or demountably attached thereto as is convenient.

Optional smart card reader/writer RW is operatively associated with or coupled to processor P and memory M for writing information including at least a unique voting session identifier and a voting record into the memory of a smart card SC and optionally for reading information, such as voter registration and/or identifying information, from a smart card. Each voting session identifier is a randomly-generated unique identifying serial number or character sequence (e.g., a pseudo-random number) of at least eight characters or digits, and preferably of 12 or more characters or digits. Such voting session identifiers are generated for each voting session of each election, either centrally and then loaded into memories M of voting machines VM or by processor P as each voter participates in a voting session. It may be desirable for the voting session identifiers to include additional characters identifying voting district and/or the polling place and/or the voting machine VM on which the vote associated with the identifying number was cast, and/or the date and time of the voting session, but not the voter, so as to preserve voter anonymity while providing traceability of voting records. If any information particular to an individual voter is stored in the memory of smart card SC, as may be the case where information confirming voter registration or an identifying PIN number, security code or other personal data is utilized, such information is written over or erased or otherwise rendered permanently unrecoverable either before or at the time that voting record and voting session identifier information is stored in the memory of smart card SC by reader/writer RW of voting machine VM.

For optical ballot voting, voting machine VM generates a ballot format 100 for a particular jurisdiction, for example, according to a pre-programmed ballot information and/or in response to the voting jurisdiction information corresponding to the voter's VID number (fields 381-386) as entered via voter interface VI and/or a smart card and reader RW, as the case may be. The ballot format is generated by processor P as described above and in incorporated patent application Ser. Nos. 09/737,306 and 10/255,348, with a format layout for contests 110 consistent with local election requirements rather than as a series of voting screens. Ballot 100 so generated is printed by printer LP and is provided to the voter, e.g., by hand for provisional voting and/or by mail for absentee voting. Ballots 100 may be printed in advance of an election and/or may be printed during an election on a demand, i.e. as needed, basis.

If reader/writer RW is a contact-type reader for use with contact-type smart cards, then the smart card SC is inserted into slot S thereof to be read and/or written to. If reader/writer RW is a wireless or contact-less-type reader for use with wireless or contact-less-type smart cards, then the smart card SC is placed proximate to antenna AN of reader/writer RW to be read from and/or written to. If reader/writer RW is of a type for use with both contact-type and wireless or contact-less-type smart cards, then the smart card SC is inserted into slot S if it is a contact-type smart card and is placed proximate to antenna AN if it is a wireless-type smart card, or is either inserted into slot S or is placed proximate antenna AN if it is a so-called "combos-card" that combines both external contacts and an internal antenna so that it can be read from or written to either via contacts or a wireless communication.

Further, while optional smart card encoder RW need only be able to write information to a smart card, it may also read information stored in a smart card SC and provide same to processor P. Reader/writer RW may also be a decoder to decode information read from a smart card SC in encrypted or encoded form, and/or may also be a coder that encrypts or encodes information being written to the smart card SC. Such encryption and/or encoding may use public key encryption or any other suitable encryption and/or coding arrangement. Optionally, and preferably, reader/writer RW may include a "take-in" or capture mechanism that grabs smart card SC when it is inserted into slot S and, after the voting record and voting session identifier information is stored in the memory of smart card SC, deposits smart card SC into a secure collection box CB operatively associated with reader/writer RW and located in voting machine cabinet VMC. If this option is utilized, and it may be utilized with either contact-type or wireless smart cards SC, a separate collection box CB and action by each voter to deposit his or her smart card SC therein is not needed.

Local printer LP may provide a tangible independent record of each individual voter's voting selections associated with the voter's unique identifying number and/or may be utilized to print ballots 100. Printer LP if utilized for printing voting receipts is of a type that retains no record of the data printed (e.g., is not a daisy wheel or other printer employing a ribbon or other sheet-type ink source from which information printed may be extracted or reconstructed) such as a thermal printer, a dot matrix printer, an ink-jet printer, a bubble jet printer, a laser printer and the like, which are conventional. A specialty or security-type of paper, or other medium making authentication of a printed receipt and/or a printed ballot 100 easier and counterfeiting of altering of same more difficult, can be utilized, thereby reducing the likelihood of counterfeiting or fraud. Desirably, printer LP also prints information identifying the election district, the date and time of voting and similar information that may help to authenticate printed receipt PR and/or optical ballot 100.

The preferred VOTE-TRAKKER™ voting system and apparatus as illustrated by FIG. 4 is provided in incorporated patent application Ser. Nos. 09/737,306 and 10/255,348. Desirably, the VOTE-TRAKKER™ voting system and apparatus provides redundancy for voting record and voting session identifier data in that each vote is recorded by at least one additional independent and verifiable means: to wit, by electronic recording in the memory of a smart card separate from the voting machine and the printed record. This apparatus, and the method it performs, can provide 100% transparency of each and every vote and can maintain 100% privacy and confidentiality of each and every voter and vote, although other embodiments may not do so.

Figure 7:
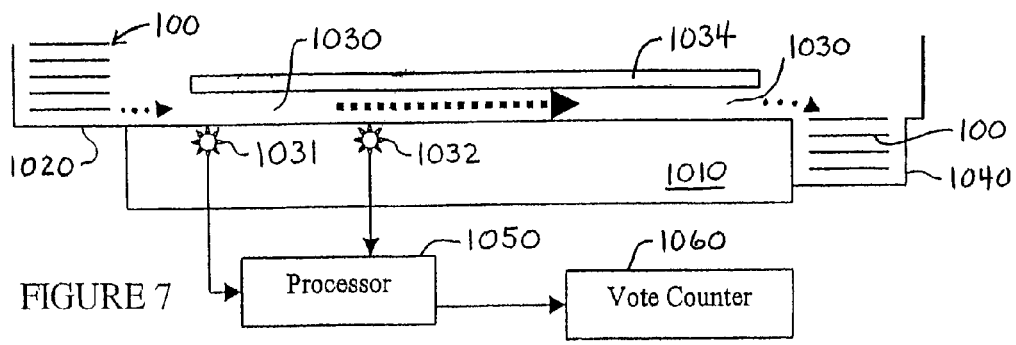
FIG. 7 is a schematic diagram illustrating an example ballot reader for reading optically read ballots of the sorts illustrated in FIGS. 1, 3A-3D and 4.

FIG. 7 is a schematic block diagram illustrating an example ballot reader apparatus 1000 for reading machine-readable ballots 100. Ballot reader apparatus 1000 includes reading device 1010 that has an input container 1020 into which ballots 100 to be read are placed for being fed through transport path 1030 to an output container 1040 into which ballots 100 that have been read as they pass through transport path 1030 are deposited, i.e. are collected. Therebetween, ballot transport path 1030 defines a path through which ballots 100 are transported for being read as they are transported between input container 1020 and output container 1040. Transport path 1030 includes two readers 1031 and 1032 of reader device 1010 which read the information and/or markings on ballots 100 as they pass thereby. Preferably, ballots 100 are optically-read ballots 100 of the sorts illustrated in FIGS. 1 and 3A-3D and readers 1031 and 1032 are optical readers. Member 1034 may be a guide for transport path 1030 that also provides a light shield for optical readers 1031, 1032.

It is noted that conventional optical readers have only one optical reader and must be preprogrammed with a template corresponding to the particular ballots to be passed therethrough and read, and so the ballots must be sorted by jurisdiction and the like so that only ballots of the same form, i.e. of the form that corresponds to the preprogrammed template, are passed through to be read at any one time. Ballots of different format must be passed through as separate batches after the corresponding template therefore has been programmed into the optical reader. Even if a conventional optical reader were to have two optical readers, both optical readers thereof would be programmed for reading the ballots against the same preprogrammed template, i.e. would be for making redundant readings for verifying the correctness of either reading against one predetermined preprogrammed template.

On the other hand, reader 1010 includes two readers 1031 and 1032 and a processor 1050 that cooperate for reading ballots 100 of different forms without the need to pre-sort the ballots into groups of like form. Specifically, optical reader 1031 reads ballots 100 for reading the VID number 120 thereon and communicates the VID number 120 to processor 1050. Reader 1031 need not read any other part of ballots 100. Processor 1050 is responsive to the VID number 120 read from each ballot 100 by reader 1031 to identify and select the ballot template corresponding thereto. Optical reader 1032 reads ballots 100 for reading the mark spaces 112 thereon that have been marked for comparison in accordance with the ballot template selected by processor 1050.

The VID number 120 read from each ballot 100 by reader 1031 should include at least the jurisdictional information fields thereof, e.g., fields 381-386, utilized to identify and select the ballot template. Optical reader 1031 should also read the unique random number field, e.g., field 387, so that the unique random number portion of VID 120 is associated with the stored voting selection information and is available for later verification of the ballot and/or of the correct reading thereof, as well as for tracking of his vote by the voter, e.g., via an Internet or other posting, as described herein. Where VID 120 is on ballot 100 in two different forms, e.g., in machine-readable form and in human-readable form, reader 1000 may have the ability to read both forms of VID 120, e.g., a bar-code reader and an OCR reader, usually in processor 1050.

Reader 1032 need not read portions of ballot 100 other than those containing valid mark spaces 112 according to the template corresponding to that ballot. The unnecessary portions of ballot 100 not containing valid mark spaces 112 may either not be read or may be read and then discarded while retaining the readings of mark spaces 112. Only images of the VID and mark space zones need be obtained and stored for tabulating and/or verifying voting by vote counter 1060. Images of the VID and mark space zones may be stored in any suitable electronic format including but not limited to .BMP, .TIFF, .PDF or any other suitable format. In this way, the amount of storage capacity needed to store the information read from each ballot is substantially reduced because the standardized information, e.g., names of contests, names of candidates, and the like, are not stored.

As a result, ballots 100 placed into input container 1020 do not have to be pre-sorted to be of the same format, but may be of different formats because readers 1031, 1032 in cooperation with processor 1050 determine the proper template to be utilized for reading each ballot 100 according to its format. Specifically, because the information in fields 381-386 of each VID number 120 printed on each ballot 100 define the particular voting jurisdiction (e.g., state, county, municipality, precinct, ward and/or political party), they also define the form of ballot 100 for such jurisdiction. From the VID number 120 read by optical reader 1031, processor 1050 determines the jurisdiction and the ballot form e and supplies the template therefore for use in conjunction with the pattern of mark spaces 112 marked on ballot 100 for determining the voting selections made thereon.

Simply put and by way of example, reader 1031 reads the VID number 120 from a first ballot 100 of form A and signals same to processor 1050 which then provides the mark space template for ballots 100 of form A for reading the marked voting selections from first ballot 100 read by optical reader 1032. The marked voting selections read by reader 1032 are then tabulated as votes by vote counter 1060. Next, reader 1031 reads the VID number 120 from a second ballot 100 of form B and signals same to processor 1050 which then provides the mark space template for ballots 100 of form B for reading the marked voting selections from second ballot 100 read by optical reader 1032, which read marked voting selections are then tabulated as votes by vote counter 1060. Next, reader 1031 reads the VID number 120 from a third ballot 100 of form C and signals same to processor 1050 which then provides the mark space template for ballots 100 of form C for reading the marked voting selections from third ballot 100 read by optical reader 1032, which read marked voting selections are then tabulated as votes by vote counter 1060. If the next ballot is of form B, for example, reader 1031 reads the VID number 120 from that ballot 100 of form B and signals same to processor 1050 which then provides the mark space template for ballots 100 of form B for reading the marked voting selections from that ballot 100 read by optical reader 1032, which read marked voting selections are then tabulated as votes by vote counter 1060, and so forth. The process repeats for each ballot read by reader 1000 wherein the template for each ballot is selected by processor 1050 responsive to the VID number 120 read from that ballot, i.e., specifically responsive to the jurisdictional information defined in fields 121-127 of VID number 120.

Accordingly, an optical reader for reading paper ballots having a jurisdiction identifier thereon and having voting selections marked thereon, comprises a transport path for transporting paper ballots between an input and an output thereof; a first optical reader for reading the jurisdiction identifier of each paper ballot transported on said transport path, and a second optical reader for reading the voting selections marked on each paper ballot transported on the transport path. A processor receives the jurisdiction identifier read by the first optical reader for each paper ballot for selecting a template for reading in accordance with the selected template the voting selections marked on each paper ballot, whereby the voting selections marked on each paper ballot are read in accordance with a template corresponding to the jurisdiction identifier for that paper ballot.

In addition and optionally, processor 1050 may include optical character recognition (OCR) software to provide alphanumeric outputs of the information in the VID field read by reader 1031 and/or of write-in information in the write-in portions of the voting fields read by reader 1032 according to the template selected by processor 1050. It is preferred that reader 1000 move ballots through transport path 1030 at the rate of at least about 10-12 inches per second (about 25-30 cm/sec.) so that ballots on either 8½×11 inch paper and/or on A4 paper may be read at a rate of at least about one ballot per second. It is also preferred that readers 1031 and 1032 have a resolution of at least about 100 dpi or greater, and it is desirable in some cases that reader 1000 provide dual-side document scanning.

Reader 1000 may be utilized at a polling place or other voting location for "checking" ballots marked by voters prior to their being voted, i.e. officially deposited into a collection container. In this case, vote counter 1060 is eliminated and no record of the actual voting selections marked is retained; processor 1050 processes only the VID number 120 and the mark space 112 regions to select the corresponding ballot template and to verify that the proper number of mark spaces have been marked for each contest and/or question.

Reader 1000 in checking a ballot preferably signals or otherwise provides a notice or indication if a ballot is under voted (i.e. less than the required number of spaces have been marked for each contest/question) or is over voted (i.e. more than the required number of spaces have been marked for each contest/question, which may invalidate a vote in a contest/question or may invalidate an entire ballot) or is otherwise incorrectly marked. Ballot checking may be utilized with straight voting, ranked voting, and/or cumulative voting similarly, e.g., indicating if improper ranking has been marked and/or if the wrong number of cumulative votes have been marked. While such checking function advances the goal that ballots reflect voter intent, it can reduce but not eliminate under voting and over voting; however, it will at least give the voter an opportunity to correct such condition or at least indicate an intentional "no vote" if a "No Vote" or "Abstain" mark space 112 is marked.

Ballot checking may avoid or at least mitigate the condition where the intent of the voter cannot be determined because under and over voting can be reduced and/or eliminated. However, where applicable law allows, under and over voting in cumulative voting contests may be adjusted and/or rectified when the ballot is counted by applying proportioning and/or normalizing rules to the votes actually cast by marking mark spaces, e.g., by adding or subtracting a proportionate weighted vote. Ballot checking may be preformed by a reader 1000 or by an other ballot reader such as a ballot imager based on commercial office imaging equipment.

Reader 1000 utilized for ballot checking may also have a printer associated therewith for providing a tangible voting record, e.g., a printed receipt, to each voter, as described in patent application Ser. Nos. 09/737,306 and 10/255,348. Desirably, such printed receipt includes the complete VID 120 including the unique random portion 381 so that the voter may track and verify his vote where the voting results are available via an Internet and/or other posting including the VID. Preferably, the VID read from the read ballot is printed on the receipt. If the receipt includes a record of the voter's voting selections, the receipt also provides an immediate confirmation that the ballot can be read and of the voting selections marked, whereby the voter may seek correction of any error and/or omission prior to voting his ballot.

While the reader arrangement described in the immediately preceding paragraphs is preferred, optical ballots 100 including a VID number as described herein may be sorted and read by conventional readers in the conventional manner, assuming, of course, that the election officials are willing and able to sort the paper ballots into groups of like form and to program the conventional readers for each particular ballot form before running ballots of that form therethrough for counting. Ballot readers as described herein may utilize all or part of conventional ballot readers and/or may utilize parts of conventional office equipment such as copiers, scanners, facsimile (fax) machines, and other commercial imaging and/or scanning devices, and the like, e.g., for imaging and/or optically reading the information contained on an optically-readable paper ballot.

Examples of conventional ballot readers include the SCANMARK ES2800 reader available from Scantron located in Tustin, Calif. It is noted that such conventional ballot readers employ sensors positioned on a fixed grid pattern (e.g., in columns) corresponding to the fixed grid pattern of the mark-sense spaces of the ballot sheets with which they are utilized, and such readers do not image a ballot and so they cannot identify or determine pixel density and/or location as may be done for a true ballot image as described herein. An example of a conventional optical image scanner includes the PAGESCAN II reader available from Peripheral Dynamics, Inc. located in Plymouth Meeting, Pa.

It is noted that this scanner can provide an image of a ballot or other document or sheet, and can be programmed to define multiple image areas. Examples of commercial imaging scanners include types DR5020 and DR5080 available from Canon Electronics, Inc. located in Japan, and type IS330DC available from Ricoh Company located in Japan. Examples of commercial printers suitable for ballot printing include the ImageRUNNER 600 and 105 available from Canon Electronics, Inc., and similar equipment available from Hewlett Packard of Palo Alto, Calif. and Fujitsu of Japan.

In addition, a "trial" ballot reader is preferably provided at each polling place so that a voter has the opportunity to have his voted ballot scanned privately and to have the voting selections read therefrom be displayed to him privately so that the correctness thereof may be confirmed before the ballot is cast. Preferably, the trial ballot scanner should employ the same reading apparatus and method as the ballot scanners that will read the ballot in counting and tabulating the vote. In any event, the trail ballot reader should be "read only" and have no memory or ability to store or transmit the voting selections from any ballot, whether by template and/or image, thereby to assure privacy. I.e. it is for vote checking only.

Figure 8:
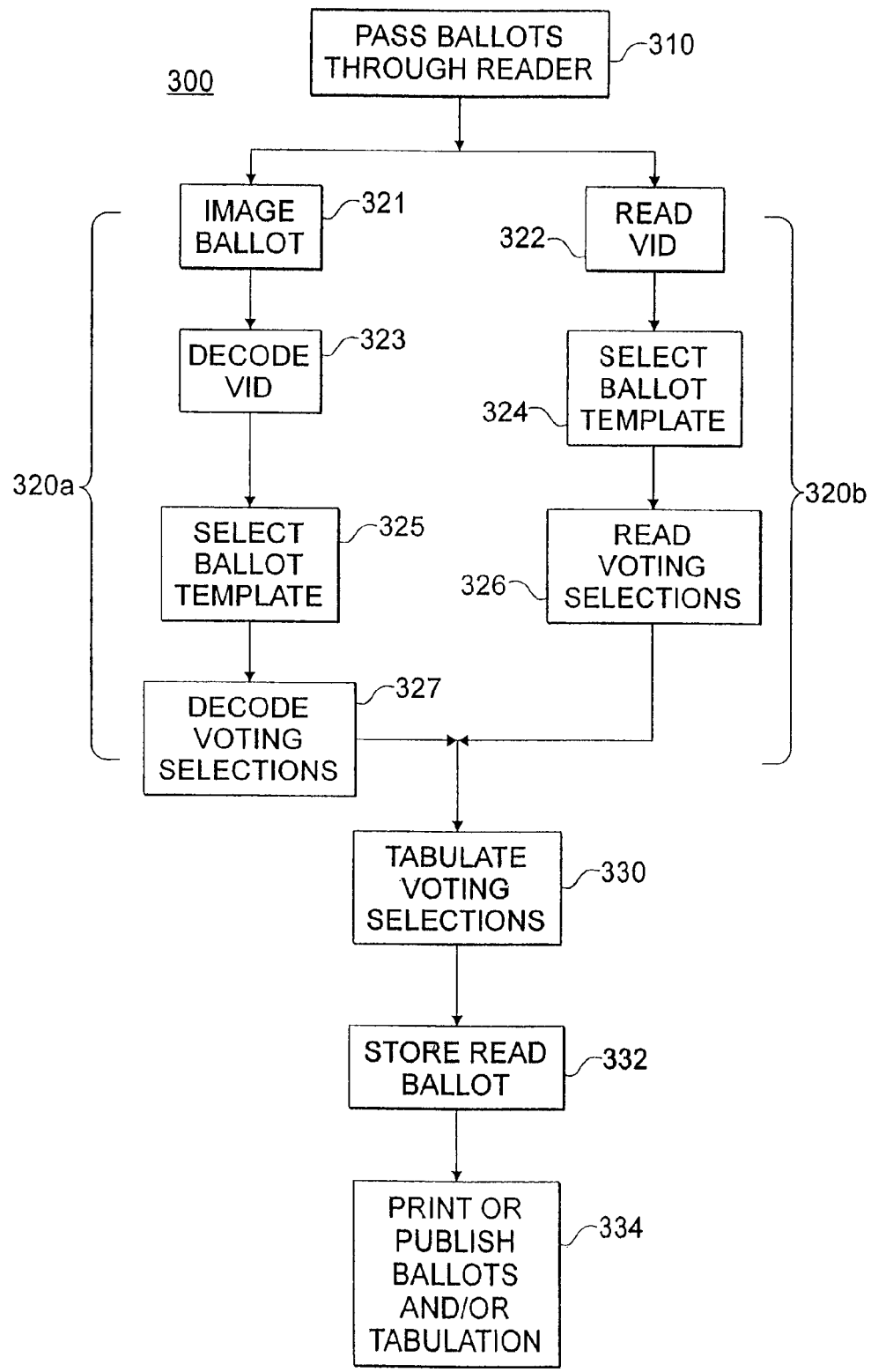
FIG. 8 is a schematic flow diagram of an example ballot reading process compatible with the apparatus of FIG. 7.

FIG. 8 is a schematic flow diagram of an example ballot reading process 300 compatible with the apparatus of FIG. 7. Process 300 commences with passing 310 the voted ballots through a ballot reader, e.g., along a transport path of an optical scan reader, wherein the ballots do not need to be, but may be, sorted according to jurisdictions and/or ballot formats. The ballots are individually and serially read/imaged and the voting information thereon is read/decoded via either of alternative processes 320a or 320b. Path 320a comprises imaging 321 each ballot and then decoding the voting selection information thereon in two decoding steps 323, 327. Path 320b comprises reading the ballots in two steps 322, 326, wherein the voting selection information is read in second reading step 326. In either path, the ballot template (e.g., a set of computer instructions and/or statements and/or data defining a pattern of ballot mark spaces for a ballot) for reading/decoding the voting information is selected responsive to the voting identifier and/or ballot identifier read/decoded in the first reading/decoding step 322, 323.

Ballot imaging process 320a comprises imaging 321 the ballot to acquire an image of the voting information thereon and then decoding 323 a ballot identifier (e.g., VID) from the ballot image. While the entire ballot identifier (e.g., VID) may be decoded, only that portion thereof that contains jurisdiction information (e.g., ones of fields 381-386) need be decoded; decoding the unique random identifier portion (e.g., field 387) is optional). The decoded identifier correlates to a particular ballot format represented by a ballot template, and the ballot template corresponding to the decoded identifier is selected 325 from a database or other collection and/or set of ballot templates for decoding 327 the voting selection information from the ballot image previously imaged 321. Thus, each ballot of a mixed set of ballots is read (decoded) according to a template corresponding to the particular ballot format to obtain the voting selection information thereon.

Ballot imaging process 320b comprises reading 322 the ballot to read a ballot identifier (e.g., VID) thereon, typically in a predefined location, area or region of the ballot. While the entire ballot identifier (e.g., VID) may be read, only that portion thereof that contains jurisdiction information (e.g., ones of fields 381-386) need be read; reading the unique random identifier portion (e.g., field 387) is optional). The read identifier correlates to a particular ballot format represented by a ballot template, and the ballot template corresponding to the read identifier is selected 324 from a database or other collection and/or set of ballot templates for reading 326 the voting selection information from the ballot. While the entire ballot may be read 326, only that portion containing voting selection information according to the selected template 324 need be read. Thus, each ballot of a mixed set of ballots is read according to a template corresponding to the particular ballot format to obtain the voting selection information thereon.

It is noted that the foregoing reading/imaging 321, 322, 323, 326, 327 of the VID and voting selections, and the template selecting 324, 325, and/or the tabulating 330 and storing 332, may be performed in "real-time" as each ballot is read, i.e., the voting selections are read/decoded, stored 332 and tabulated 330 substantially contemporaneously with the ballot passing through reader 1010. Alternatively, the VID and voting selections read/imaged 321, 322, 326 may be stored in "real-time" as each ballot passes through reader 1010, and the template selecting 324, 325, the decoding/reading 322, 323, 326,327 of the stored VID and voting selections, and the tabulating 330 and storing 332 thereof may be performed after some or all of the ballots have passed through reader 1010, i.e. delayed in time.

It is further noted that in reading ballot 100, it is preferred that the ballot image be read/decoded 326, 327 to determine whether or not all of the mark spaces 112 as defined 324, 325 by the appropriate ballot template, and the indicia 122, if any, are present in the ballot image, thereby to enable detection of an anomalous and/or erroneous ballot 100, and/or to detect that a ballot 100 is, e.g., folded, torn, altered or otherwise incomplete or incorrect. Where an indicia 122 is employed to define the orientation of each ballot and a VID is employed to define the ballot form, the ballots may be in any order and orientation, the ballots need not be sorted by jurisdiction and/or voting district or the like and need not be placed in a given orientation prior to being read/imaged and/or decoded 321, 322, 323, 326, 327.

The voting selection information read/decoded 326, 327 is tabulated 330 for counting the vote and determining an election outcome/result. The read/decoded 326,327 voting selection information may be stored 332, e.g., for later verification, auditing, confirmation and/or comparison with the paper ballots and the like, and may be printed and/or otherwise published 334, in whole or in part, in connection therewith. The steps of tabulating 330, storing 332 and/or printing/publishing 334 may be either with or without the voter identifier (e.g., VID) and/or other ballot identifier.

In addition, it is sometimes, if not usually, preferred that the printing and/or publishing 334 of voting results be positively blocked prior to a predetermined time, e.g., prior to the end of the time for voting. This, for example, allows absentee ballots received prior to the election to be authenticated, read and/or tabulated prior to the end of the election period while the results thereof are not available until after the time for voting is completed. Advantageously, this may allow election personnel to more efficiently process both absentee ballots and the regular voted ballots.

An advantage may obtain, however, where the tabulated 330 and/or stored 332 voter selection information is associated with the identifier where the identifier is not related and/or relatable to the identity of a particular voter, i.e. the voter remains anonymous. In such case, particular ballots can be inspected against the electronic records without compromising voter anonymity and privacy, including publishing voting results on a ballot—by ballot basis, e.g., via the Internet, as described in incorporated patent application Ser. Nos.

09/737,306 and 10/255,348. Such ability to verify that a ballot has been received and has been counted could be desirable for absentee and/or provisional voters, as well as for general voting.

Figure 9:
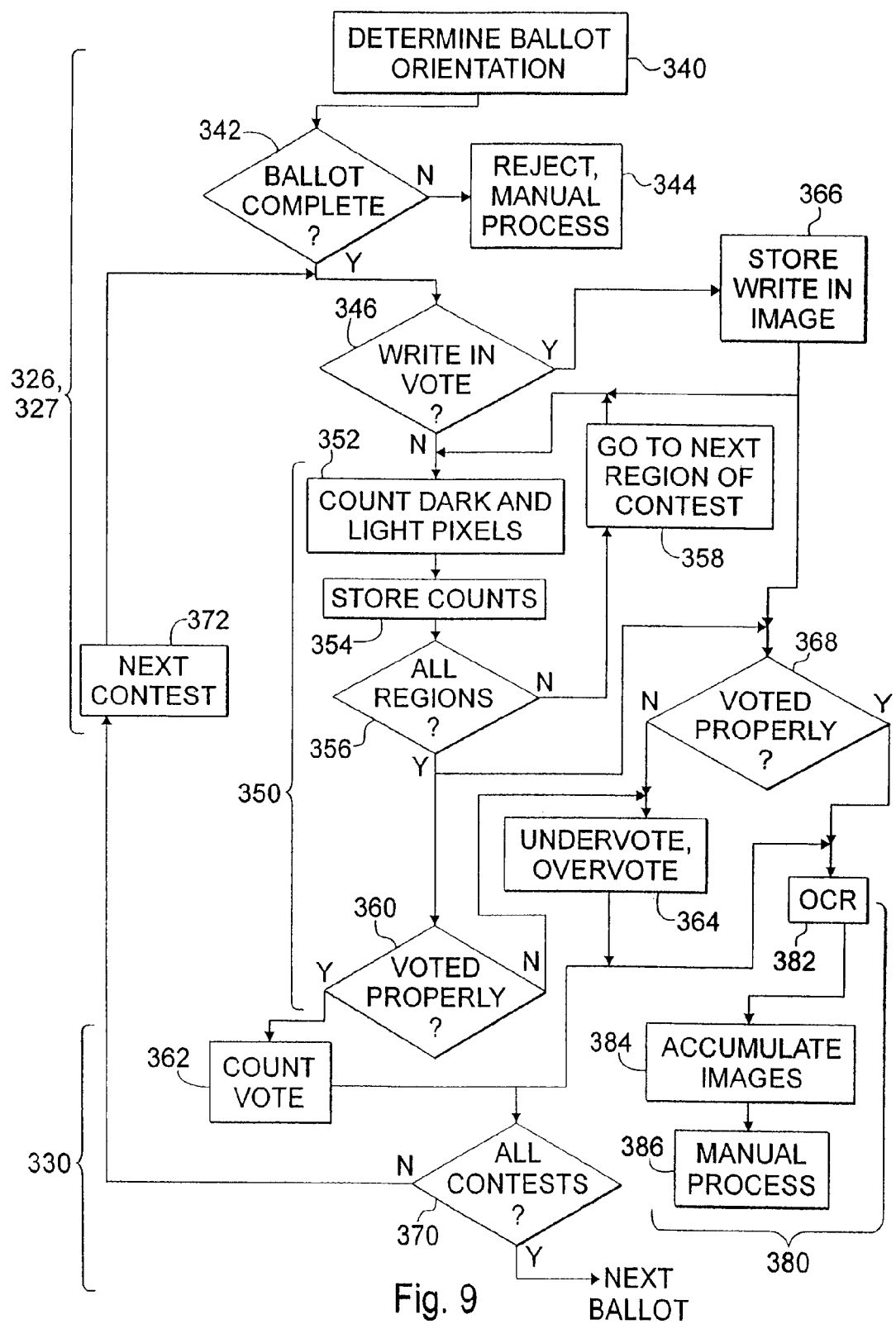
FIG. 9 is a schematic flow diagram illustrating details of a portion of the ballot reading process of FIG. 8.

FIG. 9 is a schematic flow diagram illustrating details of a portion of the ballot reading process 300 of FIG. 8. In particular, an example of details relating to the steps of decoding 327 voting selections, reading 326 voting selections and/or tabulating 330 voting selections using the selected 324, 325 ballot template are illustrated. In a preferred embodiment, ballots are imaged, read and/or decoded 320a, 320b irrespective of the orientation of each ballot as it is passed through the ballot reader and/or irrespective of the jurisdiction, voting district, precinct and the like to which it pertains.

First, the orientation of each ballot is determined 340 from the location(s) of one or more indicia disposed in an asymmetrical pattern on the ballot, and then the ballot image and/or the selected 324, 325 template therefore is electronically oriented to be in the same orientation. Before, after, and/or contemporaneously therewith, the ballot is tested or checked 342 to verify that it is a complete ballot, i.e. that it includes all of the indicia 122 and marking space 112 outlines that the ballot should include as defined by the selected 324, 325 template, and so is not torn, folded, altered and the like. If the ballot is not complete 342, path "N" is taken and the ballot is rejected, e.g., is physically separated from the other ballots for manual verification and processing.

If the ballot is complete 342, the path "Y" is taken and the ballot is tested 346 to determine whether there is any write-in voting selection thereon. If testing 346 finds any one or more write-in voting selections, the path "Y" is taken and, preferably, the portion(s) of the ballot image containing a write-in voting selection(s) are stored 366, preferably along with the ballot VID for later verification, if necessary or desired. Typically, write-in voting selections are processed separately from voting selections from among the nominated candidates or other regular voting selections. Ballot processing then proceeds to the detail steps of decoding 350 the regular voting selections, i.e. those made by mark space(s) 112.

If testing 346 finds no write-in voting selection is present, then path "N" is taken directly to the detail decoding 350 of regular voting selections. Decoding 350 includes a number of steps that determine whether each mark space 112 has been marked to indicate that a voting selection has been made or has not been so marked. For example, the pixels of the ballot image, e.g., in a TIFF or BMP or other bitmapped or pixelated format, for each mark space 112 are tested to determine whether it is a "light" (e.g., not marked) pixel or a "dark" (e.g., marked) pixel. The number of "light" and "dark" pixels for each mark space 112 are counted 352 and the counts of "light" and "dark" pixel are stored 354. Preferably, the ballot VID is associated with the stored counts of "light" and "dark" pixels thereof, e.g., for auditing and/or recount. If a sufficient portion of the tested pixels in a given mark space are "dark" pixels, then that mark space 112 is considered to be marked, e.g., as described below.

Testing 356 determines whether all of the mark spaces 112 of a contest have been counted 352 and the counts thereof stored 354. If not, path "N" is taken to go to 358 the next region of the contest repeat the pixel counting 352 and storing 354 until all of mark spaces 112 have been processed. When all mark spaces 112 of a contest have been processed, the path "Y" is taken from testing 356 to determine 360 whether the contest has been voted properly, i.e. whether the proper number of mark spaces have been marked. If the proper number of mark spaces 112 have been marked, the path "Y" is taken and the voting selection for that contest is counted 362. If either too many (over vote) or too few (under vote) mark spaces 112 have been marked, the path "N" is taken and the under vote or over vote is stored for later processing. If an under vote, the voting selections made can be counted 362, if the applicable law allows.

In addition, if there is a write-in voting selection, the fact thereof is tested 368 with the affirmative result of the all regions counted test 356 at path "Y" to determine 368 whether the contest is voted properly considering the presence of a write-in voting selection. If not, then path "N" is taken and an over vote or under vote is recorded 364. If the voting selection is determined 368 to be proper, then path "Y" is taken and the write-in voting selection is processed 380.

Following the counting of a voting selection 362, an under vote or over vote 364 or a "Y" determination 368, testing 370 determines whether all contests for that ballot have been counted and processed. If not, path "N" is taken to the next contest 372 which is then processed 350 and so forth as described. If yes, path "Y" is taken and the next ballot is then processed in like manner to that just described until all of the ballots have been processed and the voting selections thereon have been counted and tabulated 330.

Separate processing 380 of write-in voting selections may proceed as follows, typically after all the regular voting selections have been tabulated. Optionally, the write-in voting selections may be converted to alphanumeric characters by optical character recognition (OCR) 382. The stored 366 images of the write-in voting selections are accumulated 384, with their corresponding OCR result, if any, and are displayed for manual processing 386, including validation, by election officials. The display may be on a computer display or the like or may be a printed form, as may be desired and/or required by applicable law.

Preferably, write-in voting selection images are "clipped" from the ballot images and have the ballot VID associated therewith, and plural clipped images are displayed on one screen or printed on one page. Manually processed 386 valid write-in voting selections are counted and tabulated 330 with the total vote. In processing write-in voting selections, either the clipped image is displayed, or if the ballot VID is associated therewith, the entire ballot image may be displayed or the original ballot may be retrieved for use in manual processing 386. Where the ballots are read, not imaged, based upon comparison to a ballot template, only the result of reading the ballot is stored, and so the original ballot is preferably separated and kept for manual processing 386 of write-in voting selections.

A typical ballot image in a pixel or bitmap format may have a file size in the range of 3-500 kilobytes, depending upon the format and the degree of file compression utilized, but could be as large as 1-10 megabytes without file compression. A computer hard drive of the sort typically found in a current commercially available personal computer, e.g., of 60-100 gigabytes capacity, can easily store full-ballot images (of nominal or average 500 kilobyte size) for a population of 100,000 voters. One or more servers may be utilized for storing ballot images for a population of one million or more voters.

Typically, full ballot images are stored initially on the hard drive of a computer and are later transferred to permanent storage media, e.g., a "write-once, read-many" (WORM) medium such as a CR-R disk, for long-term storage. Reduced images, whether by compression and/or by "clipping" the portions of the ballot image that include mark spaces, write-in voting spaces, identifiers and the like, and other information pertinent to voting selection other than the standard information and candidates names printed on the ballot, may be utilized to reduce the quantity of information that needs be processed on counting and tabulating the vote and/or that needs to be stored. Such techniques can be utilized reduce the size of each ballot image file to as low as 10 kilobytes or less.

Figure 10A:
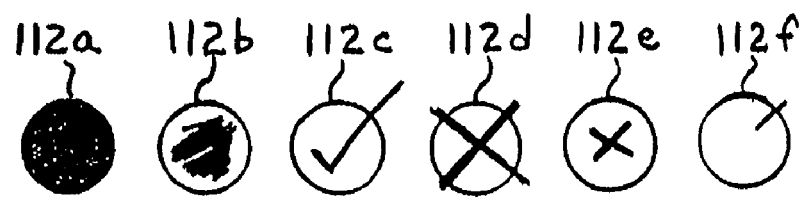
FIGS. 10A, 10B, and 10C are schematic diagrams of mark spaces of a ballot marked in a variety of ways and of details thereof.
Figure 10B:
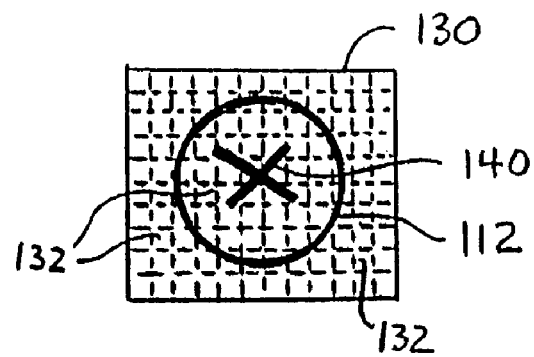
Figure 10C:
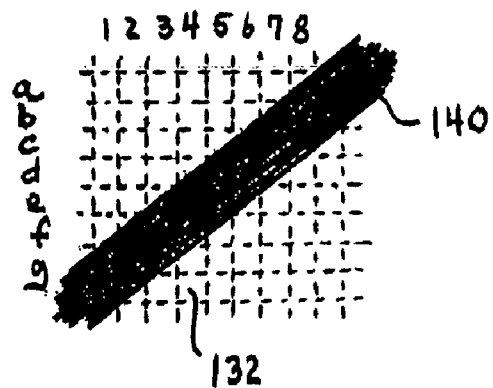

FIGS. 10A, 10B, and 10C are schematic diagrams of mark spaces 112 of a ballot 100 marked in a variety of ways and of enlarged diagrams illustrating details thereof, and are helpful to understanding a preferred aspect for counting voting selections of the method described herein.

FIG. 10A illustrates some of the various ways that a voter may mark a mark space 112 in making a voting selection. For example, mark space 112a has been fully marked by the voter so that it is essentially 100% filled in and there is no question that the voter intended to mark that region 112a and it should be counted as a vote. Mark space 112b is partially marked and may be about 50% filled in, and it is likely the voter intended to mark that region 112b and it should be counted as a vote. Similarly, mark spaces 112c, 112d and 112e are marked with a check, a large X and a small x, respectively, and it is likely that the mark was intended and should be counted as a vote. However, mark space 112f contains a small mark that may be an intended or unintended mark therein, and so may or may not be counted as a vote.

Each ballot image captured by ballot reader in reading ballots 100 must be read to determine which ones of mark spaces 112 thereon have been marked sufficiently to count as being marked to indicate a voting selection and which ones have not. The ballot reader produces a ballot image, whether of the entire ballot or only of portions thereof selected in accordance with the applicable ballot template, that is preferably in a pixelated or bitmapped format, e.g., a TIFF or a BMP image, or other bitmapped format. Ballot images in such format may be produced directly by a commercially available office copier or scanner or may be converted to such format, if necessary, or may be provided by a specialized ballot scanning apparatus.

FIG. 10B illustrates a reading region 130 of a ballot which contains a marked mark space 112. Based on the applicable ballot template, e.g., the template selected 324, 325 from among the possible ballot templates using the VID number read/decoded 322, 323 from the ballot, a number of reading regions 130 each including one mark space 112 are selected from the ballot image. Each reading region 130 is preferably slightly larger than and includes one mark space 112. Each region includes a large number of pixels 132 as illustrated by the dotted grid lines, e.g., representing an over scan of mark space 112. Mark space 112 includes mark 140, e.g., a mark made by a voter to indicate a voting selection.

For clarity, only a few rows and columns of pixels are illustrated, it being understood that a large number, e.g., 800-1000 pixels is typical. In one embodiment, reading region 130 includes about 900 pixels. Because each reading region 130, whether or not marked by a voter, includes the printed outline of mark space 112, a predetermined number of the pixels representing the mark space 112 outline will be "dark" pixels. In one embodiment, the outline of mark space 112 includes about 100 dark pixels, with a tolerance of about ±40 pixels due to ballot to ballot variations, e.g., printing variations, outline-to-pixel pattern registration differences, reading/imaging differences, scanner lighting variations, sensor noise, and the like.

One preferred arrangement for determining whether a mark space 112 has been marked to indicate a voting selection is as follows. The maximum number of pixels 132 that a mark 140 could darken (i.e. the number of "markable pixels") is determined by subtracting the number of pixels of the outline of mark space 112 from the total number of pixels 132 in reading region 130. For the example embodiment, the number of markable pixels is 900−100=800 pixels.

A predetermined threshold of dark markable pixels (e.g., the "voted threshold") is established for determining that a mark space 112 has been marked (voted). For example, voted thresholds of between about 20% and about 50% of the maximum number of markable pixels 132 have been found satisfactory, and are preferred, although higher or lower voted thresholds are satisfactory and may be utilized. If a higher percentage voted threshold were to be utilized, the effect is that the voter is being required to more fully darken the mark space 112 in order for a voting selection to be considered as such. If a lower percentage voted threshold is established, then mark space 112 outlines having a positive tolerance and/or reading "noise" could determine that a voting selection has been made when none was intended. In some tests, thresholds of about 10% and less were found to produce readings of a voting selection where none was intended.

To determine whether a voting selection has been made in a given mark space 112, the number of pixels of the mark space outline is subtracted from the number of marked pixels, and the difference is compared with the predetermined voted threshold. This provides additional safety margin against erroneous reading because the number of dark pixels of the mark space outline is subtracted both in calculating the voted threshold and in determining the number of pixels that have been read as marked by the voter.

In the example embodiment, a voted threshold of 20% is equal to 160 marked pixels (20% of 800 markable pixels), and a threshold of 50% is equal to 400 marked pixels, in a reading region 130. It is noted that using the lower voted threshold of 20% requires that at least 160 marked pixels be present which is about four times the expected tolerance of 40 pixels of the outline of mark space 112 and so an unmarked mark space 112 will be unlikely to be erroneously determined to be a voting selection.

An advantage obtains where the counts of the numbers of "light" and "dark" pixels are stored for each mark space 112 of each ballot, as is preferred, but is not necessary, as described above. After the ballots are read/imaged, their "light" and "dark" pixels counted and stored, and voting selections counted and tabulated with a given predetermined voted threshold, the predetermined voted threshold may be changed and the voting selections recounted and re-tabulated using the stored "light" and "dark" pixels counts, without having to again scan the ballots. This is performed quickly and electronically, without the need for scanning or otherwise processing the original paper ballots, and ballot images may be inspected in case of a question.

Thus the effect of changing the value of the predetermined voted threshold on the tabulated election result may be determined, and may be compared with the election result (e.g., the vote margin of the winning candidate) for determining whether that effect is significant with respect to the outcome of the election. Where the ballot VID is associated with the stored pixel counts, as is optional but is preferred, the ballots for which the reading of the voting selection is changed by the changing of the predetermined voted threshold may be identified, and may be obtained for visual inspection by voting officials. Typically, the differences in reading voting selections provided by the foregoing ballot reading and counting arrangement have been found to be relatively small, and so would not be significant in terms of an election result in all but the closest of elections.

Because the counts of dark and light pixels are stored in the pixel-based preferred arrangement, it is quite easy to vary the predetermined threshold for what is and is not a voted (marked) mark space and to determine the variance if either a higher or lower threshold had been utilized (i.e. a higher or lower percentage of filled area of the mark spaces 112). For example, a typical predetermined threshold level might be set at 20%, 25%, 30%, 35% or 40%. Once the votes are read and counted using the predetermined threshold, it is quite easy to perform one or more recounts with the threshold set at a higher or lower threshold level utilizing the stored counts of light and dark pixels without having to re-scan (re-image) and reprocess the ballots.

For example, where the ballots are initially read and decoded utilizing a predetermined threshold of 30%, the results can be tested and compared simply by setting the predetermined threshold to 20% and recounting using the stored counts of light and dark pixels and then to set the predetermined threshold to 40% and again recounting using the same stored counts of light and dark pixels. The differences in vote tallies generated using different predetermined thresholds of light and dark pixels will determine the sensitivity of the vote count to the relative level of marking filling of the vote selection mark spaces.

Further, where the preferred arrangement is employed wherein the ballot identifier (VID) is associated with the ballot image and the stored counts of light and dark pixels, the voting results obtained for each ballot for each predetermined threshold level may be compared and the ballots for which the voting result changes when the predetermined threshold is varied may be identified by their respective ballot identifiers (VIDs) and may then be retrieved for manual inspection, e.g., by an election official and/or a court or other authority conducting an examination of the voting result.

Thus, the described arrangement facilitates the identification of those ballots for which voter intent may be in issue and also provides means whereby the ballots in question may be identified and evaluated automatically and without subjective human intervention. If this arrangement had been utilized in the November 2000 presidential election in the United States, for example, then the recounting of votes in certain counties of the state of Florida would have been much quicker and accurate, and may have been freed from the taint and embarrassment of partisan human interpretation.

FIG. 10C illustrates an enlarged view of a portion of reading region 130 which contains a portion of a mark 140 in mark space 112 (or of an outline of a mark space 112). Therein, dashed lines indicate rows a, b, c, . . . and columns 1, 2, 3, . . . . of pixels 132 on which a portion of a mark 140 (or a mark space 112 outline) is superimposed, and pixels 132 are designated as "x-y" where "x" is the letter of the row thereof and "y" is the number of the column thereof, e.g., the pixel at row a, column 1, is designated as pixel "a-1." It is seen that while a mark 140 completely fills some pixels 132, it does not either completely fill or completely not fill all pixels 132. Thus a criteria is needed to determine whether any given pixel is "dark" or is "light," i.e. is not dark.

One convenient criteria is that the pixel is considered "light" if the intensity (brightness) of a pixel is greater than 50% of full brightness and is considered "dark" if its intensity (brightness) is less than 50% of full brightness, although any other suitable level could be utilized. Thus, illustrated pixels b-1, c-1, c-4, and f-7, among others, are "light" and illustrated pixels f-3, d-6, c-7 and b-8, among others, are "dark." Other illustrated pixels, such as pixels f-2, e-3, g-3 and e-6, among others, are more than 50% covered by mark 140 and so would be considered "dark" pixels, while illustrated pixels f-1, b-6, f-5 and d-8, among others, are less than 50% covered by mark 140 and so would be considered "light" pixels.

Pixel intensity (brightness) is tested for each pixel and each pixel is determined to be either "light" or "dark" and the total numbers of "light" and "dark" pixels, respectively, are counted for each reading region 130, as described above. Because the processing of each reading region 130 as described above makes provision for variations in reading characteristics, the accuracy of counting of voting selections is not particularly sensitive to the predetermined intensity threshold that is utilized for determining "light" and "dark" pixels. It is noted that the preferred threshold of 50% is symmetrical and tends to avoid a statistical bias towards determining whether any given pixel is a "light" pixel or a "dark" pixel.

Figure 11:
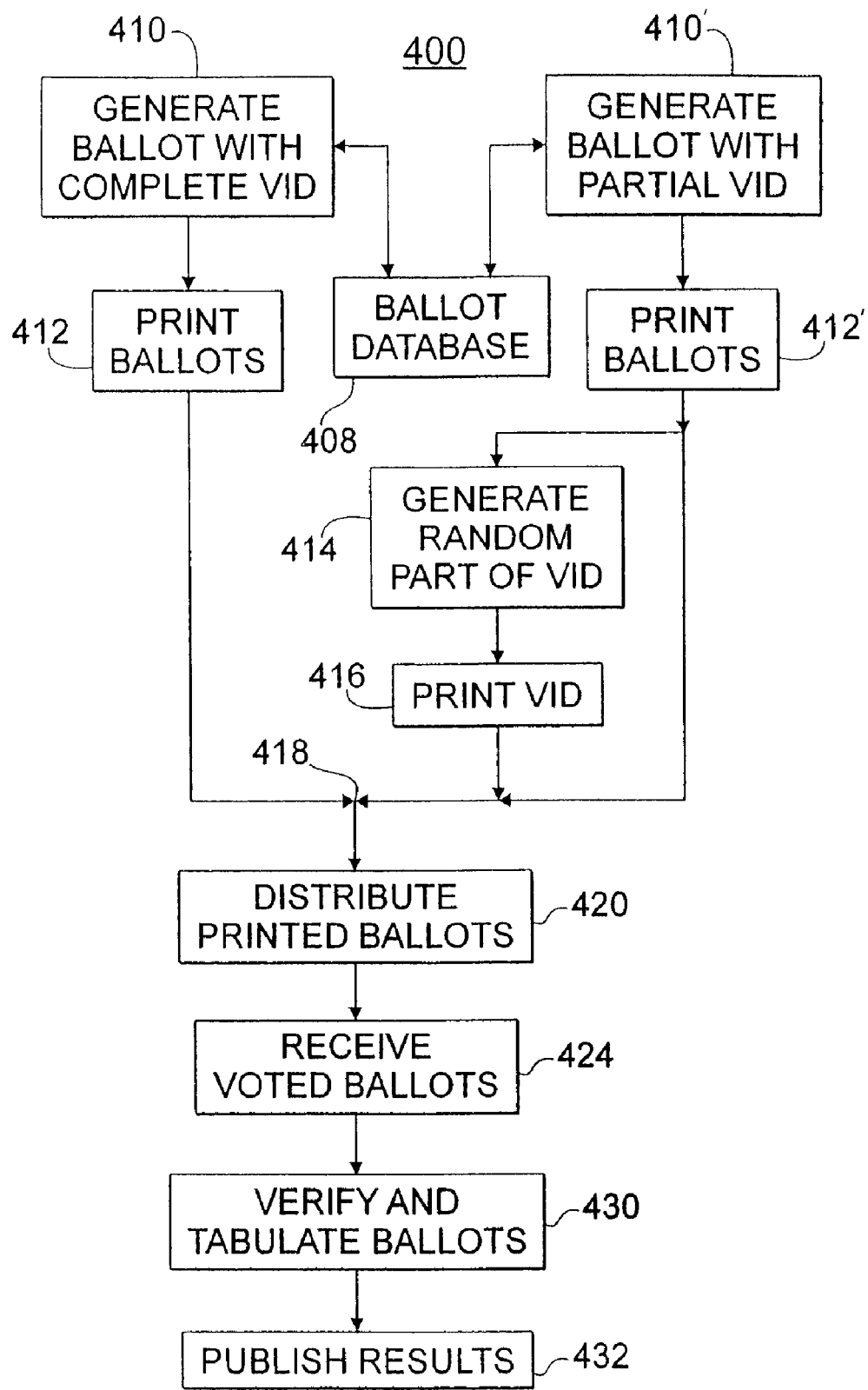
FIG. 11 is a schematic flow diagram of an example process for generating the ballots of FIGS. 1, 3A-3D and 4.

FIG. 11 is a schematic flow diagram of an example process 400 for generating the ballots of FIGS. 1, 3A-3D and 4. In process 400, a ballot is generated 410, 410' including the contests and/or questions to be presented to the voters generated from information entered by election officials prior to an election. Typically, election officials generate a database 408 of ballot forms (styles) for the various jurisdictions, districts, polling locations and the like, and in the case of a primary, for each political party, each being associated with a particular jurisdictional portion of the voter identifier (VID). In printing ballots, the appropriate form/style is selected from the database 408 thereof in accordance with the jurisdictional portion of a particular VID, e.g., ballot generation as described herein and/or in incorporated patent application Ser. Nos. 09/737,306 and 10/255,348.

Ballots may be generated 410 with a complete voter identifier (VID), i.e. an identifier including the jurisdictional information (e.g., fields 381-386) and a unique random identifier (e.g., field 387), and printed 412 as a set of unique ballots, either in advance of an election and/or "on-demand" in an election. Ballots may be generated 410' with a partial voter identifier (VID), i.e. an identifier including the jurisdictional information (e.g., fields 381-386), and printed 412' as a set of identical ballots either in advance of an election (e.g., conventional printing) and/or "on-demand" in an election. Such ballots may be utilized directly, i.e. without the unique identifier portion of the VID, or a unique random identifier (e.g., field 387) portion of a voter identifier may be generated 414 and may be printed 416 on the ballots to provide a set of unique ballots and/or may be printed on labels to be affixed to the printed ballots at a later time. A list of the voter identifiers utilized on ballots may be retained, e.g., in a database on a computer, for later use in verifying and/or authenticating voted ballots received 424, and may be without compromising voter anonymity and privacy where no record is kept that could relate a particular ballot to a particular voter. Further, printed ballots including the VID may be placed into envelopes, e.g., absentee ballots placed into mailing envelopes, by automated equipment to reduce the possibility of human action that may compromise privacy and/or anonymity.

In either case, the printed ballots with a complete VID and/or with a partial jurisdictional VID are distributed 420 for being utilized by voters in voting in an election in accordance with the applicable election procedure, e.g., by marking their voting selections in the mark spaces provided. It is noted that the ballots may be distributed 420 in advance of an election, e.g., as absentee ballots or as ballots for early voting, may be distributed 420 during an election as the usual ballot for all voters, e.g., at polling locations on an election day or days, and/or may be distributed 420 to particular voters, e.g., to voters voting provisionally.

Absentee ballot envelopes may be printed in like manner to that employed for printing ballots, i.e. either as a batch printing process 412 and/or on demand 412'-416. An envelope voter identifier (EVID) may be printed on each envelope or later applied, e.g., by label, that includes fields identifying the jurisdiction and ballot type, with or without a unique randomly-generated identifier, in similar manner to the VID utilized on the ballot. The EVID may be utilized to identify the envelope/ballot upon distribution 420, e.g., sending/mailing out to the voter, and upon return 424, and facilitates automated placement of ballots into envelopes as described.

Marked (voted) ballots are received 424, e.g., by election officials, the ballots having been submitted by mail, in-person or other delivery method, e.g., in the case of absentee ballots or ballots for early voting, by deposit in ballot containers or delivery to an election official at a polling location or other designated location, e.g., as the usual ballots voted and/or as provisional ballots. Ballots voted as absentee, early and/or provisional voting ballots are typically sealed in a plain opaque envelope after the voter marks his voting selections thereon and the plain envelope is then sealed inside an opaque outer envelope on which is marked the voter's name and address, the election, jurisdiction, date, and/or other particulars, and a voter signature, and/or the identification and signature of a witness. Each ballot is verified 430, i.e. the information on the outer envelope is utilized by election officials to determine whether the ballot sealed therein should be opened and counted. Such determination may include, e.g., whether the voter is eligible to vote, whether the voter signature on the envelope matches the voter signature in the voter registration records, and/or whether the ballot is a valid ballot for the particular election (possibly including whether the ballot is a duplicate of another vote in the name of the voter).

Upon return 424 of an absentee ballot and before opening it to obtain the ballot therein for counting, the envelope EVID on the outer envelope is read and is utilized for authenticating/verifying 430 the absentee ballot and for indicating that the voter to whom is was provided has voted and/or for disqualifying the absentee ballot if the voter has voted in person during the election, thereby to reduce the likelihood for a voter voting more than once without being detected. Once the absentee ballot is determined 430 to be a valid absentee ballot based upon the EVID, the envelope is opened and the ballot therein is counted 430 as described.

While a record of the VID of ballots sent as absentee ballots may be retained for verifying that the ballot is an authentic absentee ballot as part of it being counted, it is preferred that the VID and EVID be separate and independent of each other and not linked, so that the identity of the voter remains anonymous and his vote remains private. Voter anonymity and/or privacy may also be enhanced where substantial numbers of such ballots are processed together, e.g., where absentee and/or provisional ballots are removed from their envelopes. Ballots not validated may be retained either physically and/or electronically by storing images thereof, and such stored images may be related to the voter registration database, if desired.

The verified (qualified) received ballots are then read as described herein (e.g., see FIGS. 7 and 8) and tabulated 430, without the need for being sorted by election and/or ballot style and/or jurisdiction before reading and tabulating 430, to determine the result or outcome of the voting. Before and/or during the reading and tabulating 430, the ballots may be verified/authenticated by comparing the complete VID number on each ballot against a list of valid VID numbers for the election, e.g., a computer database listing the VID of each issued ballot, and/or by manual inspection by an election official.

The result/outcome of the election is certified and/or published 432 as required by the applicable election laws. Preferably, the tabulating 430 of voted ballots preserves the specific voting selections read from each ballot and the associated VID (e.g., voting record) of that ballot, as well as tallying the vote totals for determining the election outcome, and a listing of the voting selections and VID (voting record) from all ballots are published where the public can access same, e.g., on a bulletin board, in a printed publication and/or on an Internet web site. Thus, each voter knowing his VID can access the listing and find the vote recorded from his ballot by its VID and can satisfy himself that his vote has been counted and has been counted correctly and accurately. Where the voter retains a copy of his ballot and/or is issued a voting receipt, such may be utilized for correcting an incorrectly recorded vote and/or an improperly disqualified ballot where permitted by applicable law.

Figure 12:
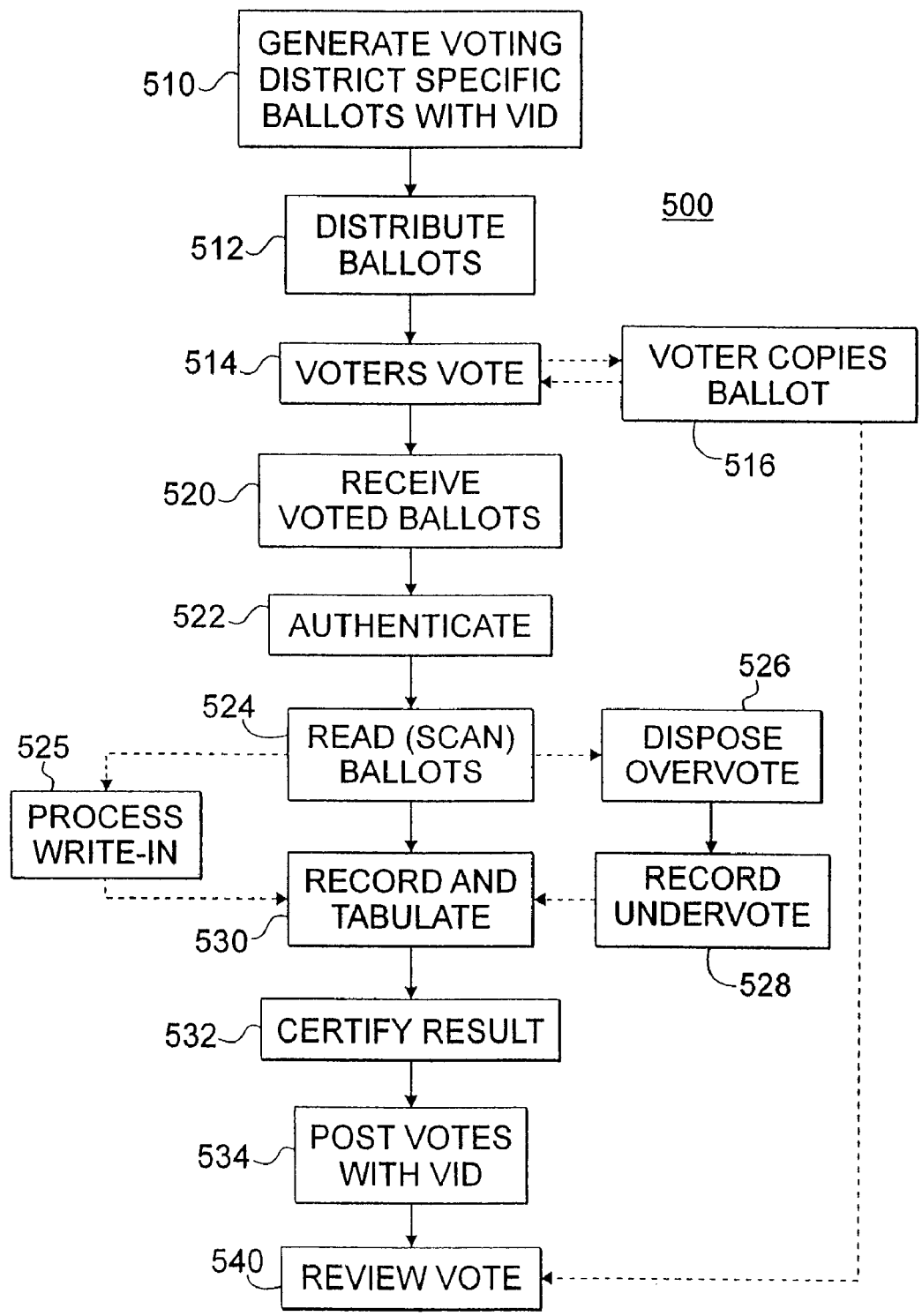
FIG. 12 is a schematic flow diagram of an example voting process utilizing the ballot of FIGS. 1, 3A-3D and 4.

FIG. 12 is a schematic flow diagram of an example voting process 500 utilizing the ballot of FIGS. 1, 3A-3D and 4. Voting district specific ballots are generated 510 and distributed 512 for being voted. Voters vote 514 by marking the mark spaces on the ballot corresponding to their desired voting selections (votes) and submit their ballots in accordance with applicable election procedure. A voter may copy 516 his marked ballot for later checking that his vote was counted and was counted properly. Voted ballots are received 520 and the received voted ballots are authenticated 522 before being read and counted. All the foregoing may be as described in relation to FIG. 11.

Authenticated (valid) ballots are read (scanned) 524 to read the VID number printed thereon and the voting selections marked thereon, i.e. the voting selections marked on each ballot are read according to a ballot template corresponding to the jurisdictional portion of the VID selected based upon the jurisdictional portion of the VID read 524 from each ballot. Write-in votes are preferably read and processed 525 by optical character recognition (OCR) software for computer tabulation, and/or ballots having write-in votes may be separated for manual processing (e.g. manual deciphering and posting) 525 and/or inspection and/or verification. As described, ballots are read 524 according to ballot templates selected based upon the read VID and so do not need to be sorted by jurisdiction and/or style prior to reading 524.

Ballots over-voted (i.e. wherein more mark spaces than are permitted to be marked have been marked) may be disposed 526 by being separated or ejected for manual inspection and/or invalidation, and/or the valid portions of the voting selections may be recorded and tabulated 530, depending on the treatment of over-voted ballots under applicable law. Some jurisdictions invalidate only the voting selections made in over-voted contests and other jurisdictions invalidate an entire ballot containing any over-vote. Ballots under-voted (i.e. wherein fewer mark spaces than are permitted to be marked have been marked) may be recorded separately 526 and/or the under-vote may be recorded separately 526 (e.g., for review and/or for statistical purposes), and the voting selections thereon are recorded and tabulated 530, and/or under-voted ballots may be separated for manual inspection, depending on the treatment of under-voted ballots under applicable law. Further, the read and/or imaged information for each under- and/or over-voted ballot may be printed out for review by election officials.

The voting selections from read 524 ballots is recorded 530 including the VID number from each ballot, i.e. the voting selections and VID of each ballot are recorded and stored as an individual voting record, and the voting selections therefrom are also tabulated 530 to determine the result of voting. Preferably, the information read from each ballot, e.g., voting record of voting selections and VID, are stored in plural separate and independent memory devices, e.g., hard drives, flash memories, optical CD-ROM and the like, as described in incorporated patent application Ser. Nos. 09/737,306 and 10/255,348, for preservation with the original paper ballots in accordance with applicable procedures.

When the voting results tabulations are properly verified, the result is certified 532 as official. Thereafter, the certified results may be posted/published 534, e.g., on an Internet web site, including both the tabulated 530 result and/or the voting records including VID of each individual ballot, thereby enabling any voter knowing his VID, e.g., from a ballot copy and/or a printed voting receipt, to review 540 the voting record corresponding to that VID to ascertain whether it was counted and, if counted, whether it was correctly counted. The posted/published 534 voting records can include not only those voting records for ballots that were authenticated 522 and thus counted 524, 530, but may also include the voting records for ballots that were disqualified or otherwise not counted and/or not completely counted and/or the fact that the ballot of that VID was disqualified or was not counted and/or not completely counted.

In connection with the steps of reading 524, recording and tabulating 530 and/or the processing of write-in, under and over-votes 525, 526, 528, for example, election officials may be provided with administrative and management tools, such as user rights and levels of access, passwords and the like, the keeping of logs of events and/or actions performed, functions to export (e.g., by electronic file transfer and/or via floppy disks, CD-ROMs and other tangible media) all or part of the files of vote tabulations, voting records, vote statistics and the like, and/or for the printing of various reports and/or forms, such as vote tallies, voting reports, vote certification forms and the like.

While the VID information may be provided to the voter on a paper ballot and/or on a paper or other identification card, or may be entered by an election official at the election office and/or polling place for printing on a ballot, VID information may be coded into the memory of a smart card and the voting machine may include a smart card reader for reading the coded VID stored therein where the voting machine is utilized to print an optically scan-able ballot including the VID. Identification of the voter at the time for voting may utilize the VID information stored in the voter's smart card, or may be by traditional identification methods, such as signature verification, conventionally utilized by various jurisdictions.

Alternatively, a unique identifier stored in the voting machine may be read into the voter's smart card and may either supplement or replace the voter number stored therein at issuance, whereby the pre-stored voter number may be used to verify registration and/or the unique identifier may be utilized to preserve voter anonymity and privacy. Preferably for voter privacy, only the unique identifier, e.g., VID, is stored in the voter smart card and/or on a printed allot at the completion of a voting session. A database of unique identifiers valid only for a particular election may be pre-loaded into the voting machines and/or vote tabulating machines prior to that election, and/or smart cards may be collected when voted, for security.

While the present invention has been described in terms of the foregoing exemplary embodiments, variations within the scope and spirit of the present invention as defined by the claims following will be apparent to those skilled in the art. For example, while the identifier (e.g., VID number) of a ballot must be machine readable for automatic tabulation of votes, the machine-readable VID may be the same as the desirable human-readable VID, i.e. alphanumeric characters readable by people as well as machines (e.g., readers having OCR) may be utilized.

Moreover, any arrangement described in relation to a particular form of voting (e.g., absentee or provisional voting) may be utilized in relation to any other form of voting (e.g., regular or early voting) as well.

Further, the identifier (VID) may include any one or more of the fields described and/or additional or different fields, as may be appropriate and/or desirable. Each identifier (VID) includes one or more fields containing a representation of jurisdictional information and/or a ballot form, and may include one or more fields containing a unique random portion. Herein, an identifier may be or be referred to as a ballot identifier and/or a voting session identifier, e.g., where the ballot is generated with an identifier in a voting session of an election, i.e. in recording a voter's vote or is generated apart from a voting session and any voter, and/or may be referred to as a voter identifier in relation to a particular voter (even if random and anonymous).

Also, and optionally, for weighted and/or ranked voting, the ballot may provide for the voter to write-in the weighting and/or rank for each candidate and/or response in a marking space 112 provided therefore and the write-in portion may be read and translated into machine readable form manually. Further, the reader may include an OCR function for translating the written weight and/or rank into machine readable form, and in such case, means for writing in the selection in a common font easily understood by the reader may be provided. Voter over-voting errors in making weighting and/or ranking preferences may be proportionately corrected automatically, e.g., normalized to the proper weight, if the law allows. Under votes may be counted insofar as they are voted.

While ballots are generally referred to herein as "paper" ballots, it is understood that while present day sheet ballots are typically of paper or of a somewhat heavier stock, paper ballot as used herein is intended to include paper, heavy paper, card stock, cardboard, plastic, punch card and other forms of ballots on a sheet of material. While sheet ballots are most commonly read by optical scanning when the ballot passes a light source and the marked/unmarked state of the mark regions is sensed by an associated light detector, marking may be detected by other means such as a mechanical and/or electrical sensing and detecting means.

Where ballots are separately processed, such processing may be automated or manual, or may be a combination thereof. Separate processing may be utilized where ballots include a write-in vote, an overvote, an undervote, and/or where a ballot appears to be missing voting mark spaces, ballot identifier and/or fiducial marks, and/or wherein such features have not been properly read and/or imaged.

In any of the arrangements described herein, a printer may be associated with a ballot reader, e.g., such as reader 1000 described in relation to FIG. 7, for providing a voting receipt and/or confirmation that a ballot has been properly read. Such receipt may be a simple confirmation of a readable ballot, a listing of voting selections and/or may include a printout of a full ballot image, or anything in between. In the latter case, it may be desirable for the printed version of the voter's ballot to be submitted as the official vote after the voter has opportunity to verify its accuracy and completeness. The printed ballot version would have fully blackened mark spaces for each voting selection made thereby to further reduce the already extremely low rate of questionable vote counting error typically obtained with the described arrangements.

In addition, while the apparatus and method herein are typically described in relation to voting apparatus having a user interface, e.g., a display and a data entry device such as a touch screen, either or both may be eliminated and/or rendered inoperative, if desired, and replaced by the optical ballot reading apparatus such as that described. Further, the apparatus and method herein may be utilized in fields and applications other than elections and voting, e.g., in the grading/marking of examinations and tests such as school and university tests, professional tests, and the like, wherein the voter is a test taker and an answer sheet replaces the ballot, in the tallying and tabulating of surveys and questionnaires (replacing the ballots), in the reading and tabulation of gaming sheets (replacing the ballots) such as for races and lotteries, and the like.

A method for reading a sheet having one or more regions of choices and a plurality of mark spaces thereon in which one or more selections may be marked for each of one or more choices, each mark space being a space defined for marking a selection therein, the method may comprise: imaging the sheet having one or more choice regions and a plurality of mark spaces thereon wherein the image of the sheet includes all of the mark spaces for the choice regions thereon and is in a pixelated or bitmapped format including a plurality of pixels; defining for each sheet the one or more choice regions each containing a plurality of reading regions each including one mark space; processing the image of the sheet for decoding from the image of the sheet the defined one or more choice regions and for decoding from the image of the sheet the plurality of reading regions including the one mark space thereof; and for each decoded choice region: counting at least the number of dark pixels for each reading region; determining from the counts of the dark pixels for each reading region whether the mark space therein is unmarked or is marked as a selection; and counting each determined marked selection. The determining may comprise: determining the difference between a number of dark pixels representative of the mark space and a total number of pixels for a reading region, and determining whether the counted number of dark pixels for that reading region exceeds a predetermined portion of the difference between the number of dark pixels representative of the mark space and the total number of pixels for that reading region. Where two or more of the mark spaces are associated with a choice, each choice may have a given number of selections that may be made therein, the method may comprise: counting the number of mark spaces for the choice that are determined from the counts of light and dark pixels for each reading region to be marked as a selection; comparing the number of selections marked to the given number of selections; and if the number of selections marked equals the given number, then performing the counting each determined selection, if the number of selections marked is less than the given number, then providing an indication of an under selection, and if the number of selections marked exceeds the given number, then providing an indication of an over selection and not performing the counting each determined selection. An indication of an under selection or an over selection or both may be provided, and the method may further comprise providing at least an image including any under selected selection, any over selected selection or any under selected selection and any over selected selection for separate processing. Wherein two or more of the mark spaces and a write-in selection space are associated with a choice, the method may comprise: determining whether a write-in selection space has been marked; and if a write in selection space has been marked, providing at least an image including the write-in selection for separate processing. The separate processing may comprise: storing the images of write-in selections and/or content of write-in selections; and displaying the stored image and/or content of a write-in selection, accumulated stored images and/or contents of a plurality of write-in selections or both. Each choice may have a given number of selections that may be made therein, and the method may comprise: counting the number of selections made for the choice including mark spaces and write-in selection spaces that are determined to be marked as a selection; comparing the number of selections marked to the given number of selections; and if the number of selections marked equals the given number, then the counting each determined selection, if the number of selections marked is less than the given number, then providing an indication of an under selection, and if the number of selections marked exceeds the given number, then providing an indication of an over selection and not performing the counting each determined selection. Determining from at least the counts of dark pixels for each reading region whether the mark space therein is marked as a selection may comprise: (a) comparing the relative numbers of light and dark pixels to a first predetermined value to determine whether the mark space is marked as a selection; and the method may further comprise: (b) comparing the relative numbers of light and dark pixels to a second predetermined value that is higher or lower than the first predetermined value to determine whether the mark space is marked as a selection; and (c) providing an indication of the difference, if any, in the determinations of step (a) and step (b). Each sheet may have a corresponding unique identifier, and the providing an indication may include providing the unique sheet identifier. Each sheet may have an identifier thereon or may have two or more fiducial marks thereon or may have an identifier and two or more fiducial marks thereon, and the method may further comprise, prior to the counting each determined marked selection: defining for each sheet one or more second reading regions each including one or more of the identifier and fiducial marks; counting the number of light pixels and dark pixels for each second reading region; determining from the counts of light and dark pixels for each reading region and for each second reading region whether at least all mark spaces and all of the identifier and fiducial marks are present in the image of the sheet. The sheet may include an examination sheet, a test sheet, an answer sheet, a tally sheet, a tabulation sheet, a survey sheet, a questionnaire, a gaming sheet, a race sheet, a lottery sheet, or any combination of the foregoing. The method may be utilized for grading and/or marking an examination, for grading and/or marking a test, for grading and/or marking a school test, for grading and/or marking a university test, for grading and/or marking a professional test, for grading and/or marking an answer sheet, for tallying and/or tabulating a survey, for tallying and/or tabulating a questionnaire, for reading and/or tabulating gaming sheets, for reading and/or tabulating races, for reading and/or tabulating lotteries, or any combination of the foregoing.

A method for optically reading sheets may comprise: making selections using any of a keyboard, a touch screen, a button, a switch, voice recognition apparatus, a Braille keyboard, a pen with writing recognition interface; then producing a sheet by printing the selections on a pre-printed form or printing a form including the selections; repeating the making and the producing steps for a plurality of participants, and then: reading or imaging each sheet including reading the selections marked thereon; and processing the read or imaged sheet for determining the selections thereon in accordance with a template to which the read or imaged sheet corresponds, whereby the selections are marked on each sheet and are processed in accordance with the corresponding template. The method may further comprise either: recording the selections marked on each sheet in accordance with the template;

or displaying the selections marked on each sheet in accordance with the template, but not recording or storing the selections. Each sheet may be associated with a jurisdiction and wherein the processing may include selecting the template corresponding to the jurisdiction in accordance with the jurisdiction associated with the sheet. Two or more of the mark spaces and a write-in selection space may be associated with a choice, and the method may comprise: determining whether a write-in selection space has been marked; and if a write in selection space has been marked, providing at least an image including the write-in selection for separate processing. Separate processing may comprise: storing the images of write-in selections and/or content of write-in selections; and displaying the stored image and/or content of a write-in selection, accumulated stored images and/or contents of a plurality of write-in selections or both. Each choice may have a given number of selections that may be made therein, and the method may comprise: counting the number of selections made for the choice including mark spaces and write-in selection spaces that are determined to be marked as a selection; comparing the number of selections marked to the given number of selections; and if the number of selections marked equals the given number, then the counting each determined selection, if the number of selections marked is less than the given number, then providing an indication of an under selection, and if the number of selections marked exceeds the given number, then providing an indication of an over selection and not performing the counting each determined selection. Determining from at least the counts of dark pixels for each reading region whether the mark space therein is marked as a selection may comprise: (a) comparing the relative numbers of light and dark pixels to a first predetermined value to determine whether the mark space is marked as a selection; and the method may further comprise: (b) comparing the relative numbers of light and dark pixels to a second predetermined value that is higher or lower than the first predetermined value to determine whether the mark space is marked as a selection; and (c) providing an indication of the difference, if any, in the determinations of step (a) and step (b). Each sheet may have an identifier thereon or may have two or more fiducial marks thereon or may have an identifier and two or more fiducial marks thereon, and the method may further comprise, prior to the counting each determined marked selection: defining for each sheet one or more second reading regions each including one or more of the identifier and fiducial marks; counting the number of light pixels and dark pixels for each second reading region; determining from the counts of light and dark pixels for each reading region and for each second reading region whether at least all mark spaces and all of the identifier and fiducial marks are present in the image of the sheet. The sheet may include an examination sheet, a test sheet, an answer sheet, a tally sheet, a tabulation sheet, a survey sheet, a questionnaire, a gaming sheet, a race sheet, a lottery sheet, or any combination of the foregoing. The method may be utilized for grading and/or marking an examination, for grading and/or marking a test, for grading and/or marking a school test, for grading and/or marking a university test, for grading and/or marking a professional test, for grading and/or marking an answer sheet, for tallying and/or tabulating a survey, for tallying and/or tabulating a questionnaire, for reading and/or tabulating gaming sheets, for reading and/or tabulating races, for reading and/or tabulating lotteries, or any combination of the foregoing.

A machine readable sheet may comprise: a sheet of material having an identifier region thereon wherein a sheet identifier therein is unique and is not related to the identity of an individual person, the sheet may also have a plurality of choice regions thereon, each choice region having two or more mark spaces therein for making selections or having a write-in space for entering a write-in selection therein or having two or more mark spaces therein for making selections and a write-in space for entering a write-in selection therein, and the unique identifier and the mark spaces may be machine readable. The unique identifier may include one or more of a bar code, a two-dimensional bar code, a prescribed font, optical character recognition (OCR) characters, alphanumeric characters, non-alphanumeric characters, and symbols; the unique identifier may identify a template corresponding to the two or more mark spaces for making selections in each of the plurality of choice regions; or the unique identifier may be represented by characters that are machine readable and are human readable; or the unique identifier may be represented by characters that are randomly generated; or the machine-readable sheet may comprise a plurality of pages and each of the plurality of pages may have a machine-readable indicia representative of a page number thereof; or the sheet may have two or more fiducial marks thereon for defining the orientation and the scale of the sheet; or one of the mark spaces in a choice region may represent an abstention selection; or any combination of any of the foregoing. The machine readable sheet may include an examination sheet, a test sheet, an answer sheet, a tally sheet, a tabulation sheet, a survey sheet, a questionnaire, a gaming sheet, a race sheet, a lottery sheet, or any combination of the foregoing. The machine readable sheet may be readable by an optical scanner, by an imager, or by an optical scanner and an imager, for reading selections marked in the two or more mark spaces, for reading a write-in selection in a write-in space, or for reading selections marked in the two or more mark spaces and a write-in selection in a write-in space.

A method for reading a sheet having a plurality of mark spaces thereon in which selections may be marked may comprise: defining first and second predetermined values related to counts of light pixels and dark pixels for a mark space being considered marked as a selection, wherein the second predetermined value is greater than or less than the first predetermined value; imaging the sheet having a plurality of mark spaces thereon wherein the image is in a format including a plurality of pixels; defining for each sheet a plurality of reading regions each including the outline of one mark space; counting the number of light pixels and dark pixels for each reading region; determining from the counts of light and dark pixels for each reading region and the first predetermined value whether the mark space therein is marked as a selection; determining from the counts of light and dark pixels for each reading region and the second predetermined value whether the mark space therein is marked as a selection; identifying each sheet wherein the determination of a marked selection based on the first predetermined value differs from the determination of a marked selection based on the second predetermined value. The sheet may include an examination sheet, a test sheet, an answer sheet, a tally sheet, a tabulation sheet, a survey sheet, a questionnaire, a gaming sheet, a race sheet, a lottery sheet, or any combination of the foregoing. The method may be utilized for grading and/or marking an examination, for grading and/or marking a test, for grading and/or marking a school test, for grading and/or marking a university test, for grading and/or marking a professional test, for grading and/or marking an answer sheet, for tallying and/or tabulating a survey, for tallying and/or tabulating a questionnaire, for reading and/or tabulating gaming sheets, for reading and/or tabulating races, for reading and/or tabulating lotteries, or any combination of the foregoing.

What is claimed is:

1. A method for reading paper ballots wherein each paper ballot is enclosed in a ballot envelope having a machine-readable envelope identifier and voter information including a signature thereon, wherein each paper ballot is markable for marking voting selections thereon, said method comprising:
   reading each ballot envelope including reading at least the machine readable envelope identifier and signature thereon;
   decoding the machine readable envelope identifier read from each ballot envelope;
   displaying at least the decoded envelope identifier and signature read from each ballot envelope for determining from the envelope identifier, the signature, or the envelope identifier and the signature, whether the ballot is a valid ballot; and
   if the ballot is determined to be a valid ballot, removing the paper ballot determined to be a valid ballot from its ballot envelope, and then performing the following steps on each paper ballot determined to be a valid ballot:
   reading each paper ballot;
   selecting a template for decoding voting selections marked on each paper ballot responsive to an identifier read from that paper ballot;
   decoding the voting selections read from each paper ballot in accordance with the selected template therefore; and
   tabulating the voting selections decoded from each of the paper ballots consistent with their respective selected templates.

2. The method of claim 1 wherein each paper ballot has a jurisdiction identifier, said method further comprising:
   decoding the jurisdiction identifier of each paper ballot; and
   said selecting a template includes selecting the template responsive to the decoded jurisdiction identifier for decoding the voting selections marked on each paper ballot,
   whereby the paper ballots need not be sorted according to jurisdiction prior to said reading each paper ballot.

3. The method of claim 2 wherein the jurisdiction identifier includes one or more of a bar code, a two-dimensional bar code, a prescribed font, optical character recognition (OCR) characters, alphanumeric characters, non-alphanumeric characters, and symbols.

4. The method of claim 1 wherein each paper ballot has orientation indicia and may be in an orientation different from other ones of the paper ballots, said method further comprising:
   determining from the orientation indicia the orientation of each paper ballot;
   wherein said decoding the voting selections read from each paper ballot in accordance with the selected template comprises decoding consistent with the determined orientation of each paper ballot the voting selections marked on each paper ballot in accordance with the selected template.

5. The method of claim 4 wherein the orientation indicia include:
   at least two orientation indicia that are spaced apart by a predetermined distance for defining a dimension of the paper ballot; or
   one or more of cross-hair lines, cross-hair lines in a circle, targets, bulls-eye shapes, bullets, "+" marks, "X" marks, boxes, any of the foregoing with one or more black, darkened or contrasting adjacent sections, and/or any combination thereof; or
   at least two orientation indicia that are spaced apart by a predetermined distance for defining a dimension of the paper ballot and that include one or more of cross-hair lines, cross-hair lines in a circle, targets, bulls-eye shapes, bullets, "+" marks, "X" marks, boxes, any of the foregoing with one or more black, darkened or contrasting adjacent sections, and/or any combination thereof.

6. The method of claim 1 wherein said reading each paper ballot includes imaging the paper ballot and storing the image of the paper ballot.

7. The method of claim 1 wherein said reading each paper ballot includes imaging the paper ballot on a copier, a scanner, a facsimile machine, a commercial imaging device or a commercial scanning device.

8. The method of claim 1:
   wherein said reading each ballot envelope includes imaging ballot envelopes transported along a transport path of an image document scanner to provide a ballot envelope image in a pixelated or bitmapped format for each ballot envelope; and
   wherein said decoding the machine readable envelope identifier read from each ballot envelope includes decoding the envelope identifier from the pixelated or bitmapped format ballot envelope image.

9. The method of claim 1 wherein the envelope identifier includes a unique voter identifier, wherein the determining from the envelope identifier, the signature, or the envelope identifier and the signature, whether the ballot is a valid ballot comprises:
   determining whether the displayed signature matches a voter signature in a voter registration record corresponding to the unique voter identifier.

10. The method of claim 1 further comprising prior to said tabulating step:
    determining from the decoded voting selections whether each paper ballot contains an undervote, an overvote, a missing voting selection, a write-in voting selection, or a combination thereof;
    separating each paper ballot determined to contain an undervote, an overvote, a missing voting selection, a write-in voting selection, or a combination thereof from other paper ballots not determined to contain an undervote, an overvote, a missing voting selection, or a write-in voting selection; and then:
    performing said tabulating step for the other paper ballots not determined to contain an undervote, an overvote, a missing voting selection, or a write-in voting selection; and
    separately processing each separated paper ballot determined to contain an undervote, an overvote, a missing voting selection, a write-in voting selection, or a combination thereof.

11. A method for reading paper ballots wherein each paper ballot is enclosed in a ballot envelope having a machine-readable envelope identifier and voter information including a signature thereon, wherein each paper ballot is markable for marking voting selections thereon, said method comprising:
    reading each ballot envelope including at least the machine readable envelope identifier and signature thereon;
    decoding the machine readable envelope identifier read from each ballot envelope;
    displaying at least the decoded envelope identifier and signature read from each ballot envelope for determining from the envelope identifier, the signature, or the envelope identifier and the signature, whether the ballot is a valid ballot; and
    if the ballot is determined to be a valid ballot, removing each paper ballot determined to be a valid ballot from its ballot envelope, and then performing the following steps on each paper ballot determined to be a valid ballot:

determining the voting selections marked on each paper ballot; and tabulating the voting selections determined from each of the paper ballots.

12. The method of claim 11 wherein said reading each ballot envelope includes:

imaging each ballot envelope on a copier, a scanner, a facsimile machine, a commercial imaging device or a commercial scanning device; or storing the image of each ballot envelope; or imaging each ballot envelope on a copier, a scanner, a facsimile machine, a commercial imaging device or a commercial scanning device and storing the image of each ballot envelope.

13. The method of claim 11:

wherein said reading each ballot envelope includes imaging ballot envelopes transported along a transport path of an image document scanner to provide a ballot envelope image in a pixelated or bitmapped format for each ballot envelope; and wherein said decoding the machine readable envelope identifier read from each ballot envelope includes decoding the envelope identifier from the pixelated or bitmapped format ballot envelope image.

14. The method of claim 11 wherein the envelope identifier includes a unique voter identifier, wherein the determining from the envelope identifier, the signature, or the envelope identifier and the signature, whether the ballot is a valid ballot comprises:

determining whether the displayed signature matches a voter signature in a voter registration record corresponding to the unique voter identifier.

15. The method of claim 11 further comprising prior to said tabulating step:

determining from the determined voting selections whether each paper ballot contains an undervote, an overvote, a missing voting selection, a write-in voting selection, or a combination thereof;

separating each paper ballot determined to contain an undervote, an overvote, a missing voting selection, a write-in voting selection, or a combination thereof from other paper ballots not determined to contain an undervote, an overvote, a missing voting selection, or a write-in voting selection; and then:

performing said tabulating step for the other paper ballots not determined to contain an undervote, an overvote, a missing voting selection, or a write-in voting selection; and separately processing each separated paper ballot determined to contain an undervote, an overvote, a missing voting selection, a write-in voting selection, or a combination thereof.

16. A method for reading paper ballots wherein each paper ballot is enclosed in a ballot envelope having a machine-readable envelope identifier and voter information including a signature thereon, wherein each paper ballot is markable for marking voting selections thereon, said method comprising:

decoding the machine readable envelope identifier from each ballot envelope;

displaying at least the decoded envelope identifier and signature of each ballot envelope for determining from the envelope identifier, the signature, or the envelope identifier and the signature, whether the ballot is a valid ballot; and if the ballot is determined to be a valid ballot, removing the paper ballot determined to be a valid ballot from its ballot envelope, and then performing the following steps on each paper ballot determined to be a valid ballot:

determining the voting selections marked on each paper ballot; and tabulating the voting selections determined from each of the paper ballots.

17. The method of claim 16 wherein said decoding the machine-readable envelope identifier from each ballot envelope includes:

imaging each ballot envelope on a copier, a scanner, a facsimile machine, a commercial imaging device or a commercial scanning device; or storing the image of each ballot envelope; or imaging each ballot envelope on a copier, a scanner, a facsimile machine, a commercial imaging device or a commercial scanning device and storing the image of each ballot envelope.

18. The method of claim 16 wherein said decoding the machine-readable envelope identifier from each ballot envelope includes:

reading ballot envelopes transported along a transport path of a document scanner; and decoding the envelope identifier read from the ballot envelope.

19. The method of claim 16 wherein the envelope identifier includes a unique voter identifier, wherein the determining from the envelope identifier, the signature, or the envelope identifier and the signature, whether the ballot is a valid ballot comprises:

determining whether the displayed signature matches a voter signature in a voter registration record corresponding to the unique voter identifier.

20. The method of claim 16 further comprising prior to said tabulating step:

determining from the determined voting selections whether each paper ballot contains an undervote, an overvote, a missing voting selection, a write-in voting selection, or a combination thereof;

separating each paper ballot determined to contain an undervote, an overvote, a missing voting selection, a write-in voting selection, or a combination thereof from other paper ballots not determined to contain an undervote, an overvote, a missing voting selection, or a write-in voting selection; and then:

performing said tabulating step for the other paper ballots not determined to contain an undervote, an overvote, a missing voting selection, or a write-in voting selection; and separately processing each separated paper ballot determined to contain an undervote, an overvote, a missing voting selection, a write-in voting selection, or a combination thereof.

21. The method of claim 16 wherein each paper ballot has a unique ballot identifier thereon, said method further comprising:

storing a representation of the voting selections marked on each paper ballot and the unique ballot identifier thereof; or storing an image of each paper ballot and relating the stored image to a voter registration database; or publishing the voting selections, the jurisdiction identifier and the unique ballot identifier from each paper ballot; or storing a representation of the voting selections marked on each paper ballot and the unique ballot identifier thereof and publishing the voting selections, the jurisdiction identifier and the unique ballot identifier from each paper ballot; or a combination of the foregoing.

22. The method of claim 21 wherein the unique ballot identifier includes a randomly generated identifier that is not related to the envelope identifier.

23. A method for reading paper ballots wherein each paper ballot is enclosed in a ballot envelope having a machine-readable envelope identifier and voter information including a signature thereon, wherein each paper ballot is markable for marking voting selections thereon, and wherein each paper ballot has a jurisdiction identifier and fiducial marks thereon, said method comprising:

reading each ballot envelope including at least the machine readable envelope identifier and signature thereon;

decoding the machine readable envelope identifier read from each ballot envelope;

displaying at least the decoded envelope identifier and signature of each ballot envelope for determining from the envelope identifier, the signature, or the envelope identifier and the signature, whether the ballot is a valid ballot; and if the ballot is determined to be a valid ballot, removing each paper ballot determined to be a valid ballot from its ballot envelope, and then performing the following steps on each paper ballot determined to be a valid ballot:

determining from the fiducial marks the orientation of each paper ballot;

reading consistent with the determined orientation of each paper ballot the jurisdiction identifier of each paper ballot;

selecting a template responsive to the read jurisdiction identifier of each paper ballot for reading the voting selections marked thereon; and reading the voting selections marked on each paper ballot in accordance with the selected template and consistent with the determined orientation of each paper ballot, whereby the voting selections marked on each paper ballot are read in accordance with a selected template corresponding to the jurisdiction identifier for that paper ballot irrespective of the orientation of the paper ballot.

24. The method of claim 23 further comprising:

decoding the voting selections read from each paper ballot in accordance with the selected template; and then:

tabulating the voting selections decoded from each of the paper ballots consistent with their respective selected templates; or publishing the voting selections decoded from each of the paper ballots; or tabulating the voting selections decoded from each of the paper ballots consistent with their respective selected templates and publishing the decoded voting selections.

25. The method of claim 23 wherein the jurisdiction identifier includes one or more of a bar code, a two-dimensional bar code, a prescribed font, optical character recognition (OCR) characters, alphanumeric characters, non-alphanumeric characters, and symbols.

26. The method of claim 23 wherein the fiducial marks include:

at least two orientation indicia that are spaced apart by a predetermined distance for defining a dimension of the paper ballot; or one or more of cross-hair lines, cross-hair lines in a circle, targets, bulls-eye shapes, bullets, "+" marks, "X" marks, boxes, any of the foregoing with one or more black, darkened or contrasting adjacent sections, and/or any combination thereof; or at least two orientation indicia that are spaced apart by a predetermined distance for defining a dimension of the paper ballot and that include one or more of cross-hair lines, cross-hair lines in a circle, targets, bulls-eye shapes, bullets, "+" marks, "X" marks, boxes, any of the foregoing with one or more black, darkened or contrasting adjacent sections, and/or any combination thereof.

27. The method of claim 23 wherein said reading consistent with the determined orientation of each paper ballot the jurisdiction identifier of each paper ballot, or said reading the voting selections marked on each paper ballot, or both, includes:

imaging each paper ballot and storing the image of each paper ballot; or imaging each paper ballot on a copier, a scanner, a facsimile machine, a commercial imaging device or a commercial scanning device and storing the image of each paper ballot.

28. The method of claim 23:

wherein said reading each ballot envelope includes imaging ballot envelopes transported along a transport path of an image document scanner to provide a ballot envelope image in a pixelated or bitmapped format for each ballot envelope; and wherein said decoding the machine readable envelope identifier read from each ballot envelope includes decoding the envelope identifier from the pixelated or bitmapped format ballot envelope image.

29. The method of claim 23 wherein the envelope identifier includes a unique voter identifier, wherein the determining from the envelope identifier, the signature, or the envelope identifier and the signature, whether the ballot is a valid ballot comprises:

determining whether the displayed signature matches a voter signature in a voter registration record corresponding to the unique voter identifier.

30. The method of claim 23 further comprising prior to said tabulating step:

determining from the voting selections read from each paper ballot whether each paper ballot contains an undervote, an overvote, a missing voting selection, a write-in voting selection, or a combination thereof;

separating each paper ballot determined to contain an undervote, an overvote, a missing voting selection, a write-in voting selection, or a combination thereof from other paper ballots not determined to contain an undervote, an overvote, a missing voting selection, or a write-in voting selection; and then:

performing said tabulating step for the other paper ballots not determined to contain an undervote, an overvote, a missing voting selection, or a write-in voting selection; and separately processing each separated paper ballot determined to contain an undervote, an overvote, a missing voting selection, a write-in voting selection, or a combination thereof.

31. The method of claim 23 wherein each paper ballot has a unique ballot identifier thereon, said method further comprising:

storing a representation of the voting selections marked on each paper ballot and the unique ballot identifier thereof; or storing an image of each paper ballot and relating the stored image to a voter registration database; or publishing the voting selections, the jurisdiction identifier and the unique ballot identifier from each paper ballot; or storing a representation of the voting selections marked on each paper ballot and the unique ballot identifier thereof and publishing the voting selections, the jurisdiction identifier and the unique ballot identifier from each paper ballot; or a combination of the foregoing.

32. The method of claim 31 wherein the unique ballot identifier includes a randomly generated identifier that is not related to the envelope identifier.

33. A method for reading paper sheets wherein each paper sheet is enclosed in an envelope having a machine-readable envelope identifier and a signature thereon, and wherein each paper sheet is markable for marking selections thereon, said method comprising:

reading each envelope including at least the machine readable envelope identifier and the signature thereon;

decoding the machine readable envelope identifier read from each envelope;

displaying at least the decoded envelope identifier and the signature read from each envelope for determining from the envelope identifier, the signature, or the envelope identifier and the signature, whether the paper sheet is a valid sheet; and if the sheet is determined to be a valid sheet, removing the paper sheet determined to be a valid sheet from its envelope, and then performing the following steps on each paper sheet determined to be a valid sheet:

determining the selections marked on each paper sheet; and processing the selections determined from each of the paper sheets.

34. The method of claim 33 wherein said reading each envelope includes:

imaging each envelope on a copier, a scanner, a facsimile machine, a commercial imaging device or a commercial scanning device; or storing the image of each envelope; or imaging each envelope on a copier, a scanner, a facsimile machine, a commercial imaging device or a commercial scanning device and storing the image of each envelope.

35. The method of claim 33:

wherein said reading each envelope includes imaging envelopes transported along a transport path of an image document scanner to provide an envelope image in a pixelated or bitmapped format for each envelope; and wherein said decoding the machine readable envelope identifier read from each envelope includes decoding the envelope identifier from the pixelated or bitmapped format envelope image.

36. The method of claim 33 wherein the envelope identifier includes a unique individual identifier, wherein the determining from the envelope identifier, the signature, or the envelope identifier and the signature, whether the ballot is a valid ballot comprises:

determining whether the displayed signature matches an individual signature in a registration record corresponding to the unique individual identifier.

37. The method of claim 33 wherein the sheet includes an examination sheet, a test sheet, an answer sheet, a tally sheet, a tabulation sheet, a survey sheet, a questionnaire, a gaming sheet, a race sheet, a lottery sheet, or any combination of the foregoing.

38. The method of claim 33 wherein said method is utilized for grading and/or marking an examination, for grading and/or marking a test, for grading and/or marking a school test, for grading and/or marking a university test, for grading and/or marking a professional test, for grading and/or marking an answer sheet, for tallying and/or tabulating a survey, for tallying and/or tabulating a questionnaire, for reading and/or tabulating gaming sheets, for reading and/or tabulating races, for reading and/or tabulating lotteries, or any combination of the foregoing.

39. A system for reading paper ballots wherein each paper ballot is enclosed in a ballot envelope having a machine-readable envelope identifier and voter information including a voter signature thereon, wherein each paper ballot is markable for marking voting selections thereon, said system comprising:

a reader for reading at least the machine readable envelope identifier and the voter signature on each ballot envelope;

a decoder for decoding the machine readable envelope identifier read from each ballot envelope;

a display for displaying the decoded envelope identifier and the voter signature for determining from the envelope identifier, the voter signature, or the envelope identifier and the voter signature, whether the ballot is a valid ballot;

means for determining the voting selections marked on each paper ballot that has been determined to be a valid ballot; and means for tabulating the voting selections determined from each of the paper ballots determined to be a valid ballot.

40. The method of claim 39 wherein said reader comprises:

a copier, a scanner, a facsimile machine, a commercial imaging device or a commercial scanning device, that can capture an image of each ballot envelope; or memory for storing the image of each ballot envelope; or a copier, a scanner, a facsimile machine, a commercial imaging device or a commercial scanning device, that can capture the image of each ballot envelope and a memory for storing the image of each ballot envelope.

41. The system of claim 39 wherein:

said reader of each ballot envelope includes an image document scanner for imaging ballot envelopes transported along a transport path thereof to provide a ballot envelope image in a pixelated or bitmapped format for each ballot envelope; and said decoder includes means for decoding the machine readable envelope identifier from each ballot envelope from the pixelated or bitmapped format ballot envelope image.

42. The system of claim 39 wherein said means for determining the voting selections includes:

means for determining whether each paper ballot contains an undervote, an overvote, a missing voting selection, a write-in voting selection, or a combination thereof;

wherein each paper ballot determined to contain an undervote, an overvote, a missing voting selection, a write-in voting selection, or a combination thereof is separated from other paper ballots not determined to contain an undervote, an overvote, a missing voting selection, or a write-in voting selection; and wherein said means for tabulating tabulates the other paper ballots not determined to contain an undervote, an overvote, a missing voting selection, or a write-in voting selection.

43. The system of claim 39 wherein:

the envelope identifier is related to voter data stored in a voter registration record; or the envelope identifier includes a randomly generated identifier for authenticating the ballot envelope or the paper ballot therein or both; or the paper ballot includes a randomly generated identifier for authentication of the ballot, wherein the randomly generated identifier is not related to the envelope identifier; or a combination thereof.

* * * * *